United States Patent [19]

Yokoyama et al.

[11] Patent Number: 5,537,515
[45] Date of Patent: Jul. 16, 1996

[54] METHOD AND APPARATUS FOR GENERATING BIT MAP IMAGE DATA

[75] Inventors: Shoji Yokoyama; Atsushi Uchino; Ryuji Ohmoto, all of Nagano, Japan

[73] Assignee: Seiko Epson Corporation, Tokyo, Japan

[21] Appl. No.: 87,117

[22] Filed: Jul. 7, 1993

Related U.S. Application Data

[63] Continuation-in-part of Ser. No. 815,251, Dec. 31, 1991.

[30] Foreign Application Priority Data

Jan. 14, 1991 [JP] Japan .................................. 3-14810
Nov. 6, 1991 [JP] Japan .................................. 3-318392

[51] Int. Cl.[6] .................................................. G06K 15/00
[52] U.S. Cl. .................................. 395/109; 382/254
[58] Field of Search .................................. 395/109, 110, 395/112, 102, 115, 116; 382/47, 56, 54, 55, 254, 258, 263, 264, 266–267, 269

[56] References Cited

U.S. PATENT DOCUMENTS

| | | |
|---|---|---|
| 4,437,122 | 3/1984 | Walsh et al. |
| 4,544,264 | 10/1985 | Bassetti et al. |
| 4,847,641 | 7/1989 | Tung. |
| 4,955,064 | 9/1990 | Shirasaka et al. |
| 5,005,139 | 4/1991 | Tung ..................................... 395/109 |
| 5,029,108 | 7/1991 | Lung ..................................... 395/109 |

FOREIGN PATENT DOCUMENTS

| | | |
|---|---|---|
| 0385508 | 9/1990 | European Pat. Off. |
| 0406956 | 1/1991 | European Pat. Off. |

*Primary Examiner*—Arthur G. Evans
*Attorney, Agent, or Firm*—Sughrue, Mion, Zinn, Macpeak & Seas

[57] ABSTRACT

Bit map data stored in an image memory is read every one column by N lines or M columns by one line and is stored in a shift register of M bits by N bits. The data in the shift register is differentiated in the direction of the column direction by edge detectors and extracted as data representing only a contour portion. This contour data is classified into forms of discontinuous points with respect to the horizontal direction and the vertical direction by classifying circuits. As for the classified data, the size of a dot to be printed and a printing position are converted by a determining circuit to a pulse width and a timing at which the dot is to be generated, and the classified data is converted to a pulse width by a pulse-width modulating circuit and is outputted to a laser beam modulating device. As a result, a dot smaller than a normal dot is added in a vacant portion, or a part of a normal dot is shaved, thereby printing a smooth pattern.

6 Claims, 39 Drawing Sheets

FIG. 20
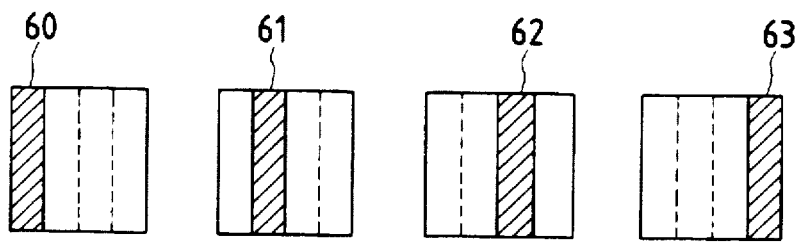
FIG. 21
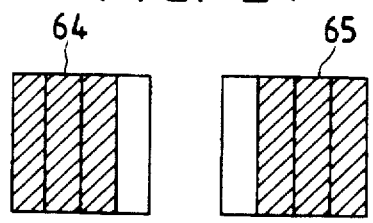
FIG. 22
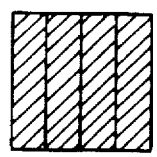
FIG. 23
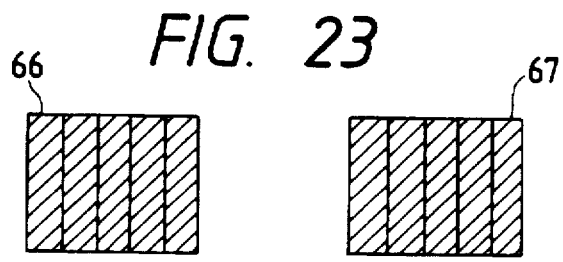
FIG. 24(a)
| | $R_9$ | $R_{10}$ | $R_{11}$ | $R_{12}$ |
|---|---|---|---|---|
| $R_{17}$ | $R_1$ | $R_2$ | $R_3$ | $R_{18}$ |
| | $R_4$ | $R_0$ | $R_5$ | $R_{21}$ |
| $R_{19}$ | $R_6$ | $R_7$ | $R_8$ | $R_{20}$ |
| | $R_{13}$ | $R_{14}$ | $R_{15}$ | $R_{16}$ |
FIG. 24(b)
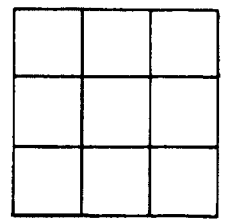

FIG. 25(I)        FIG. 25(II)        FIG. 25(III)
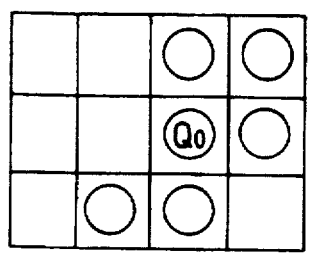 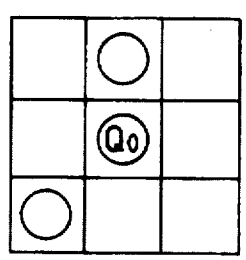 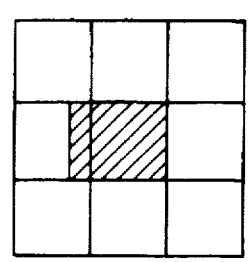
FIG. 26(I)        FIG. 26(II)        FIG. 26(III)
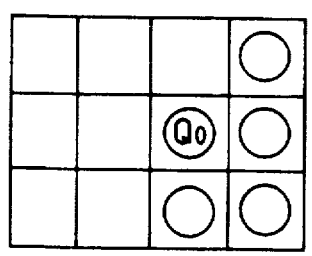 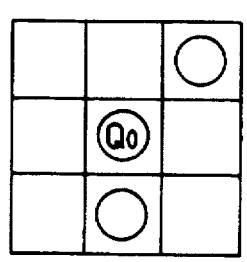 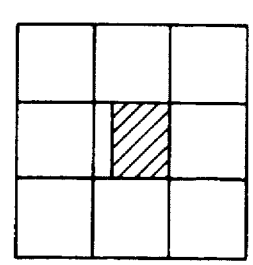
FIG. 27(I)
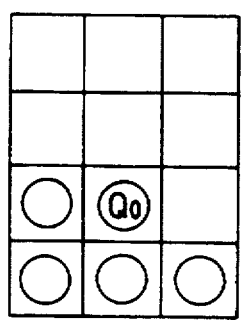
FIG. 27(II)        FIG. 27(III)
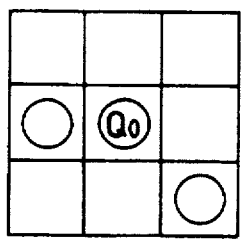 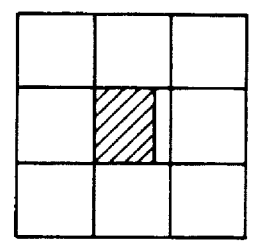
FIG. 28(I)
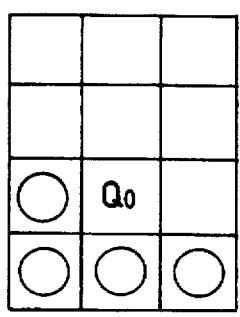
FIG. 28(II)        FIG. 28(III)
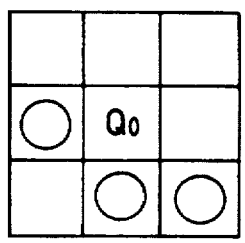 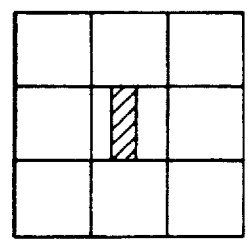

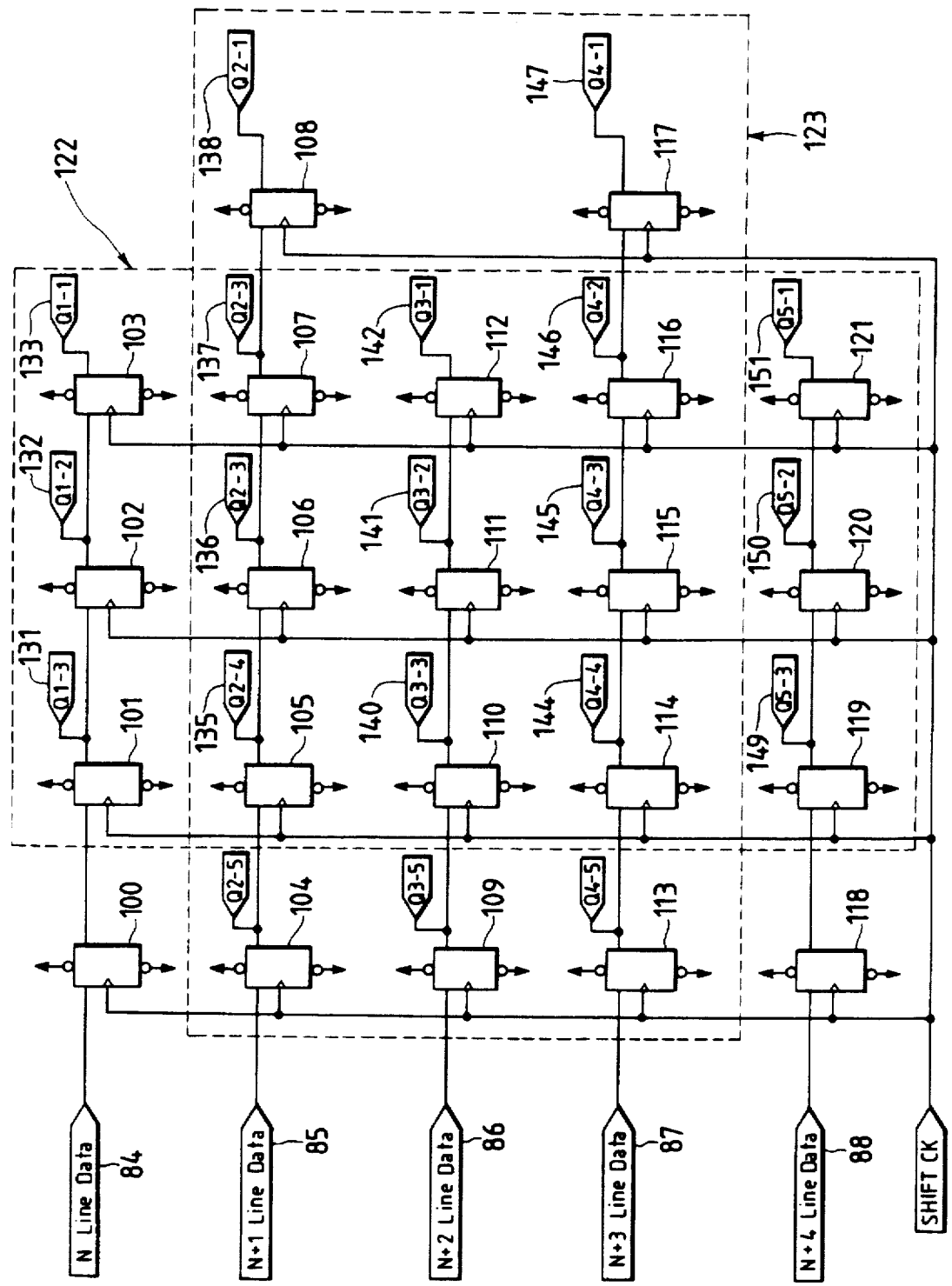

METHOD AND APPARATUS FOR GENERATING BIT MAP IMAGE DATA

This is a continuation-in-part of application Ser. No. 07/815,251, filed Dec. 31, 1991.

BACKGROUND OF THE INVENTION

The present invention relates to a method and apparatus for generating print data suitable for a laser printer which effects writing on an electrostatic photoconductor as a latent image by subjecting a laser beam to on-off modulation on the basis of data representing a character pattern as a bit map, and in which, after toner is electrostatically attracted to the latent image, the image is transferred to recording paper so as to print a character or an image.

A laser printer is capable of printing characters and images with very high resolution by increasing the modulation accuracy of a laser beam. For this purpose, it is necessary to compose image data to be printed in the form of a high-density bit map pattern. In order to output character data of such a high-density bit map pattern, much time and labor are involved in the preparation of the data, and a large-capacity storage device for storing the same is required. This disadvantageously entails an increased cost of the apparatus.

To overcome such a problem, U.S. Pat. No. 4,847,641 discloses a technique whereby character pattern data corresponding to a character code outputted from a host apparatus or the like is stored in a first-in first-out memory, a dot located at a position where printing is to be effected and a plurality of dots surrounding that dot are sampled from the first-in first-out memory, and the sampled bit map pattern is compared with pattern data for comparison, such as a multiplicity of templates or matching bit map data prepared in advance. If the sampled bit map pattern matches the pattern data for comparison, the sampled bit map pattern is replaced with a correction dot pattern allotted to the pattern data for comparison, and this correction dot pattern is outputted as print data.

According to this technique, since the bit map pattern data outputted from a character generator can be corrected as necessary, it is possible to print a character pattern having a smooth contour without increasing the storage capacity of the character data storage means.

However, since the bit map pattern itself which is stored in the first-in first-out memory is used as an object of pattern matching, the number of data for which pattern matching is to be effected increases. Hence, in order to complete the pattern matching calculation within a time period during which one dot is printed, a large-scale calculation circuit is disadvantageously required.

SUMMARY OF THE INVENTION

Accordingly, a primary object of the present invention is to provide a novel method for generating bit map image data for a laser beam printer capable of effecting high-speed calculation by reducing, as much as possible, the number of data used in calculation at the time of correcting a dot to be printed.

To this end, in accordance with a first aspect of the invention, there is provided a method for generating bit map image data, comprising the steps of: converting coded data outputted from an external device into bit map data and storing a portion of a plurality of lines of the bit map data in a memory; obtaining horizontal contour data and vertical contour data by digitally differentiating the bit map data in the memory in horizontal and vertical directions while reading each portion of one column by N lines or M columns by one line; determining positional relationship between dot data subject to printing and dot data not subject to printing on the basis of the contour data; and converting the dot data subject to printing to a dot of a predetermined size and outputting the dot of the predetermined size as print data on the basis of a result of determination.

Consequently, according to the invention, the bit map data stored in the memory is read in increments of one column by N lines or M columns by one line, while being stored in a shift register of size M columns by N lines, and the bit map data is differentiated in the vertical and horizontal directions so that only the data representing a contour portion is outputted. As a result, data relating to dots which clearly constitute continuous portions is excluded, so that the number of data to be used for calculation in succeeding processes is reduced remarkably. The data representing the contour portion is used as data for classifying discontinuous points with respect to the horizontal and vertical directions. This data for classifying discontinuous points is used for determining the relationship of a focused point subject to printing with respect to surrounding dots, i.e., whether the focused point is in a continuous relationship or in a discontinuous relationship with the same. In a case a dot subject to printing concerns a discontinuous point, that dot is replaced by a dot of a smaller size than a predetermined normal dot, or a dot is newly added in the case of a vacant portion, depending on the form of discontinuity. It has been confirmed that the method of reading the bit map data of the memory every one column by N lines is superior in processing speed to the method of reading the bit map data every M columns by one line.

A second object of the present invention is to provide an apparatus for generating the above-described bit-map image data.

To this end, in accordance with a second aspect of the invention, there is provided an apparatus for generating laser beam bit-map image data, comprising: an image memory for storing a portion of a plurality of lines of bit map data of a serial signal format outputted from a character generator; memory control means for sequentially extracting a portion of one column by N lines or M columns by one line of data from the image memory each time one-bit signal is outputted from the character generator; sampling means for storing the data read from the image memory while shifting the data by each portion of M columns by N lines; first edge detecting means for digitally differentiating the data stored in the sampling means in the direction of lines; second edge detecting means for digitally differentiating the data stored in the sampling means in the direction of columns; first classifying means for classifying the relationship of connection between a point subject to printing and vertical dots including the point on the basis of edge data from the first edge detecting means; second classifying means for classifying the relationship of connection between the point subject to printing and horizontal dots including the point on the basis of edge data from the second edge detecting means; determining means for outputting correction dot data whose size of a dot to be printed and position within the size of a normal dot have been determined on the basis of the data from the first and second classifying means; and pulse-width modulating means for outputting the dot for printing on the basis of a signal from the determining means.

DESCRIPTION OF THE DRAWINGS

FIG. 14 is a diagram illustrating the relationship between original patterns and data obtained by classifying signals from an edge detecting circuit by a logical circuit;

FIG. 15 is another diagram illustrating the relationship between original patterns and data obtained by classifying signals from the edge detecting circuit by the logical circuit;

FIG. 16 is still another diagram illustrating the relationship between original patterns and data obtained by classifying signals from the edge detecting circuit by the logical circuit;

FIG. 17 is a further diagram illustrating the relationship between original patterns and data obtained by classifying signals from the edge detecting circuit by the logical circuit;

FIG. 18 is a further diagram illustrating the relationship between original patterns and data obtained by classifying signals from the edge detecting circuit by the logical circuit;

FIG. 19 is a further diagram illustrating the relationship between original patterns and data obtained by classifying signals from the edge detecting circuit by the logical circuit;

FIG. 20 is a diagram schematically illustrating unit dot data outputted from a pulse-width modulating circuit;

FIG. 21 is another diagram schematically illustrating unit dot data outputted from the pulse-width modulating circuit;

FIG. 22 is still another diagram schematically illustrating unit dot data outputted from the pulse-width modulating circuit;

FIG. 23 is a further diagram schematically illustrating unit dot data outputted from the pulse-width modulating circuit;

FIGS. 24a and 24b are a diagram illustrating an example of a sampling window;

FIGS. 25 I, 25 II and 25 III are an explanatory diagram illustrating a case in which a correction is made by adding a dot to the left side of a horizontal rising portion in a process of correction by applying the bit map data on the character "$" shown in FIG. 4;

FIGS. 26 I, 26 II and 25 III are an explanatory diagram illustrating a case in which a correction is made by shaving a left side portion of a dot in a horizontal rising portion in the process of correction by applying the bit map data on the character "$" shown in FIG. 4;

FIGS. 27 I, 27 II and 27 III are an explanatory diagram illustrating a case in which a correction is made by shaving a left side portion of a vertical rising portion in the process of correction by applying the bit map data on the character "$" shown in FIG. 4;

FIGS. 28 I, 28 II and 28 III are an explanatory diagram illustrating a case in which a correction is made by adding a dot in a vacant portion located on the left-hand side of a vertical rising portion in the process of correction by applying the bit map data on the character "$" shown in FIG. 4;

FIG. 33 is a circuit diagram illustrating an example of a shift register constituting the sampling window;

DESCRIPTION OF THE PREFERRED EMBODIMENTS

Figure 1:
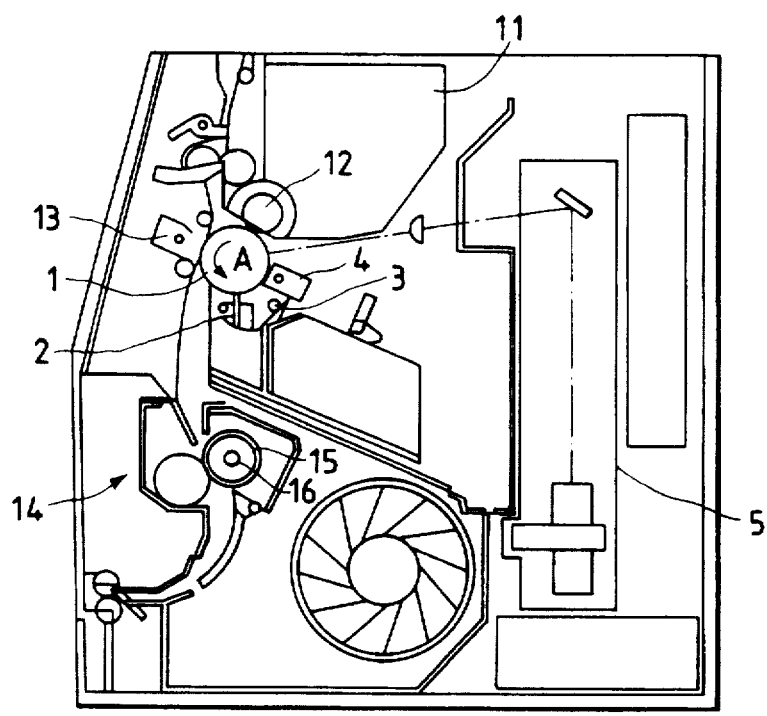
FIG. 1 is a schematic side view of a laser printer to which the present invention is applied.

FIG. 1 illustrates the configuration of an example of a laser printer, in which a photoconductor drum 1 is arranged such that a photoconductive layer is formed on the surface of a drum driven by a motor in a direction indicated by an arrow A in the drawing. Before print data is written on the photoconductor drum 1, toner remaining on its surface is removed by means of a rubber blade 2, and residual charge is eliminated by being discharged by uniform irradiation with light from an erase lamp 3. After cleaning, ions generated by a charge generator, e.g., a corona discharge unit 4, are supplied to the photoconductor drum 1, so that the photoconductor drum 1 is charged to a fixed surface potential. At a stage where such preparations have been completed, the photoconductor drum 1 is irradiated with a laser beam from a laser-beam generator 5, thereby allowing data to be written in a selected area.

Figure 2:
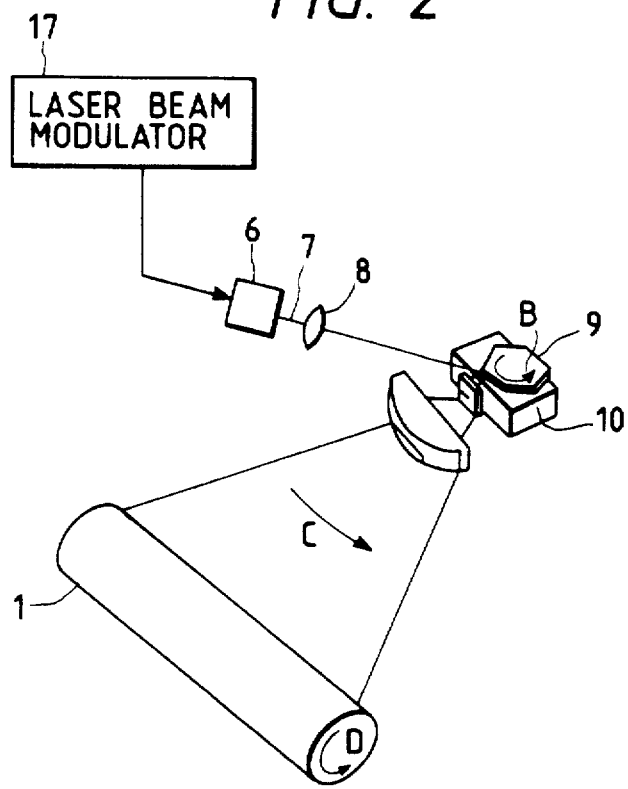
FIG. 2 is a diagram showing a control unit for modulating a laser beam of the apparatus shown in FIG. 1.

The laser beam is modulated as electric power supplied to cause a laser diode to emit light, as shown in FIG. 2, is turned on and off in conformity with data to be printed. A laser beam 7 from the laser diode 6 is collimated by a collimator lens 8 and is then converged onto a scanning mirror 9. The scanning mirror 9 is a regular polygon mirror secured to a rotating shaft of a motor 10 and effects horizontal scanning across the surface of the photoconductor drum 1 as the laser beam is moved horizontally in the direction of reference character C in the drawing as the scanning mirror 9 is rotated by means of the motor 10 rotating in a direction indicated by reference character B in the drawing.

While the laser beam scans the length of the photoconductor drum 1, the photoconductor drum 1 also rotates in the direction of arrow D, so that the entire surface of the photoconductor drum 1 is covered with a raster image. Since the rotating speed of the motor 10 for driving the scanning mirror 9 and that of the motor for driving the photoconductor drum 1 are set to synchronize, scanning with the laser beam per cycle is offset by a predetermined interval, e.g., by 1/300 inch, in the circumferential direction. In a case where printing is to be effected with a required resolution, e.g., a resolution necessary for forming correction data while the laser beam advances by 1 inch (24.5 mm) on the surface of the photoconductor drum 1, for instance, in a case where printing of dot data outputted from a character generator is effected with a 1/300 inch dot, a correction is made with a resolution four-fold the same, and hence the laser diode 6 is adapted to be able to be turned on and off 1200 times while the laser beam advances one inch. As a result, it is possible to virtually realize a resolution of 300 dots/inch in the circumferential direction×1200 dots/inch in the horizontal direction for the photoconductor drum as a whole.

When the writing by means of the laser beam is completed in the above-described manner, portions which were not subjected to irradiation with the laser beam still maintain a high negative potential, while portions which were subjected to the irradiation discharge charged particles and rise to a low negative potential.

In a development unit 11, on the basis of a potential difference on the photoconductor drum surface, toner is caused by a toner sleeve 12 to be rubbed against only those portions where writing has been effected, so as to allow the toner to be selectively attracted by such portions, thereby converting a latent image to a toner image.

In a transfer unit 13, the toner image on the photoconductor drum surface is transferred to recording paper. The recording paper is conveyed at the same speed as the peripheral speed of the photoconductor drum 1 while being in contact with the photoconductor drum 1, and the toner on the photoconductor drum 1 is drawn thereto by means of an electric field applied through the rear surface of the recording paper so as to adhere to the surface of the recording paper. The photoconductor drum 1 further rotates as it is, and is then subjected to the aforementioned cleaning process so as to prepare for forming an ensuing electrostatic image. In a thermal fixing unit 14, the toner image transferred to the recording paper is thermally fused so as to fix the toner image to the recording paper. The thermal fixing unit 14, which is arranged by incorporating a heater 16 in a roller 16, is adapted to heat the toner image on the recording paper while applying pressure thereto so as to fuse toner particles and allow the same to adhere to the recording paper through fusion.

Figure 3:
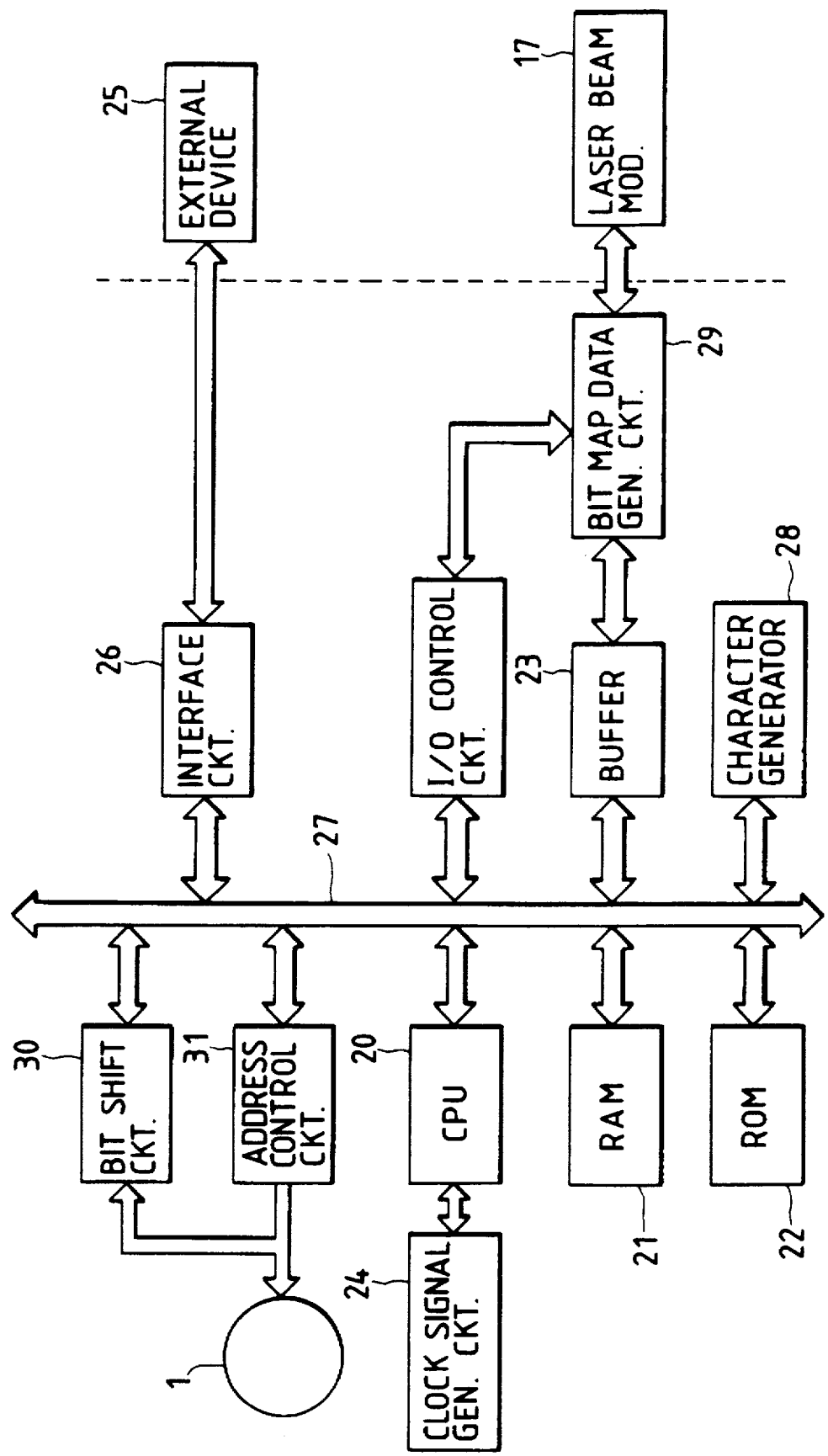
FIG. 3 is a block diagram of a control circuit of the laser printer using a bit-map-data generating circuit in accordance with the present invention.

FIG. 3 illustrates an example of a control unit for controlling all the operations of the printing process, and which controls the light controlling unit and the photoconductor drum by correcting the dot pattern data in correspondence with print data. The control unit includes a central processing unit (CPU) 20, a RAM 21 constituting a main storage unit and an external storage device, a microcomputer constituted by a ROM 22 for storing a program for controlling the various operations, a character generator 28 incorporating a font storage unit in which data concerning a character set is stored, and a buffer 23 for storing image data to be inputted directly as a bit map pattern and bit map data from the character generator 28.

The central processing unit 20 receives a clock signal supplied from a clock signal generating circuit 24. Coded data outputted from an external device 25 such as a personal computer is fetched by a bus 27 via an interface circuit 26, processed by a printer control command, converted to basic bit map data for modulating the laser beam by the character generator 28, and then stored in the buffer 23. As for this bit map data, its size and position are corrected by a bit-map-data generating circuit 29 in correspondence with the relationship between the dot subject to printing and other dots located in the horizontal and vertical directions of that dot, as will be described later in detail, before the bit map data is outputted to a laser beam modulator 17. In addition, the central processing unit 20 controls the rotation of the photoconductor drum 1 by controlling the photoconductor drum 1 via a bit shift circuit 30 and an address control circuit 31 so as to render the rotation of the photoconductor drum 1 suitable for the writing of data.

Figure 4:
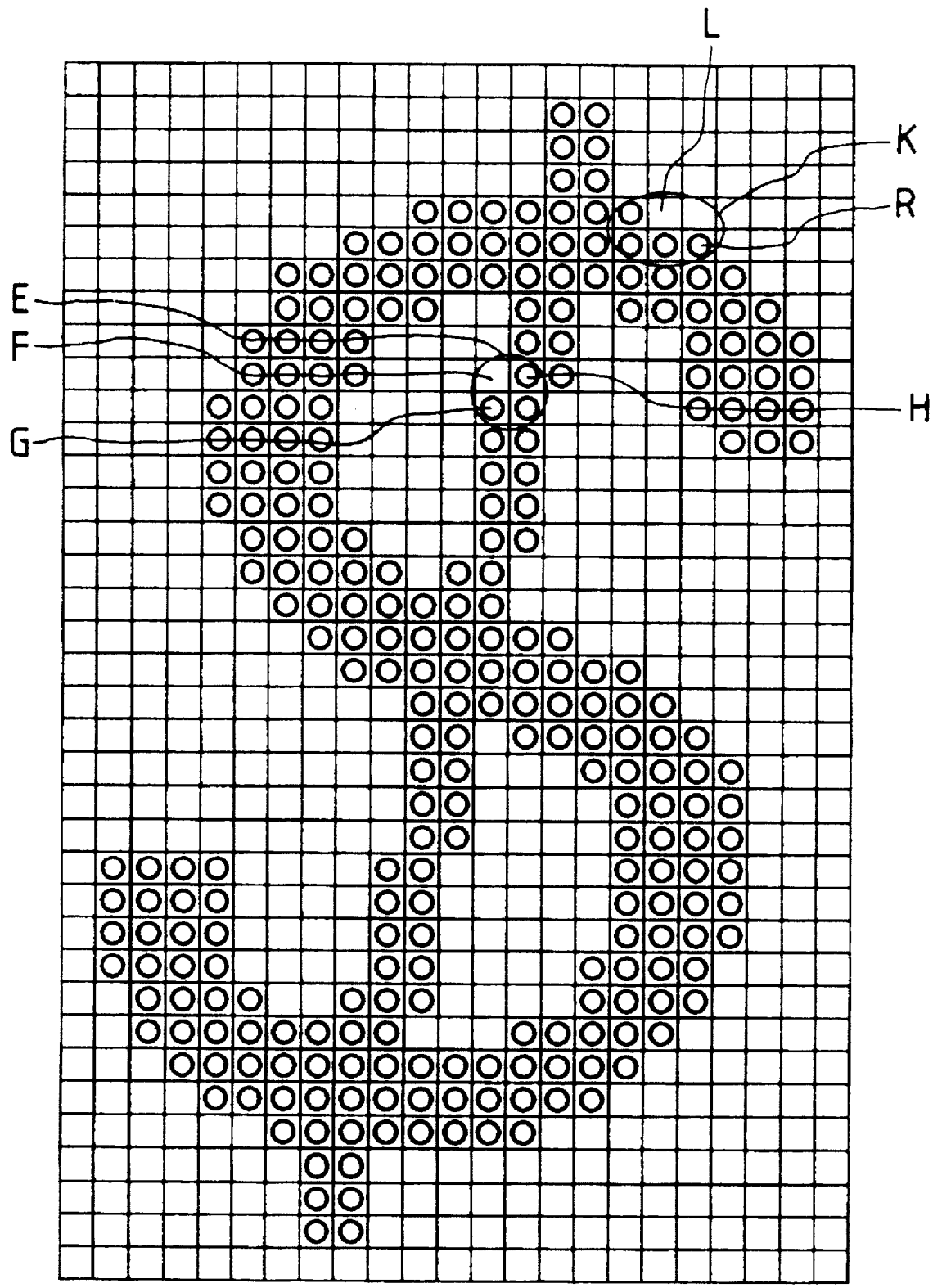
FIG. 4 is a diagram illustrating a bit map pattern outputted from a buffer showing the character "$" as an example.

The aforementioned bit-map-data generating circuit 29 is used to correct the bit map data, such as the one shown in FIG. 4, outputted from the character generator 28 into a smooth pattern, and is connected between the character generator 28 and the laser beam modulator 17.

When, for instance, the character "$" composed by a combination of a curved line and a slanted line as shown in FIG. 4 is outputted from the buffer 23, the bit-map-data generating circuit 29 provides an output by adding a small dot F' (FIG. 29) to a vacant portion F constituting a part of the area indicated by within a circle denoted by reference character E in the drawing, by shaving a dot G constituting a stepped portion (G' in FIG. 29), and by replacing with a small dot R' (FIG. 29) a dot R constituting a stepped portion of the area shown within an ellipse denoted by reference character K in the drawing.

A coded signal for designating the character "$" outputted from an external device such as a personal computer is used for reading from the font storage unit data for generating a bit map pattern corresponding to that coded signal. The coded signal is converted to bit map data, shown in FIG. 4, by the character generator 28, and is stored in the buffer 23.

If the bit map data outputted from the buffer 23 is directly outputted to the laser beam modulator 17 without being corrected, stepped portions attributable to positional changes in the standard bit size are printed, as described before, with the result that the printed pattern lacks smoothness. That is, since the buffer 23 stores patterns composed using only standard size dots for the purpose of reducing the required storage capacity as much as possible, the amount of minimum projection of a dot cannot be set to be smaller than a standard dot. For this reason, in the case of representing a slanted line or a curved line by means of dots, it is inevitable to cause the dots to project or to be recessed horizontally or vertically in units of dots.

Figure 5:
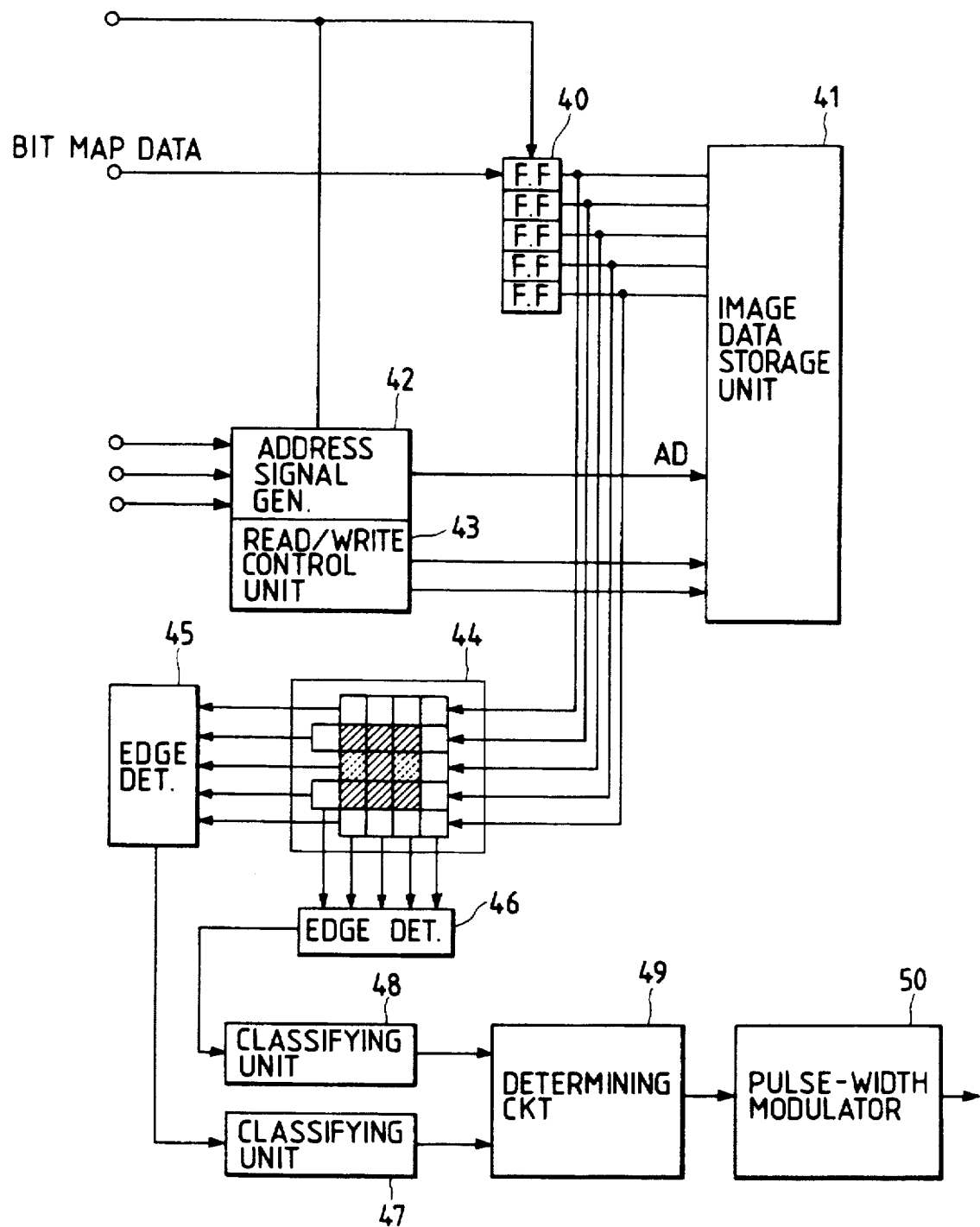
FIG. 5 is a schematic diagram illustrating an example of a bit-map-data generating circuit.
Figure 29:
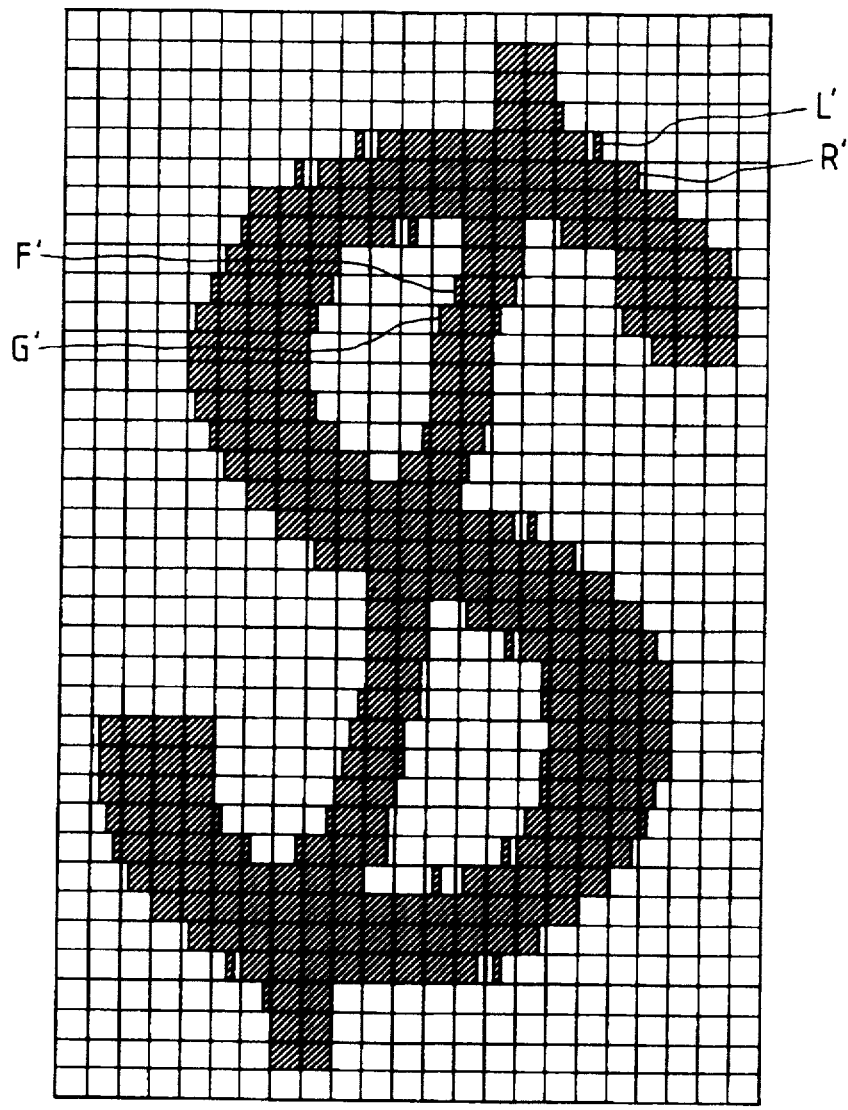
FIG. 29 is a diagram illustrating a result of correction by applying the bit map data on the character "$" shown in FIG. 4.

FIG. 5 shows an example of the bit-map-data generating circuit denoted by reference numeral 29 in FIG. 29.

While the bit pattern data of a serial signal format outputted from the character generator 28 is shifted one bit at a time in the column direction, i.e., is being moved by each line by means of shift registers constituted by flip-flops FF denoted by reference numeral 40 in the drawing and adapted to shift the data in the column direction, the bit pattern data is stored in an image data storage unit 41 constituted by a static random access memory. Such storage of data is effected by an address signal generator 42 operating with reference to a horizontal synchronizing signal from a detector for detecting a scan starting point of the laser beam, as well as a write/read control unit 43. At a stage where data for a plurality of lines, i.e., five lines in this example, has been stored in the image data storage unit 41, the address signal generator 42 and the write/read control unit 43 read data on each column with N lines from the image data storage unit 41 in synchronism with the timing of printing each dot, and sequentially output the same to a shift register 44 of M columns×N lines. After the data is stored in the shift register 44, a succeeding signal indicative of a one-bit portion outputted in serial signal format is stored in the image data storage unit 41. The data stored in the shift register 44 is digitally differentiated in the horizontal and vertical directions by a first edge detector 45 and a second edge detector 46 in synchronism with the write/read timings of the address signal generator 42 and the write/read control unit 43, thereby extracting data on a contour portion.

Figure 6:
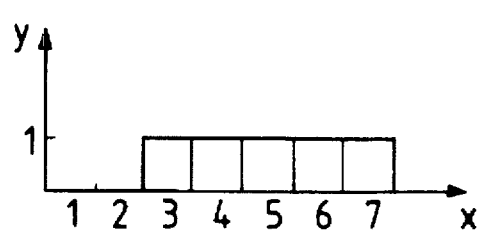
FIG. 6 is a diagram illustrating digital differentiation with respect to a horizontal direction for obtaining contour data, and is a diagram illustrating data prior to differentiation.
Figure 7:
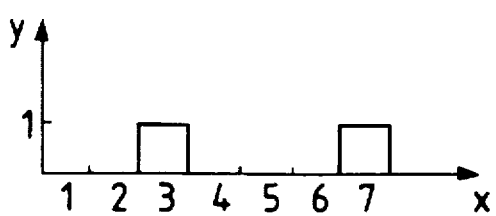
FIG. 7 is a diagram illustrating data obtained by differentiating the data shown in FIG. 6.

As used herein, to digitally differentiate in the horizontal direction means that, with reference to an example of data in which dots continue from a third bit to a seventh bit, as shown in FIG. 6, when viewed from the left end (the print starting side), a signal "1" is generated at the position (third bit) where a dot is present following a vacant portion, and in a case where a vacant portion is present following a dot, a signal "1" is generated at the position (seventh bit) where the final dot is present, as shown in FIG. 7.

Figure 8:
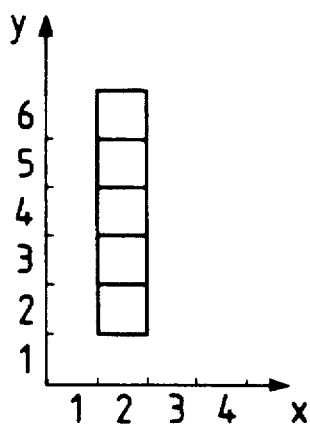
FIG. 8 is a diagram explaining digital differentiation with respect to a vertical direction for obtaining contour data, and is a diagram illustrating data prior to differentiation.
Figure 9:
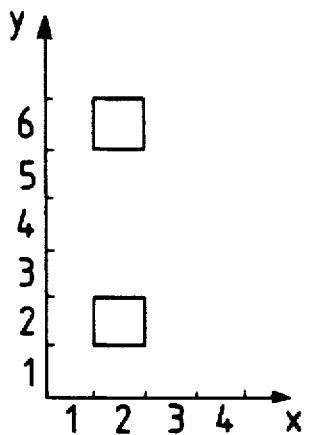
FIG. 9 is a diagram illustrating data obtained by differentiating the data shown in FIG. 8.

In addition, to digitally differentiate in the vertical direction means that, with reference to an example of a pattern which continues from a second bit to a sixth bit in the Y-axis direction, as shown in FIG. 8, when viewed from the top, the signal "1" is generated at the position (x=2, y=6) where a dot is present following a vacant portion, and the signal "1" is generated at the position (x=2, y=2) where a vacant portion is present following a dot, as shown in FIG. 9.

Figure 10:
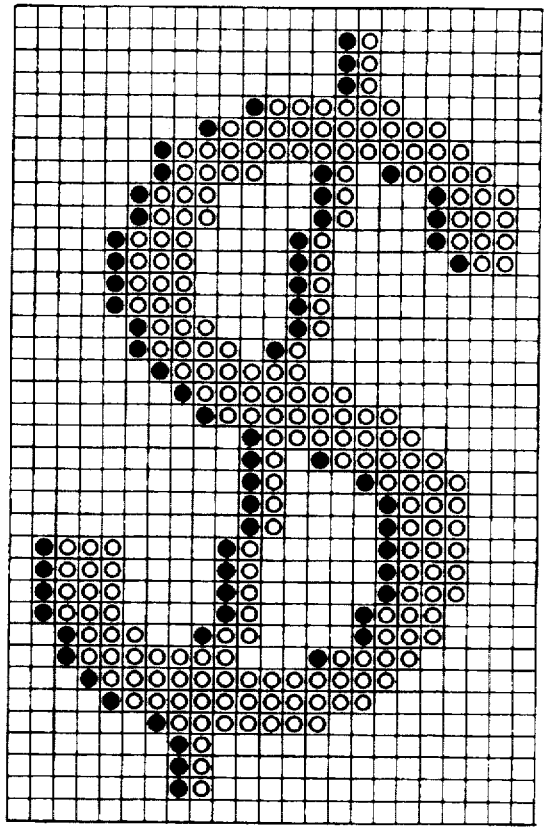
FIG. 10 is a diagram illustrating a rising edge, as viewed from the left-hand side in the horizontal direction, obtained by differentiating the pattern of the character "$" shown in FIG. 4.
Figure 11:
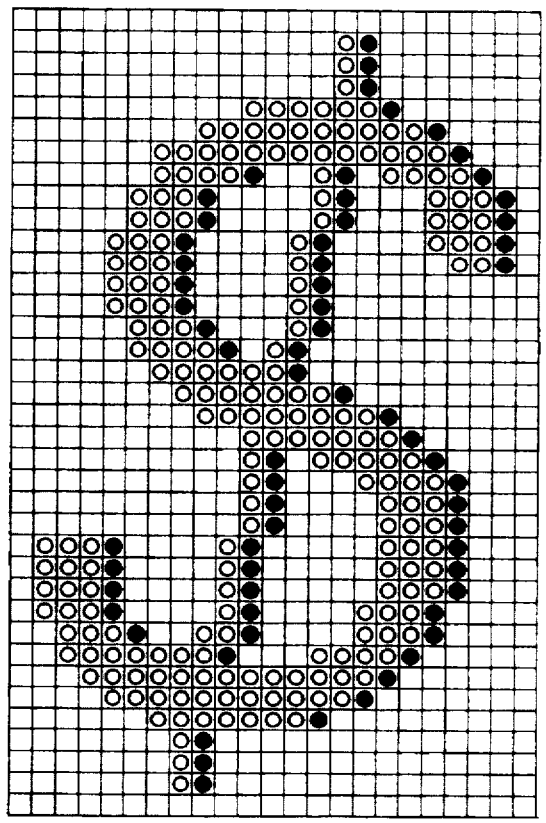
FIG. 11 is a diagram illustrating a rising edge, as viewed from the horizontal direction, obtained by differentiating the pattern of the character "$" shown in FIG. 4.
Figure 12:
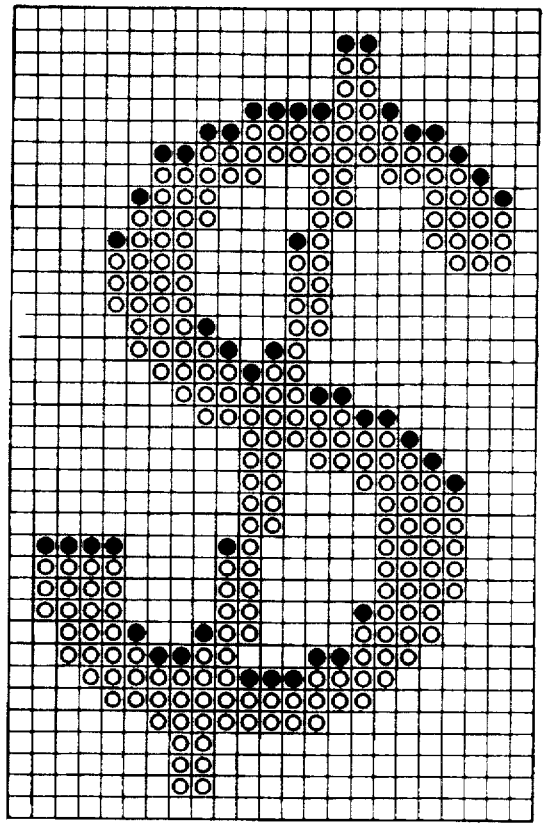
FIG. 12 is a diagram illustrating a rising edge, as viewed from the top in the vertical direction, obtained by differentiating the pattern of the character "$" shown in FIG. 4.
Figure 13:
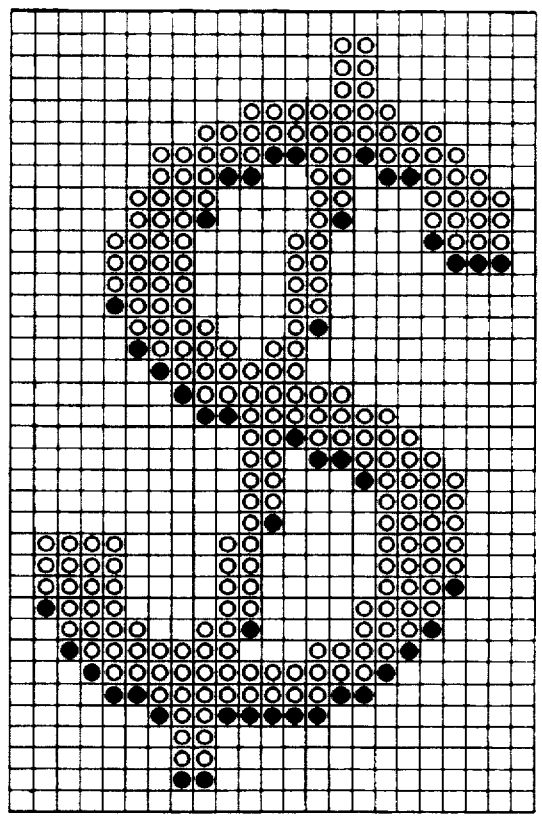
FIG. 13 is a diagram illustrating a falling edge, as viewed from the top in the vertical direction, obtained by differentiating the pattern of the character "$" shown in FIG. 4.

If the bit map data of the character "$" shown in FIG. 4 is differentiated using such a method, the data concerning horizontal rising edges is indicated by black dots in FIG. 10, while the data concerning horizontal falling edges is indicated by black dots in FIG. 11. Moreover, the data concerning vertical rising edges is indicated by black dots in FIG. 12, while the data concerning vertical falling edges is indicated by black dots in FIG. 13.

The rising and falling edge data obtained by horizontally differentiating the bit map data represent the vertical characteristic of the bit map data, while the rising and falling edge data obtained by vertically differentiating the bit map data represent the horizontal characteristic of the bit map data.

If an examination is made of the correlation between the original pattern and the data on the horizontal rising and falling edges and the vertical rising and falling edges thus obtained from the bit map data of the original pattern, it is possible to determine the relation in which the dot subject to printing is placed with respect to the surrounding dots, i.e., whether that dot constitutes one of a series of horizontally or vertically contiguous dots, or constitutes a discontinuous portion.

That is, the form of boundary portions of the bit map data from the buffer 23 can be ascertained if the data on the horizontal rises and falls and the vertical rises and falls is sampled by M columns×N lines surrounding a focused point, i.e., a position subject to printing, and if these data are classified into a plurality of kinds of form and are determined by using first and second classifying units 47, 48 constituted by logical devices such as gate arrays.

FIGS. 14 to 19 show relationships between classifications obtained by sampling original patterns by means of a 3 columns ×3 lines size sampling window and by logically determining data on edge portions obtained by differentiating the sampled data on the one hand, and data from the character generator. The patterns of a multiplicity (about 6100 kinds) of boundary portions that can possibly be included in original patterns can be classified into a very small number (about 150 kinds) of groups. It should be noted that in the drawings black dots indicate portions where the dots are present, plain circles indicate portions where the dots are not present, and grayish dots denote portions for which the presence or absence of the dots is immaterial.

Figure 14:
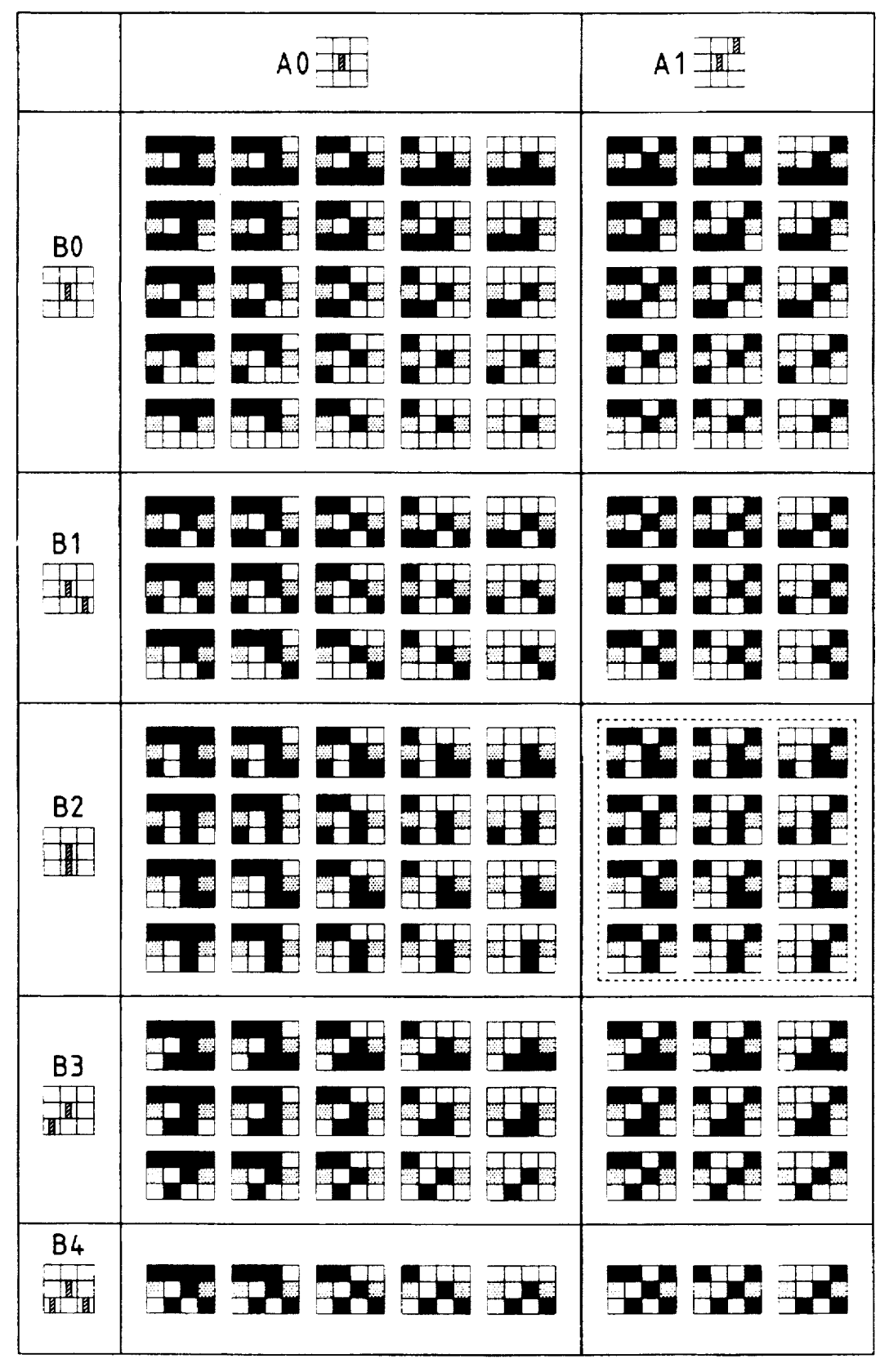
Figure 15:
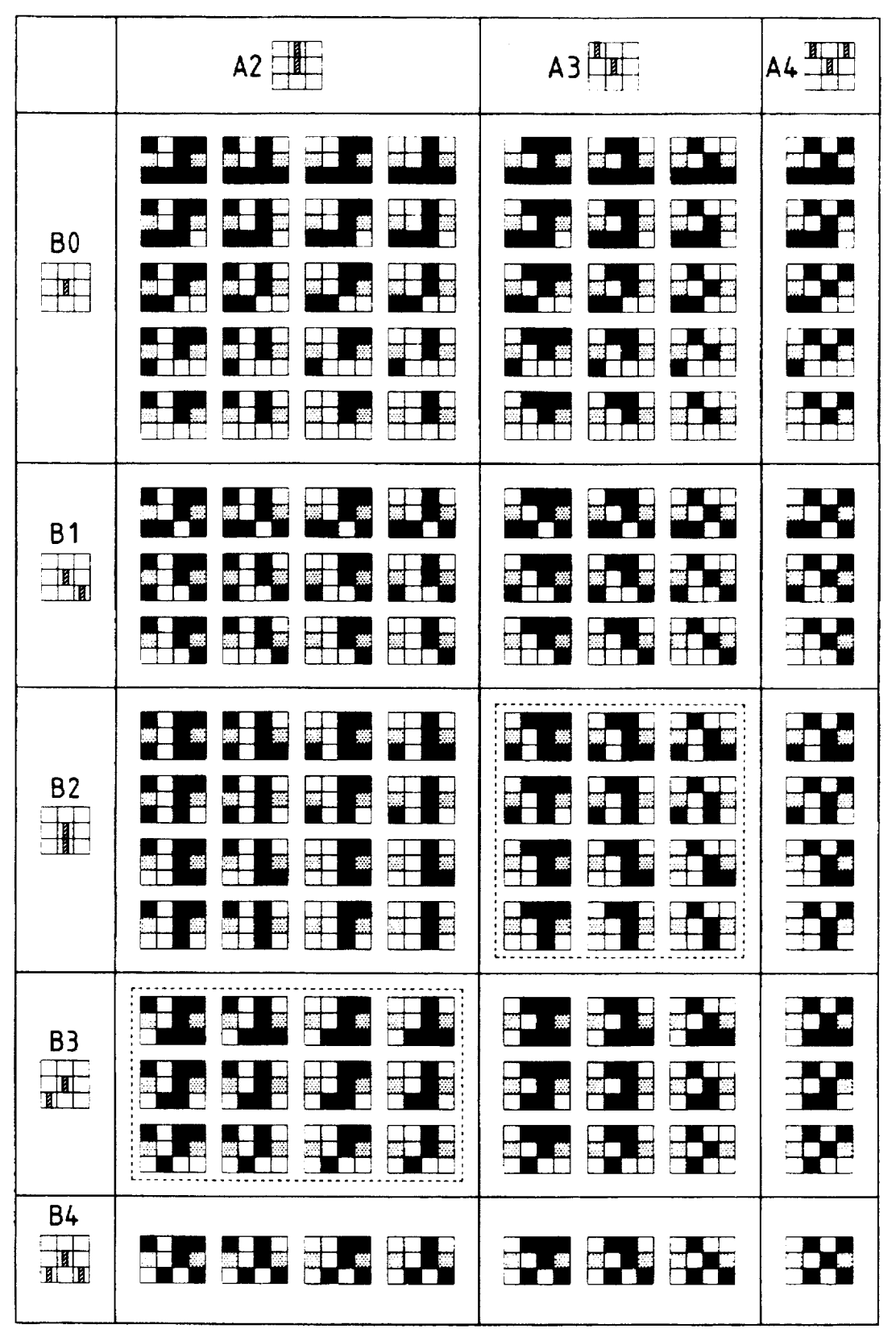

That is, as for the horizontally differentiated data, if these data are classified by focusing on the patterns of an upper region including the focused point and by assigning classification codes A0–A4 to their configurations, and by focusing on the patterns of a lower region including the focused point and by assigning classification codes B0–B4 to their configurations, and if the original patterns are classified on the basis of these classification codes, patterns as shown in FIGS. 14 and 15 can be obtained.

Figure 16:
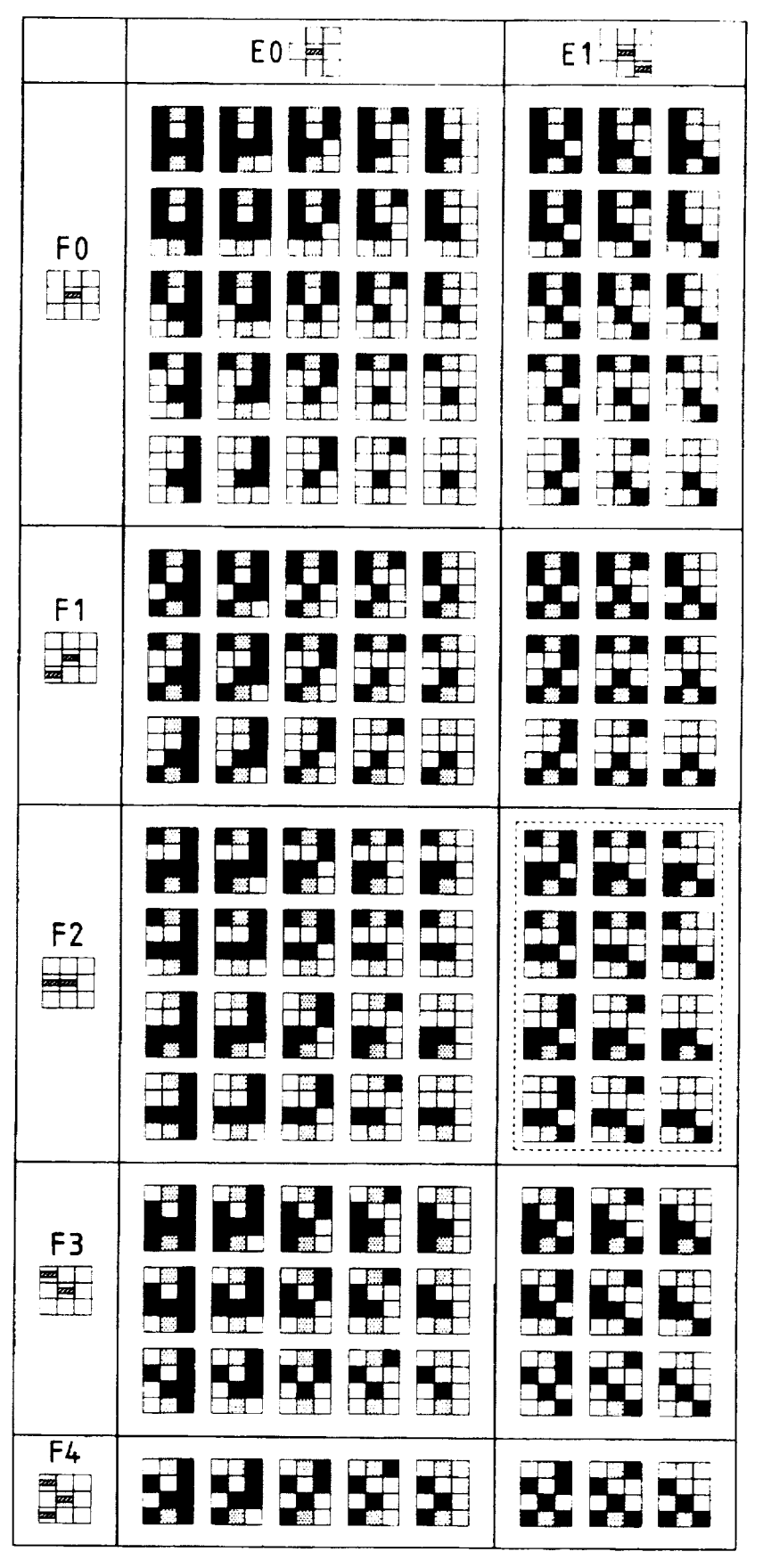
Figure 17:
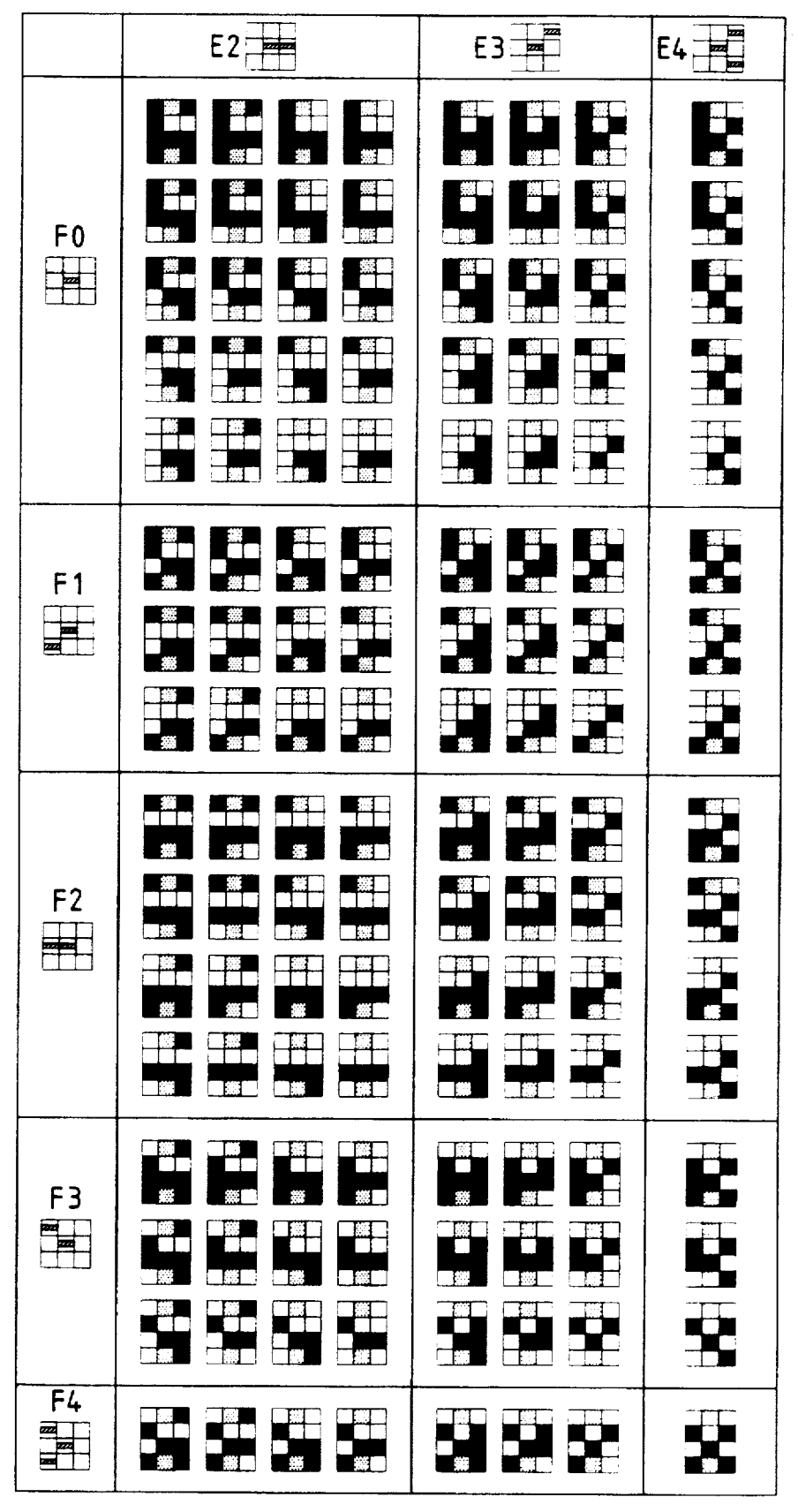

In addition, as for the rising edges obtained by vertically differentiating original patterns, if these data are classified by focusing on the patterns of a right-hand region including the focused point and by assigning classification codes E0–E4 to their configurations, and by focusing on the patterns of a left-hand region including the focused point and by assigning classification codes F0–F4 to their configurations, and if the original patterns are classified on the basis of these classification codes, patterns as shown in FIGS. 16 and 17 can be obtained.

Figure 18:
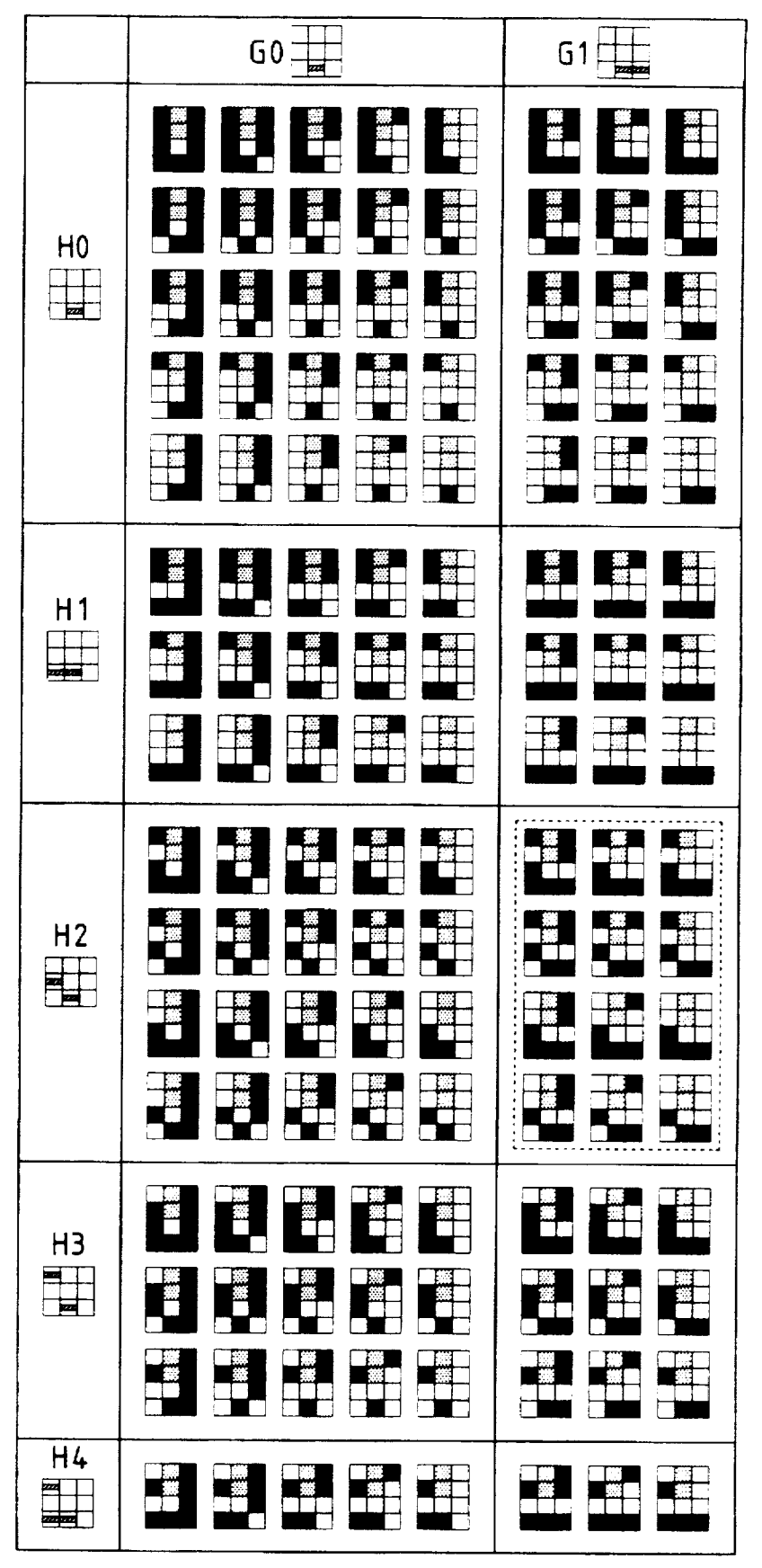

Furthermore, if the rising edge data obtained by vertically differentiating original patterns are classified by focusing on the patterns of a region located rightwardly of the dot just below the focused point and by assigning classification codes G0–G4 to their configurations, and by focusing on the patterns of a region located leftwardly of the dot just below the focused point and by assigning classification codes H0–H4 to their configurations, and if the original patterns are classified on the basis of these classification codes, patterns as shown in FIGS. 18 and 17 can be obtained.

The results thus obtained by determining the configurations by means of the classifying units 47, 48, i.e., A0–A4, B0–B4, C0, C4, D0, D4, E0–E4, F0–F4, G0–G4, and H0–H4, are used in determining by a determining circuit 49 to which form, i.e., to which of the groups of the patterns classified in FIGS. 14 to 19, the data on the focused point belongs.

On the basis of the data from the first and second classifying units 47, 48, the determining circuit 49 determines which of the data is to be assigned among the data shown in FIGS. 20 to 23.

The result of determination by the determining circuit 49 is used in generating data with varying pulse widths such as those shown in FIGS. 20 to 23 by means of a pulse modulator 50. In other words, the result of determination is converted to data for printing the following dot patterns: a pattern in which, if ¼ of the size of one normal dot of the bit map data outputted from the buffer 23 is assumed to be a unit size, the position of the dot of this unit size is offset by ¼ a normal dot pitch, (60, 61, 62, 63 in FIG. 20); a pattern in which the position of a dot three-fold the unit size is offset by ¼ dot pitch, i.e., the right- or left-hand side of the normal-size dot is shaved by ¼ dot (64, 65 in FIG. 21); a pattern having a dot four-fold the unit size, i.e., the normal dot (FIG. 22); a pattern having a size of ⁵⁄₄ dot projecting toward the print starting side (i.e., leftward in the drawing) by the unit size as compared with the normal dot (66 in FIG. 23); and a pattern having a size of ⁵⁄₄ dot projecting rightward in the drawing by the unit size as compared with the normal dot (67 in FIG. 23).

The shift register 44 constitutes a sampling window with 3 columns×3 lines, as shown in FIG. 24(a), in which data on the focused point is stored at a central position R0; the data on the line immediately preceding the line including the focused point is stored in R1 to R3; the data on the same line as that of the focused point and located just before and after the focused point is stored in R4 and R5; and the data on the line immediately following the line including the focused point is stored in R6 to R8. In addition, auxiliary data for calculating data on boundary portions at the time of vertical differentiation is stored in R9 to R16, while auxiliary data for calculating such data at the time of horizontal differentiation is stored in R17 to R20. That is, data on an (n−2)th line is stored in the regions R9 to R12; data on an (n−1)th line is stored in the regions R17, R1 to R3, R18; data on the n-th line is stored in the regions R4, R0, R5, R21; data on the (n+1)th line is stored in the regions R19, R6 to R8, R20; and data on the (n+2)th line is stored in the regions R13 to R16. The data on the same column is inputted by a portion of one column with five lines starting with the right-hand side in the drawing, and is shifted toward the left-hand side in the drawing by each portion of one column with five lines.

For this reason, with respect to an example of, for instance, the bit map pattern shown in FIG. 4, in a case where the vacant portion F in the area indicated by reference character E in the drawing has is to be printed (a focused point), a determination is made not at that point of time but when a dot H constituting an adjacent rising edge is stored in the focused point R0 of the shift register 44. That is, a determination is made at a point of time when data such as the one shown in FIG. 25(I) is stored in the shift register 44. Consequently, edge data such as the one shown in FIG. 25(II) is outputted from the first edge detector 45. The classifying circuit 47 effects a determination by classifying this edge data (FIG. 25(II)) into an upper pattern including the focused point R0 and a lower pattern including the focused point R0 by means of the above-described technique, thereby classifying the former pattern as A2 and the latter pattern as B3 (FIG. 15). It is thereby determined that the focused point R0 presently stored in the shift register 44 is a dot falling under a group of patterns surrounded by a dotted-line block in FIG. 15. As a result, it is determined that it is necessary to add a ¼ dot to the position located one space ahead of the focused point R0, i.e., to the vacant portion F. Hence, a command is given to print a dot, such as the one shown in FIG. 25(III) of the same drawing, i.e., a dot (FIG. 23) longer along the left-hand side by ¼ a dot than the normal dot. It should be noted that since these calculated results are outputted at a stage which will be in time for printing at least ¼ dot ahead of a timing for starting the actual printing, the irradiation point of the laser beam is present at the vacant portion F.

As a result, as the printing of the dot is started at a point of time when the laser beam has passed the vacant portion F by ¾ a dot width, a pattern in which ¼ of a dot is added in the vacant portion F, as indicated by reference numeral 66, is printed. That is, F' shown in FIG. 29 is printed.

In addition, when G in the circle denoted by reference character E becomes a focused point Q0, a pattern such as the one shown in FIG. 26(I) is stored in the shift register 44, with the result that data shown in FIG. 26(II) is outputted from the edge detector 45. The classifying circuit 47 classifies the upper pattern including the focused point Q0 as A1 and the lower pattern including the focused point Q0 as B2. As a result, the patterns including the focused point Q0 and presently stored in the shift register 44 are classified as A1 and B2 (patterns surrounded by a block indicated by a dashed line in FIG. 14). The determining circuit 49 outputs a signal for printing a dot (the dot denoted by reference numeral 65 in FIG. 21) (FIG. 26(III)) in which the left-hand side of the normal dot is shaved by ¼ dot. When the laser beam has further moved to the right-hand side by ¼ dot after reaching the focused point Q0 upon the outputting of the calculated result, the printing of the dot obtained by the calculated result is commenced, thereby printing the pattern indicated as G' in FIG. 29. In consequence, the vacant portion F which forms the stepped portion indicated by E in FIG. 4 is formed by dots which consecutively become larger as viewed from the top in the order of ¼ dot and ¾ dot, so that the vacant portion F is converted to a smooth pattern.

With respect to horizontally extending lines as well, the dots are corrected through similar processing. That is, as for the stepped portion indicated by the ellipse K in FIG. 4, when the dot R is stored in the shift register 44 as the focused point Q0, data shown in FIG. 27(I) is stored, so that vertically differentiated data (FIG. 27(II)) from the edge detector 48 is used. The classifying circuit 48 classifies the right-hand pattern including the focused point Q0 as E1 and the left-hand pattern including the same as F2 (the patterns surrounded by a block indicated by a dotted line in FIG. 16). The determining circuit 49 outputs a signal for printing a dot (FIG. 27(II)) in which the right-hand side of the normal dot is shaved by ¼ dot. The laser beam is activated until the laser beam moves to the right-hand side by ¾ dot after reaching the focused point Q0 upon the outputting of the calculated result, thereby printing a pattern indicated by R' in FIG. 29.

Furthermore, when a vacant portion L surrounded by reference character K becomes the focused point Q0, a pattern as shown in FIG. 28(I) is stored in the shift register 44, and edge data, such as that shown in FIG. 28(II), is outputted from the edge detector 46 as the vertically differentiated pattern. The classifying circuit 48 classifies a right-hand region of the pattern one dot below the focused point Q0 as G1 and a left-hand region of that pattern as H2 (a block shown surrounded by a dotted line in FIG. 18). On the basis of this classified result, the determining circuit 49 outputs a dot denoted by reference numeral 61 in FIG. 20, thereby printing in the vacant portion L the dot denoted by reference numeral L' in FIG. 29.

Thereafter, as described above, the array of dots in the sampling region is classified on the basis of the horizontally and vertically differentiated data of the original pattern, and if it is determined as a result of this classification that the focused point corresponds to an edge portion, an operation is conducted in which a dot smaller than the normal dot is added in a vacant portion horizontally adjacent to the focused point, the dot at the focused point is corrected into a small dot by being shaved, or in a case where an edge portion is present adjacent to the focused point even if the focused point is a vacant portion, a dot smaller than the normal dot is added.

Although in FIG. 29 the dots are each shown as having a square configuration to facilitate an understanding of the description, at the stage where the dots are printed on recording paper, the dots assume a smooth configuration since the small dots are fused with each other in such a manner as to be attracted by the surrounding normal dots owing to the expansion and blurring of the laser beam, electrostatic induction of the dots on the photoconductor drum, the size of the toner particles, and the like. As a result, each stepped portion resulting from a normal-size dot is filled with a small dot, thereby creating a smoothly rising or falling portion.

As described above, since the arrangement provided in the present invention is such that portions requiring correction are detected by using as index data the data on contour portions obtained by differentiating the original pattern, patterns of about 6100 kinds or thereabouts can be classified into about 150 kinds or thereabouts. Accordingly, it is possible to not only simplify the circuit configuration but also effect a calculation by software within the time period for printing one dot, so that it is possible to implement the apparatus not only in hardware but also in software.

Specific examples of the units performing the above-described operations are described below with reference to the timing chart of FIG. 30.

Figure 31:
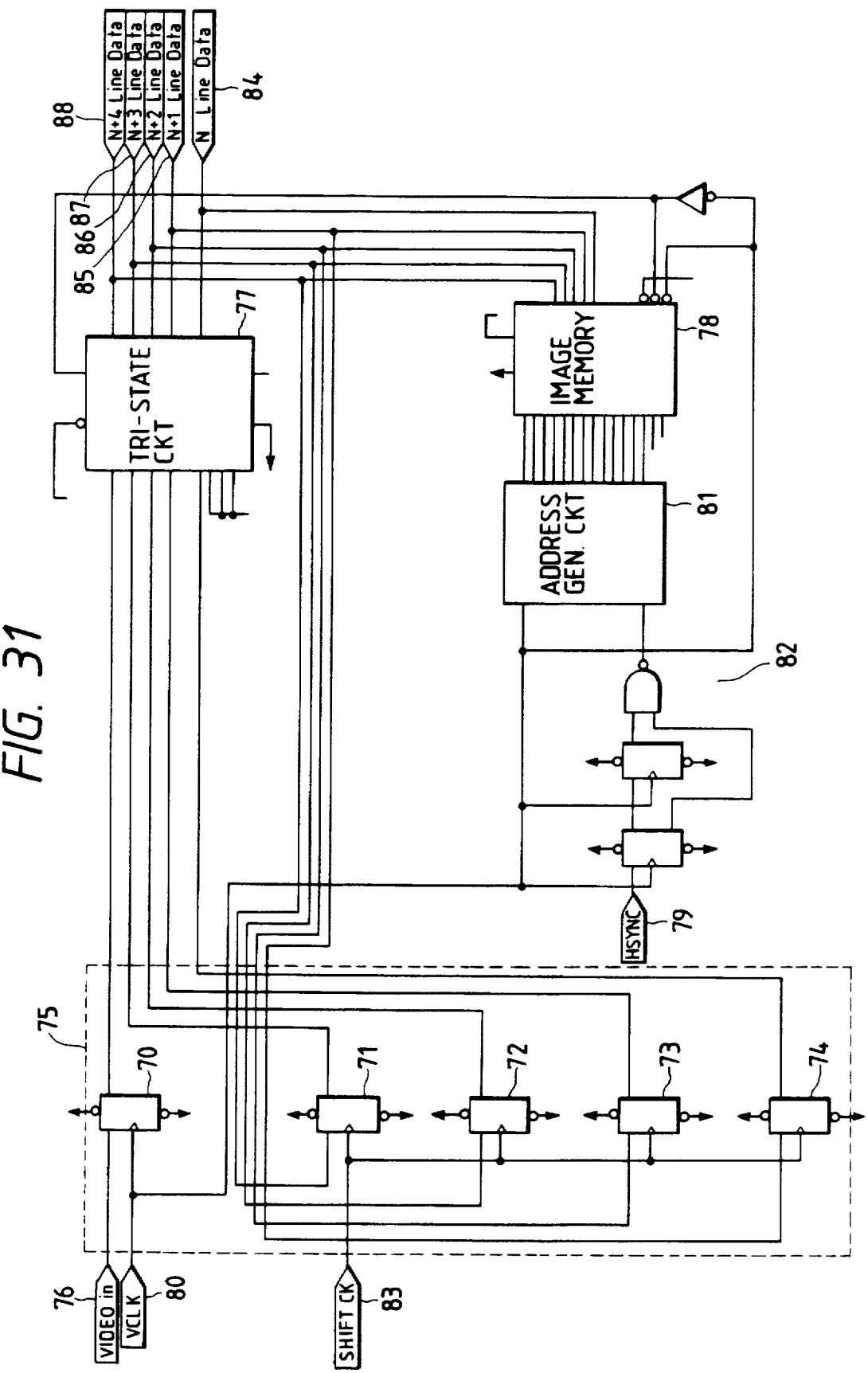
FIG. 31 is a circuit diagram illustrating an example of a memory device for storing video data outputted from a buffer.

FIG. 31 illustrates an example of the image data storage unit for storing data of the serial signal format outputted from the buffer 23.

Flip-flops 70, 71, 72, 73, 74 constitute a vertical shift register 75 for sequentially shifting a video signal (VIDEO) of the serial signal format from the buffer 23 which has been inputted to an input terminal 76, in the column direction (i.e., in the sub-scanning direction) by means of a shift signal (SHIFT CK) from an input terminal 83. The output from the shift register 75 is stored in an image memory 78 constituted by a static random access memory or the like via a tri-state circuit 77. The memory 78 is controlled by a horizontal synchronizing signal (HSYNC) at the time of the starting of laser beam scanning which is inputted from an input terminal 79, an address generating circuit 81 which receives a video clock (VCLK) inputted from an input terminal 80, and a control circuit 82 for synchronizing the horizontal synchronizing signal (HSYNC). The memory 78 outputs a portion of one column with five lines of data stored therein through output terminals 84 to 88 during the first half of the video clock, and to store the signal of one bit from the shift register 75 during the latter half of the video clock.

Figure 32:
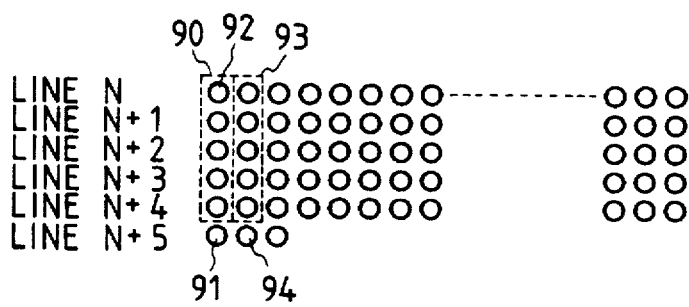
FIG. 32 is a schematic diagram illustrating the storage and reading of data by simulating the operation of the memory device shown in FIG. 31 in the form of printing.

That is, with reference to the form of printing, as shown in FIG. 32, data constituting an N-th line, an (N+1)th line, an (N+2)th line, an (N+3)th line, and an (N+4)th line are stored in the memory 78. In this state, data 90 on the N-th to the (N+4)th lines in the first column is read in the parallel signal format in synchronism with the video clock during the first half of the video clock, while one-bit data 91 on the (N+5)th line in the first column outputted from the buffer is stored during the latter half of the video clock. As a result, data 92 on the N-th line in the first column disappears from the memory 78. Data 93 on the N-th to the (N+4)th lines in the second column is read in the parallel signal format during the first half of an following video clock, while data 94 on the (N+5)th line in the second column is stored in the latter half thereof. Thereafter, the above-described process is repeated.

FIG. 33 illustrates an example of the shift register 44 constituting the above-described sampling window. D-type flip-flops 100 to 103 are connected in series with the output terminal 84 of the image memory 78 shown in FIG. 31; D-type flip-flops 104 to 108 are connected in series with the output terminal 85 of the memory 78; D-type flip-flops 109 to 112 are connected in series with the output terminal 86 of the memory 78; D-type flip-flops 113 to 117 are connected in series with the output terminal 87 of the memory 78; and D-type flip-flops 118 to 121 are connected in series with the output terminal 88 of the memory 78. At the same time, a shift clock (SHIFT CK) is supplied to the respective flip-flops.

Through such connections, the flip-flops 101–103, 105–107, 110–112, 114–116, and 119–121 (surrounded by a dotted-line block indicated by reference numeral 122 in the drawing) constitute a window for detecting edges as viewed vertically.

In addition, the flip-flops 114–117 (surrounded by a block indicated by reference numeral 123) constitute a window for detecting edges as viewed horizontally. The flip-flop 111 located at the central portion of the two blocks stores data on the focused point. It should be noted that although the flip-flops 100, 118 do not contribute to edge detection, they are provided for timing purposes for the shifting of data.

Hence, the data on a portion of one column with five lines outputted from the image memory 78 are stored simultaneously in the flip-flops 100, 104, 109, 113, 118 and are respectively transferred to the flip-flops 101, 105, 110, 114, 119 in the succeeding stages (right-hand side in the drawing) at an ensuing read timing of the memory 78. Concurrently, data on the five lines in an succeeding column are stored in the flip-flops 100, 104,109, 113,118. As a result, the flip-flop 111 for storing the data on the focused point sequentially renews the data on the line subject to printing one bit at a time each time one-bit data is outputted thereto from the buffer.

Figure 34:
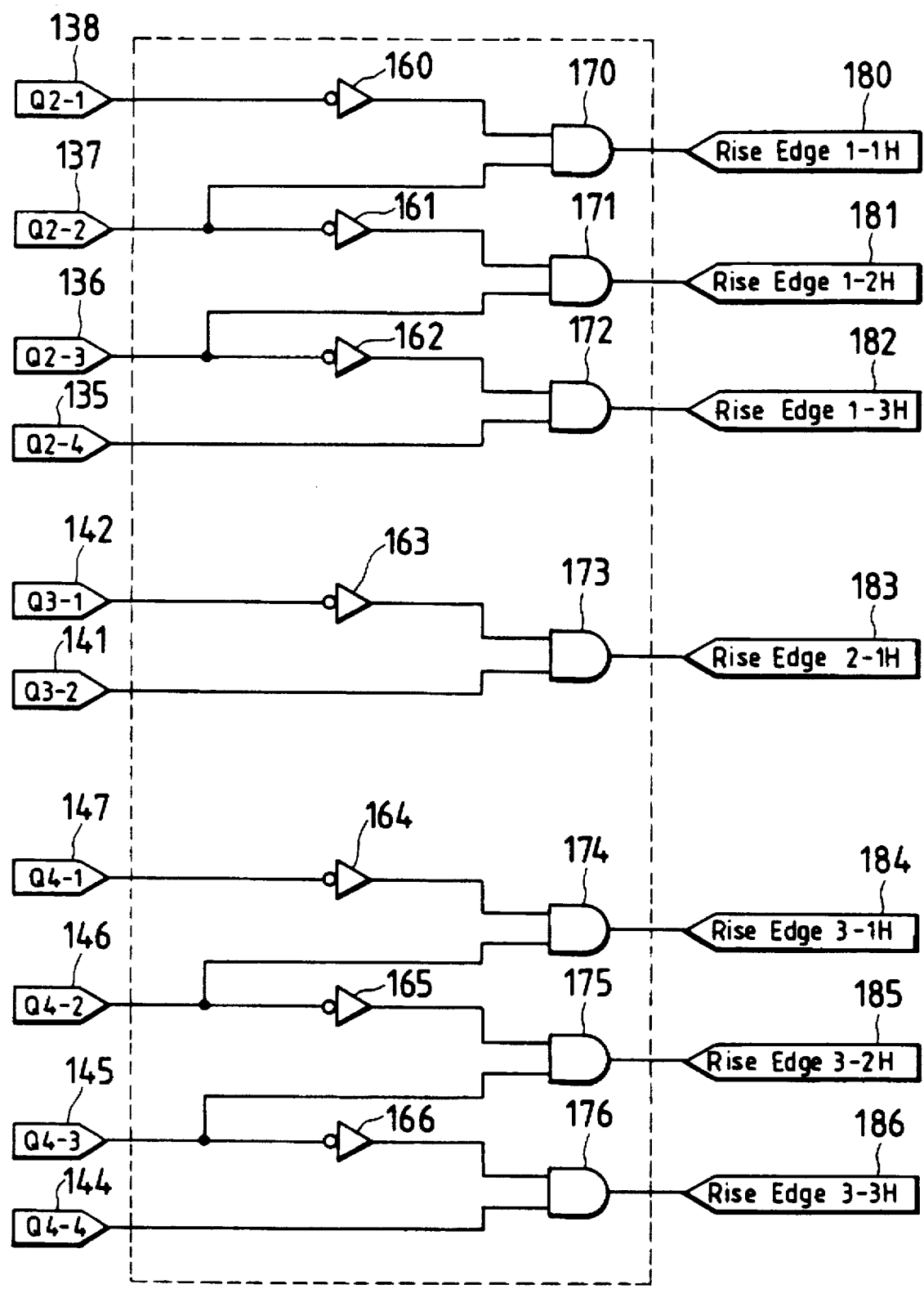
FIG. 34 is a circuit diagram illustrating an example of a rising-portion edge detecting circuit constituting a part of a first edge detector.
Figure 35:
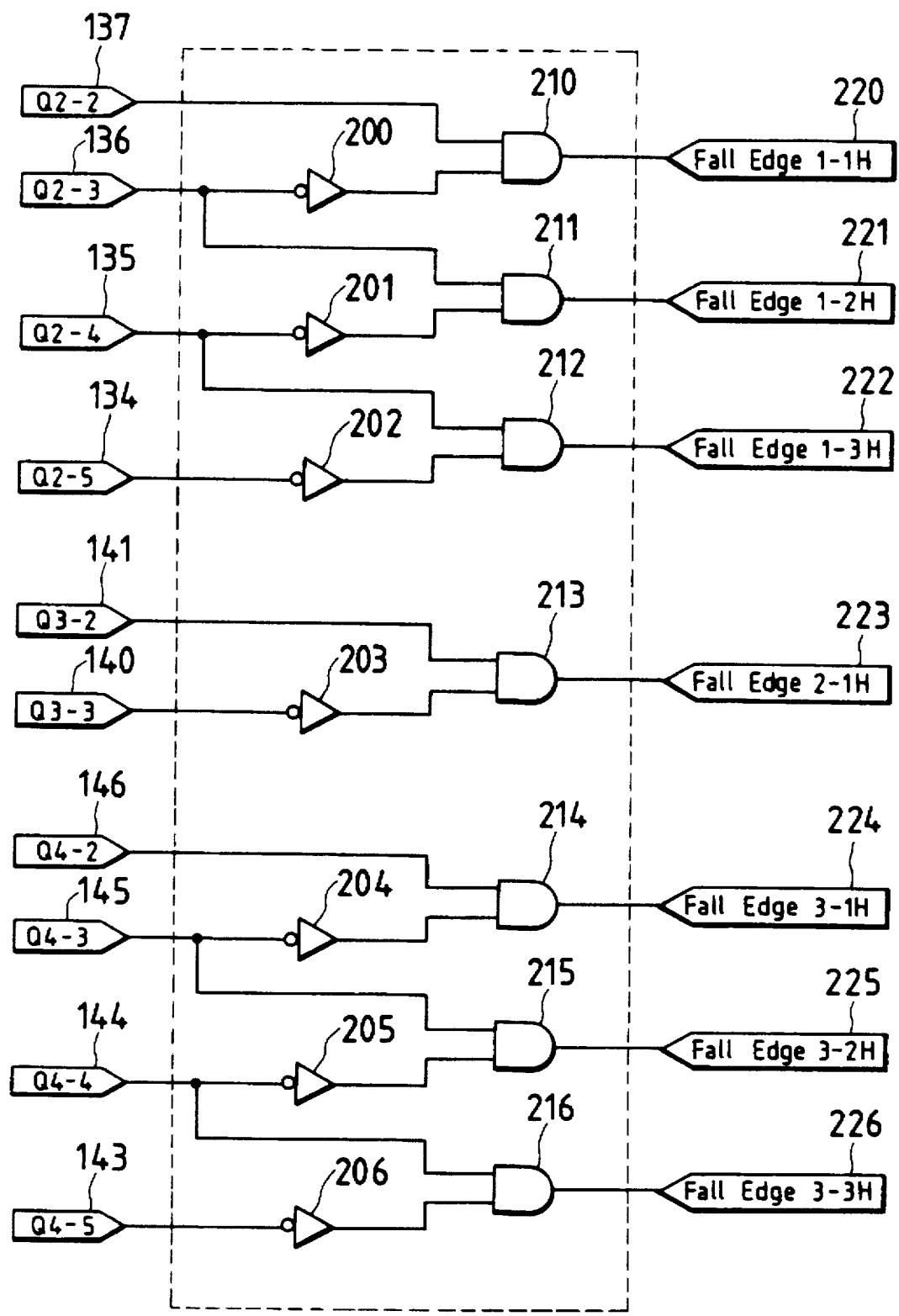
FIG. 35 is a circuit diagram illustrating an example of a falling-portion edge detecting circuit constituting a part of the first edge detector.

FIGS. 34 and 35 illustrate an example of the first edge detector 45. FIG. 34 shows an edge rising-portion edge detecting circuit for detecting a position where a vacant portion is changed over to a dot-present portion when seen from the left-hand side in the horizontal direction, while FIG. 35 shows a falling-portion edge detecting circuit for detecting a position where the dot-present portion is changed over to the vacant portion when seen from the left-hand side in the horizontal direction.

The rising-portion detecting circuit shown in FIG. 34 includes inverters 160–166 and AND gates 170–176. The arrangement provided is such that signals from the flip-flops of the shift register shown in FIG. 33 are inputted to first input terminals of the AND gates 170–176 via the inverters 160–166 and are inputted directly to the other terminals of the AND gates 170–176.

Since the signals inputted via the inverters are signals which are one dot earlier than the signals that are directly inputted, in a case where the signal of a time-wise preceding column is "0" and the signal of an ensuing column is "1"the signal "0" is inputted to a terminal 138, this signal is converted to a "1" by the inverter 160, and the signal "1" is inputted through a terminal 137. As a result, the signal "1" is outputted from the AND gate 170, so that a rising signal "1" is outputted from an output terminal 180.

The falling-portion detecting circuit shown in FIG. 35 includes inverters 200–206 and AND gates 210–216. The arrangement provided is such that signals from the flip-flops of the shift register shown in FIG. 33 are inputted directly to the first input terminals of the AND gates 210–216 and are inputted to the other terminals via the inverters 200–206.

Since the signal inputted directly to the AND gate 210 is a signal one column earlier than the signal inputted via the inverter 200, in a case where the signal of a time-wise preceding column is "1"and the signal of a succeeding column is "0", the signal "1" is inputted to the terminal 137, the signal "0" is inputted to a terminal 136, and this signal is converted to a "1" by the inverter 200. As a result, the signal "1" is outputted from the AND gate 210, so that a falling signal "1" is outputted from an output terminal 220.

Figure 36:
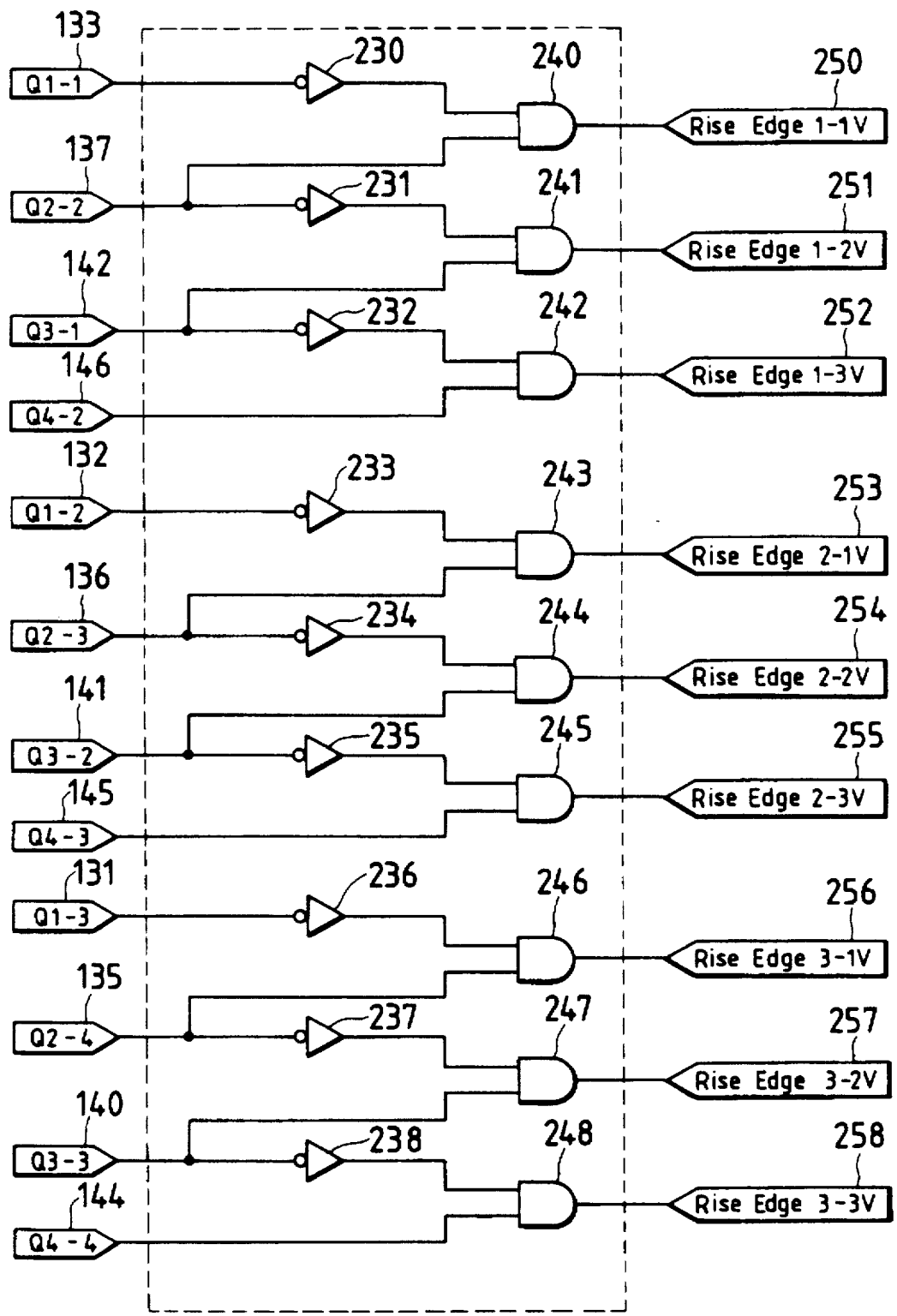
FIG. 36 is a circuit diagram illustrating an example of a rising-portion edge detecting circuit constituting a part of a second/edge detector.
Figure 37:
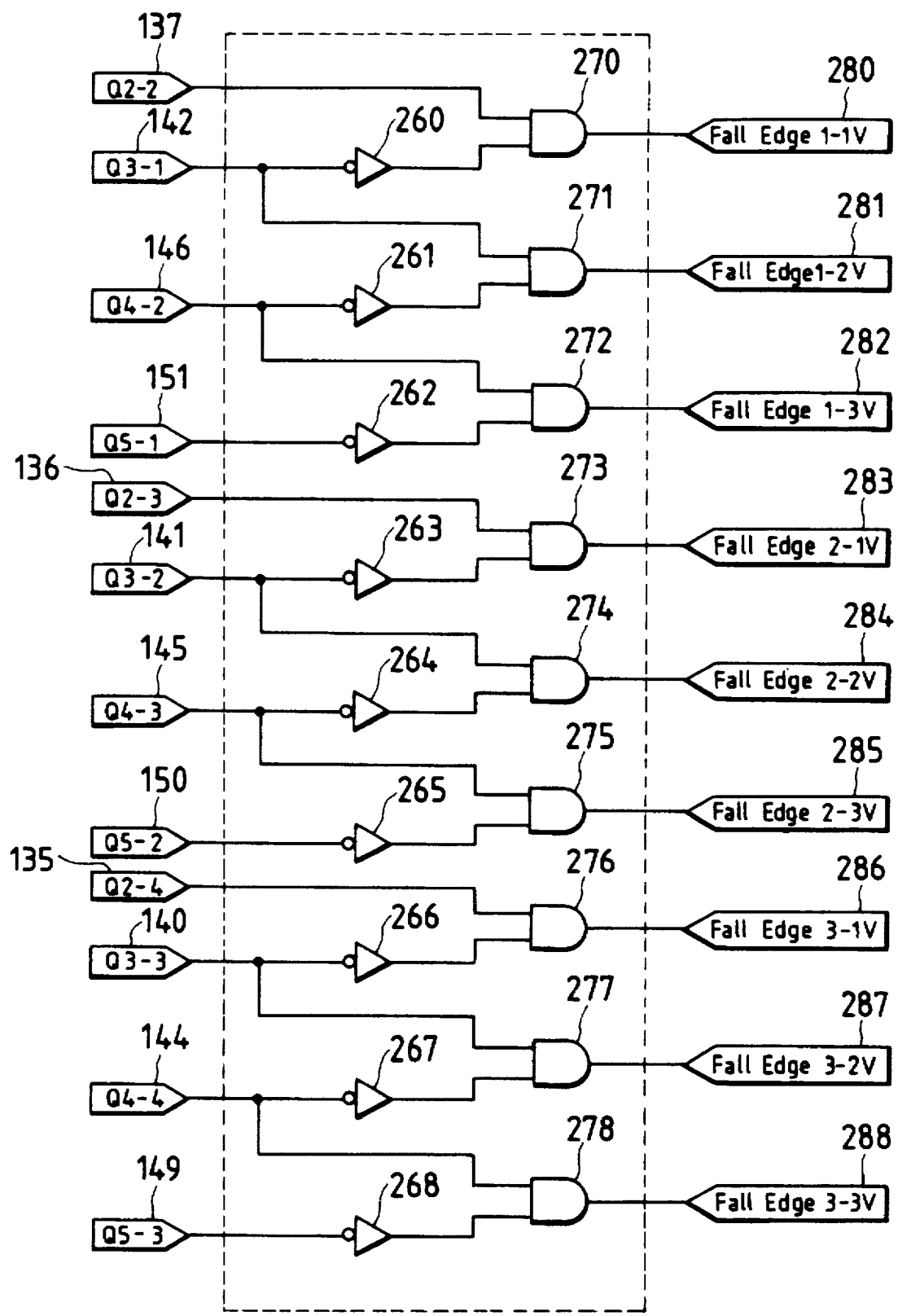
FIG. 37 is a circuit diagram illustrating an example of a falling-portion edge detecting circuit constituting a part of the second edge detector.

FIGS. 36 and 37 illustrate an example of the second edge detector 46. FIG. 36 shows an edge rising-portion detecting circuit for detecting a position where a vacant portion is changed over to a dot-present portion as viewed from the top in the vertical direction, while FIG. 37 shows an edge falling-portion detecting circuit for detecting a position where the dot-present portion is changed over to the vacant portion as viewed from the top in the vertical direction.

The rising-portion detecting circuit shown in FIG. 36 includes inverters 230–238 and AND gates 240–248. The signals from the shift register shown in FIG. 33 are inputted to first input terminals of the AND gates 240–248 via the inverters 230–238, and the signals from the shift register are inputted directly to the other input terminals of the AND gates 240–248.

Since the signals inputted via the inverters are signals which are one line earlier than the signals that are directly inputted, in a case where the signal of a time-wise preceding line is "0", and the signal of a succeeding line is "1", the signal "0" is inputted to a terminal 133, is converted to a "1" by the inverter 230 and is outputted to the AND gate 240, while the signal "1" inputted to the terminal 137 is outputted directly to the AND gate 240. As a result, the signal "1" is outputted from the AND gate 240, so that a rising signal "1" is outputted from an output terminal 250.

The falling-portion detecting circuit shown in FIG. 37 includes inverters 260–268 and AND gates 270–278. The arrangement provided is such that the signals from the shift register are inputted directly to first input terminals of the AND gates 270–276, and the signals from the shift register are inputted to the other input terminals of the AND gates 270–278 via the inverters 260–268.

Since the directly inputted signal is a signal one line earlier than the signal inputted via the inverter 260, in a case where the signal of a time-wise preceding line is "1", and the signal of a succeeding line is "0", the signal "1" is inputted to the terminal 137 and is outputted directly to the AND gate 270, while the signal "0" inputted to a terminal 142 is converted to the signal "1" by the inverter 260 and is outputted to the AND gate 270. As a result, the signal "1" is outputted from the AND gate 270, so that a rising signal "1" is outputted from an output terminal 280.

Figure 38:
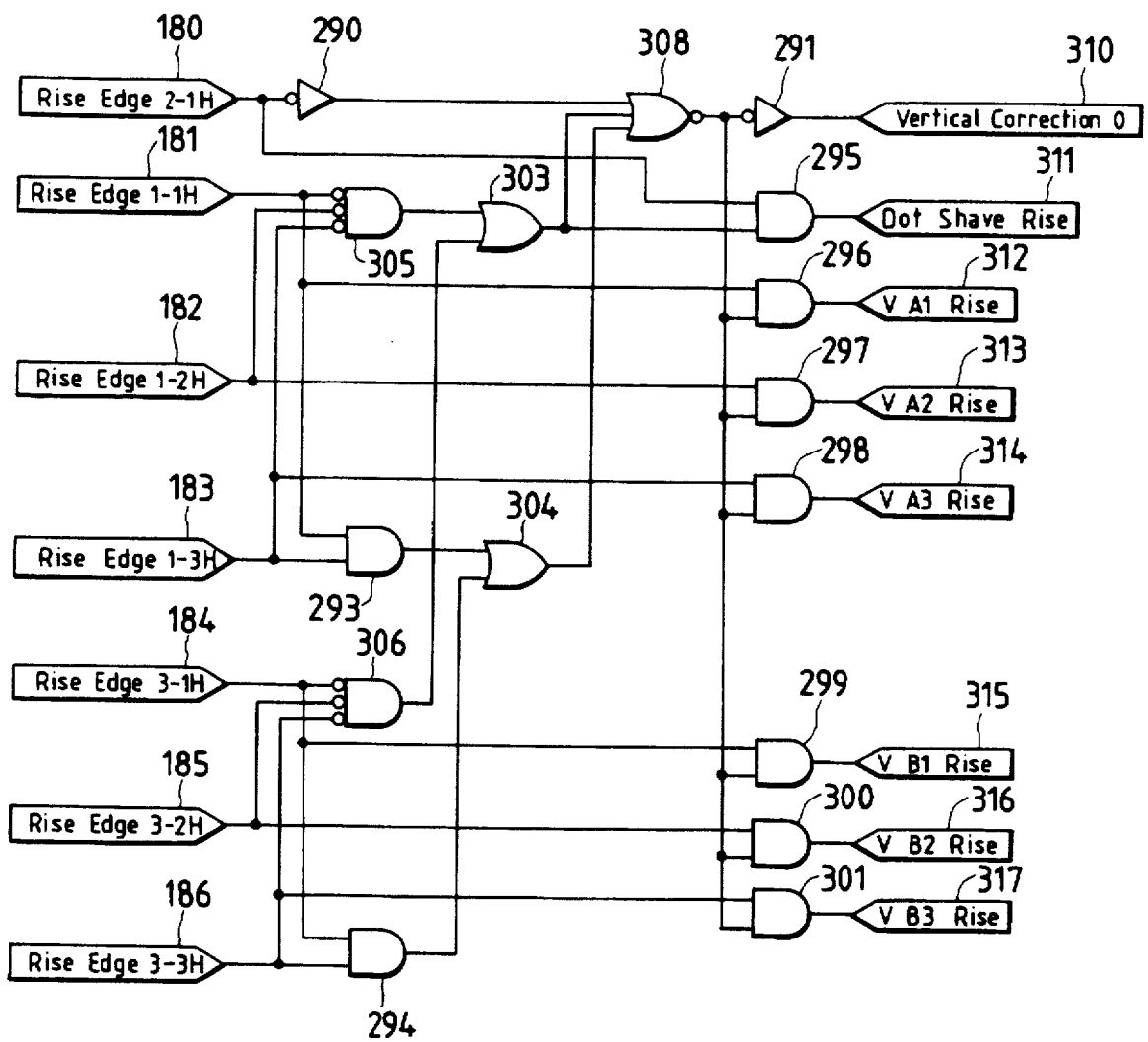
FIG. 38 is a circuit diagram illustrating an example of a classifying circuit for classifying an original pattern on the basis of a rising edge from the edge detector shown in FIG. 34.
Figure 39:
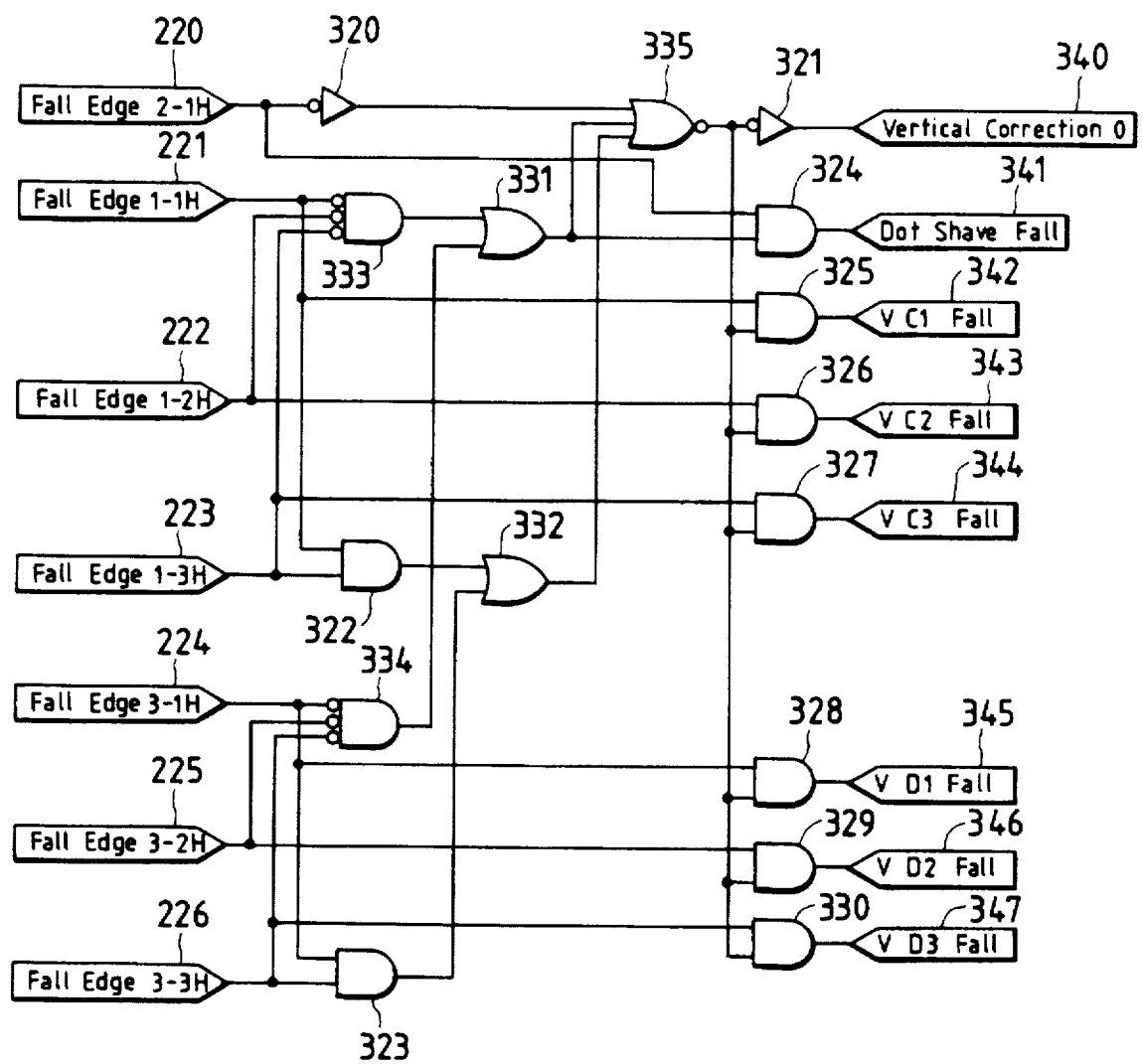
FIG. 39 is a circuit diagram illustrating an example of another classifying circuit for classifying an original pattern on the basis of a falling edge from the edge detector shown in FIG. 34.

FIGS. 38 and 39 illustrate an example of the classifying circuit 47 for determining the kinds of the stepped portions of lines respectively extending vertically. FIG. 38 shows a circuit for classifying the rising stepped portions, while FIG. 39 shows a circuit for classifying the falling stepped portions.

The circuit for classifying rising portions, shown in FIG. 38, has input terminals 180–186 (which are identified by the same reference numerals as those of the output terminals 180 186 of the horizontal rising-portion edge detecting circuit shown in FIG. 34 so as to correspond to the same). This circuit, which includes inverters 290, 291, AND gates 293–301, OR gates 303, 304, NOR gates 305, 306, 308, effects the following determinations on the basis of data on a rising portion obtained by horizontally differentiating the original pattern:

| IF X=0 | THEN AMOUNT OF CORRECTION=0 |
| IF D0=0 AND D1=0 AND D2=0 | THEN AMOUNT OF CORRECTION=0 |
| IF D8=0 AND D9=0 AND D10=0 | THEN AMOUNT OF CORRECTION=0 |
| IF D=01 AND D2=1 | THEN AMOUNT OF CORRECTION=0 |
| IF D8=1 AND D10=1 | THEN AMOUNT OF CORRECTION=0 |

Thus, those patterns which do not require correction are selected on the basis of the relationship between a focused point and the differentiated data surrounding the same, and a carry signal is outputted to an output terminal 310.

Then, the patterns are classified through the following logical calculations:

| IF D1=1 | THEN A2 |
| IF D0=1 | THEN A1 |
| IF D2=1 | THEN A3 |
| IF D9=1 | THEN B2 |
| IF D8=1 | THEN B1 |
| IF D10=1 | THEN B3 |

The carry signal is outputted to the following terminals in the respective cases as a result of the classification:

to an output terminal 312 (V A1 Rise) in the case of A1,
to an output terminal 313 (V A2 Rise) in the case of A2,
to an output terminal 314 (V A3 Rise) in the case of A3,
to an output terminal 315 (V B1 Rise) in the case of B1,
to an output terminal 316 (V B2 Rise) in the case of B2, and
to an output terminal 317 (V B3 Rise) in the case of B3.

It should be noted the arrangement of the differentiated data is defined as follows:

| D0 | D1 | D2 |
|---|---|---|
|  | X |  |
| D8 | D9 | D10 |

In addition, the circuit for classifying falling portions, shown in FIG. 39, has input terminals 220–226 (which are indicated by the same reference numerals as those of the output terminals 220–226 of the falling-portion edge detecting circuit shown in FIG. 35 so as to correspond to the same). This circuit, which includes inverters 320, 321, AND gates 322–330, OR gates 331, 332, and NOR gates 333, 334, 335, executes classification based on logical calculations similar to those of the circuit shown in FIG. 38.

The following determinations are made on the basis of data on a falling portion obtained by horizontally differentiating the original pattern:

Then, the patterns are classified through the following logical calculations:

| IF D1=1 | THEN C2 |
| IF D0=1 | THEN C1 |
| IF D2=1 | THEN C3 |
| IF D9=1 | THEN D2 |
| IF D8=1 | THEN D1 |
| IF D10=1 | THEN D3 |

The carry signal is outputted to the following terminals in the respective cases as a result of the classification:

to an output terminal 342 (V C1 Fall) in the case of C1,
to an output terminal 343 (V C2 Fall) in the case of C2,
to an output terminal 344 (V C3 Fall) in the case of C3,
to an output terminal 345 (V D1 Fall) in the case of D1,
to an output terminal 346 (V D2 Fall) in the case of D2, and
to an output terminal 347 (V D3 Fall) in the case of D3, It should be noted the arrangement of the differentiated data is defined as follows:

| D0 | D1 | D2 |
|---|---|---|
|  | X |  |
| D8 |  | D10 |

Figure 40:
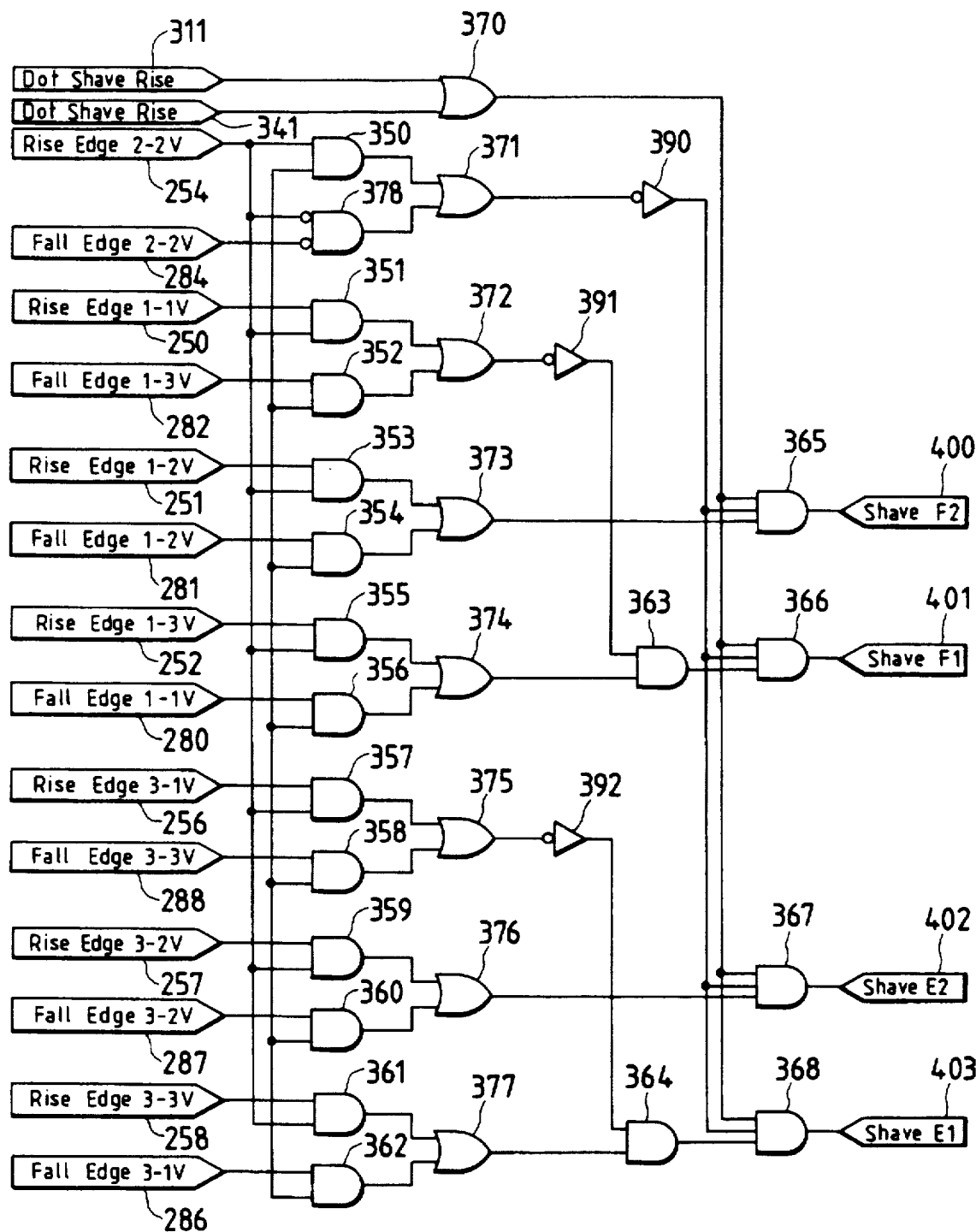
FIG. 40 is a circuit diagram illustrating an example of another classifying circuit for classifying an original pattern in which a dot is present at a focused point among outputs from still another classifying circuit for classifying an original pattern in which the focused point is a vacant portion among the outputs from the edge detectors shown in FIGS. 36 and 37.
Figure 41:
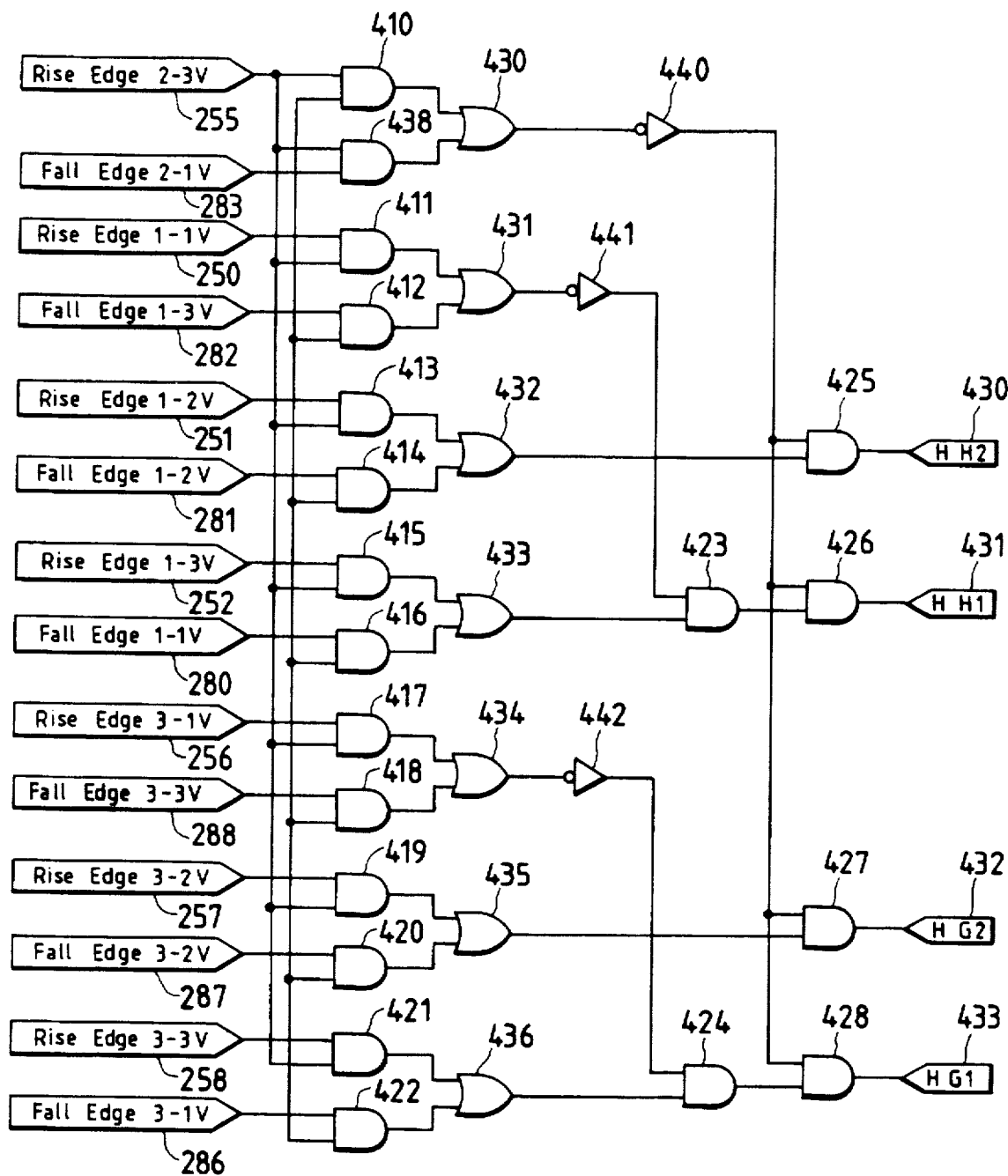
FIG. 41 is a circuit diagram illustrating an example of still another classifying circuit for classifying an original pattern in which the focused point is a vacant portion among the outputs from the edge detectors shown in FIGS. 36 and 37.

FIGS. 40 and 41 illustrate an example of the classifying circuit 48 for classifying the kinds of stepped portions of lines respectively extending horizontally into a plurality of groups. The circuit shown in FIG. 40 comprehensively classifies the stepped portions of rising and falling portions in cases where a dot is present at the focused point, while the circuit shown in FIG. 41 comprehensively classifies the stepped portions of rising and falling portions in cases where a vacant portion is present at the focused point.

The classifying circuit shown in FIG. 40 is connected to the output terminals shown in FIGS. 36 to 39. Input terminals 250–252, 254, 256–258 of this circuit are identified with the same reference numerals as those of the output terminals 250–252, 256–258 of the vertical rising-portion edge detecting circuit shown in FIG. 36, those of the output terminals 280–282, 284, 286–288 of the vertical falling-

| IF X=0 | THEN AMOUNT OF CORRECTION=0 |
| IF D0=0 AND D1=0 AND D2=0 | THEN AMOUNT OF CORRECTION=0 |
| IF D8=0 AND D9=0 AND D10=0 | THEN AMOUNT OF CORRECTION=0 |
| IF D0=1 AND D2=1 | THEN AMOUNT OF CORRECTION=0 |
| IF D8=1 AND D10=1 | THEN AMOUNT OF CORRECTION=0 |

Thus, those patterns which do not require correction are selected on the basis of the relationship between a focused point and the differentiated data surrounding the same, and the carry signal is outputted to an output terminal 340.

portion edge detecting circuit shown in FIG. 37, and those of the output terminals 311, 341 of the rising edge detecting circuit and the falling edge detecting circuit of FIGS. 38 and 39 as viewed horizontally so as to correspond to the same. This circuit includes AND gates 350 368, OR gates 370–377, NOR gate 378, and inverters 390–392.

A determination is made by means of the AND gates 365–368 as to whether or not the dot rise signal (FIG. 38) or the dot fall signal (FIG. 39) has been inputted to the input terminals 311, 341. If the input signal does not represent a rising edge portion or a falling edge portion, the output of the result of classification is suspended.

Moreover, if the input signal represents a rising edge portion, a classification is executed by conducting the following logical calculations:

| | |
|---|---|
| IF D5=1 AND D3=1 | THEN E4 |
| ELSE IF D5=1 | THEN E3 |
| ELSE IF D4=1 | THEN E2 |
| ELSE IF D3=1 | THEN E1 |
| ELSE | E0 |
| IF D8=1 AND D6=1 | THEN F4 |
| ELSE IF D8=1 | THEN F3 |
| ELSE IF D7=1 | THEN F2 |
| ELSE IF D6=1 | THEN F1 |
| ELSE | F0 |

On the other hand, if the input signal represents a falling edge portion, a classification is executed by conducting the following logical calculations:

| | |
|---|---|
| IF D5=1 AND D3=1 | THEN E4 |
| ELSE IF D3=1 | THEN E3 |
| ELSE IF D4=1 | THEN E2 |
| ELSE IF D5=1 | THEN E1 |
| ELSE | E0 |
| IF D8=1 AND D6=1 | THEN F4 |
| ELSE IF D6=1 | THEN F3 |
| ELSE IF D7=1 | THEN F2 |
| ELSE IF D8=1 | THEN F1 |
| ELSE | F0 |

The carry signal is outputted to the following terminals in the respective cases as a result of the classification:

to an output terminal 403 (Shave E1) in the case of E1, to an output terminal 402 (Shave E2) in the case of E2, to an output terminal 401 (Shave F1) in the case of F1, to an output terminal 400 (Shave F2) in the case of F2, It should be noted the arrangement of the differentiated data is defined as follows:

| D5 | | D8 |
|---|---|---|
| D4 | X | D7 |
| D3 | | D6 |

The circuit for classifying falling portions, shown in FIG. 41, is connected to the output terminals shown in FIGS. 36 and 37. The input terminals 250–252, 255, 256–258 of this circuit are indicated by the same reference numerals as those of the output terminals of the vertical rising portion edge detecting circuit shown in FIG. 36, and those of the output terminals 280–283, 286–288 of the vertical falling-portion edge detecting circuit shown in FIG. 37 so as to correspond to the same. This circuit includes AND gates 410–428, OR gates 431–436, NAND gates 438, and inverters 440–442.

If the input signal represents a rising edge portion, a classification is executed by conducting the following logical calculations:

| | |
|---|---|
| IF D5=1 AND D3=1 | THEN G4 |
| ELSE IF D5=1 | THEN G3 |

-continued

| | |
|---|---|
| ELSE IF D4=1 | THEN G2 |
| ELSE IF D3=1 | THEN G1 |
| ELSE | G0 |
| IF D8=1 AND D6=1 | THEN H4 |
| ELSE IF D8=1 | THEN H3 |
| ELSE IF D7=1 | THEN H2 |
| ELSE IF D6=1 | THEN H1 |
| ELSE | 0 |

Moreover, if the input signal represents a falling edge portion, a classification is executed by conducting the following logical calculations:

| | |
|---|---|
| IF D5=1 AND D3=1 | THEN G4 |
| ELSE IF D3=1 | THEN G3 |
| ELSE IF D4=1 | THEN G2 |
| ELSE IF D5=1 | THEN G1 |
| ELSE | G0 |
| IF D8=1 AND D6=1 | THEN H4 |
| ELSE IF D6=1 | THEN H3 |
| ELSE IF D7=1 | THEN H2 |
| ELSE IF D8=1 | THEN H1 |
| ELSE | 0 |

The carry signal is outputted to the following terminals in the respective cases as a result of the classification:

to an output terminal 433 (H G1) in the case of G1, to an output terminal 432 (H G2) in the case of G2, to an output terminal 431 (H HI) in the case of Hi, and to an output terminal 430 (H H2) in the case of H2.

It should be noted the arrangement of the differentiated data is defined as follows:

| D5 | | D8 |
|---|---|---|
| D4 | X | D7 |
| D3 | | D6 |

The signals outputted from the classifying circuits shown in FIGS. 38 to 41 illustrate in groups the forms of the original patterns stored in the shift registers 44. That is, if the carry signals A0–A4 and the carry signals B0–B4 from the classifying circuit shown in FIG. 38 are combined, it is possible to recognize the original pattern having a rising edge, shown in FIGS. 14 and 15, as viewed horizontally. In addition, if the carry signals C0–C4 and the carry signals D0–D4 from the classifying circuit shown in FIG. 39 are combined, it is possible to recognize an original pattern having a pattern symmetrical about a vertical line with respect to the patterns shown in FIGS. 14 and 15, i.e., an original pattern having a falling edge as viewed horizontally.

If the carry signals E0–E4 and the carry signals F0–F4 from the classifying circuit shown in FIG. 40 are combined, it is possible to recognize an original pattern in which the dot is present at the focused point among the edges shown in FIG. 16 and 17, as viewed vertically.

Figure 19:
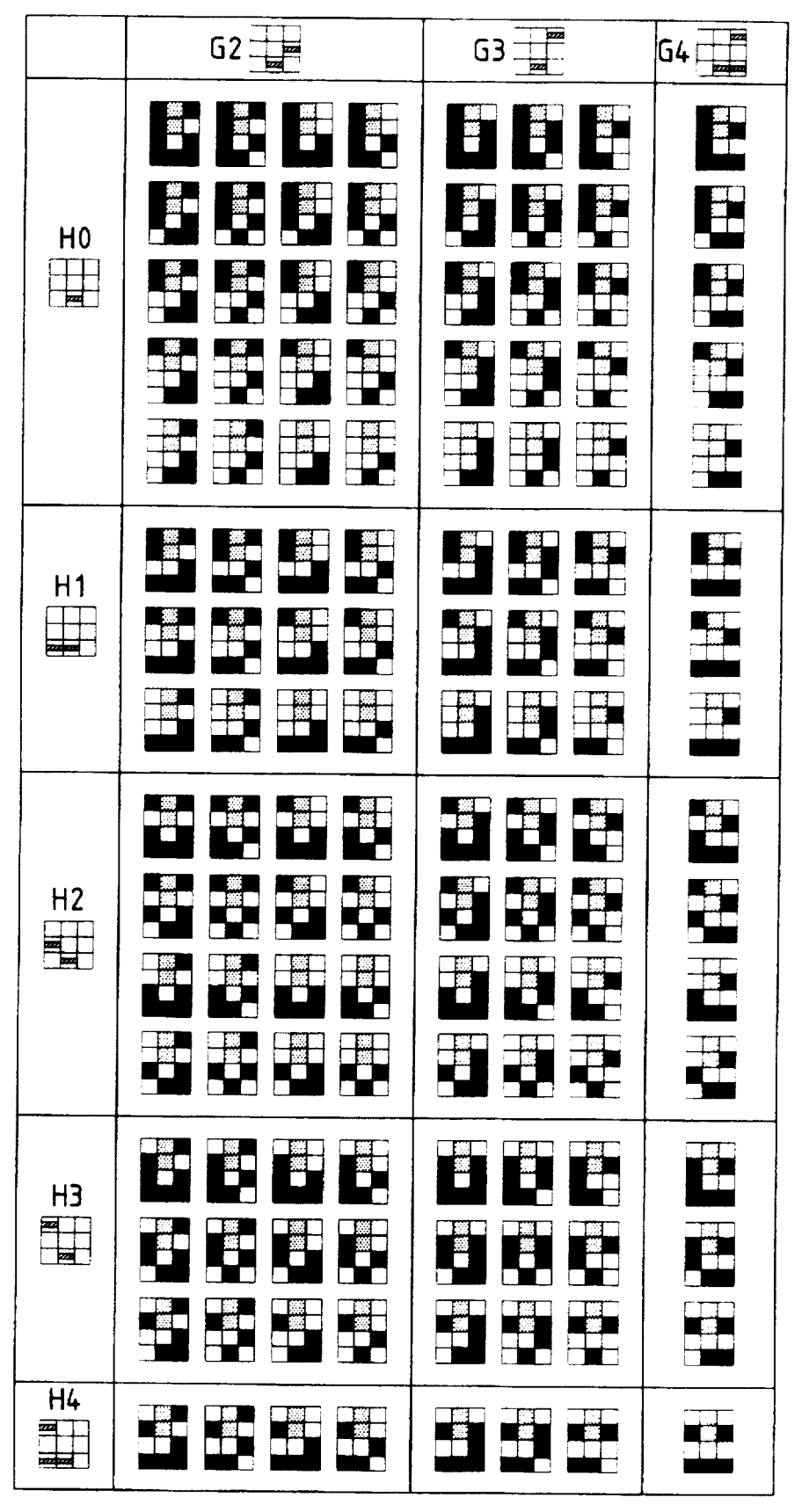

Furthermore, if the carry signals G0–G4 and the carry signals H0–H4 from the classifying circuit shown in FIG. 41 are combined, it is possible to recognize an original pattern in which the dot is not present at the focused point among the edges shown in FIGS. 18 and 19, as viewed vertically.

Figure 42:
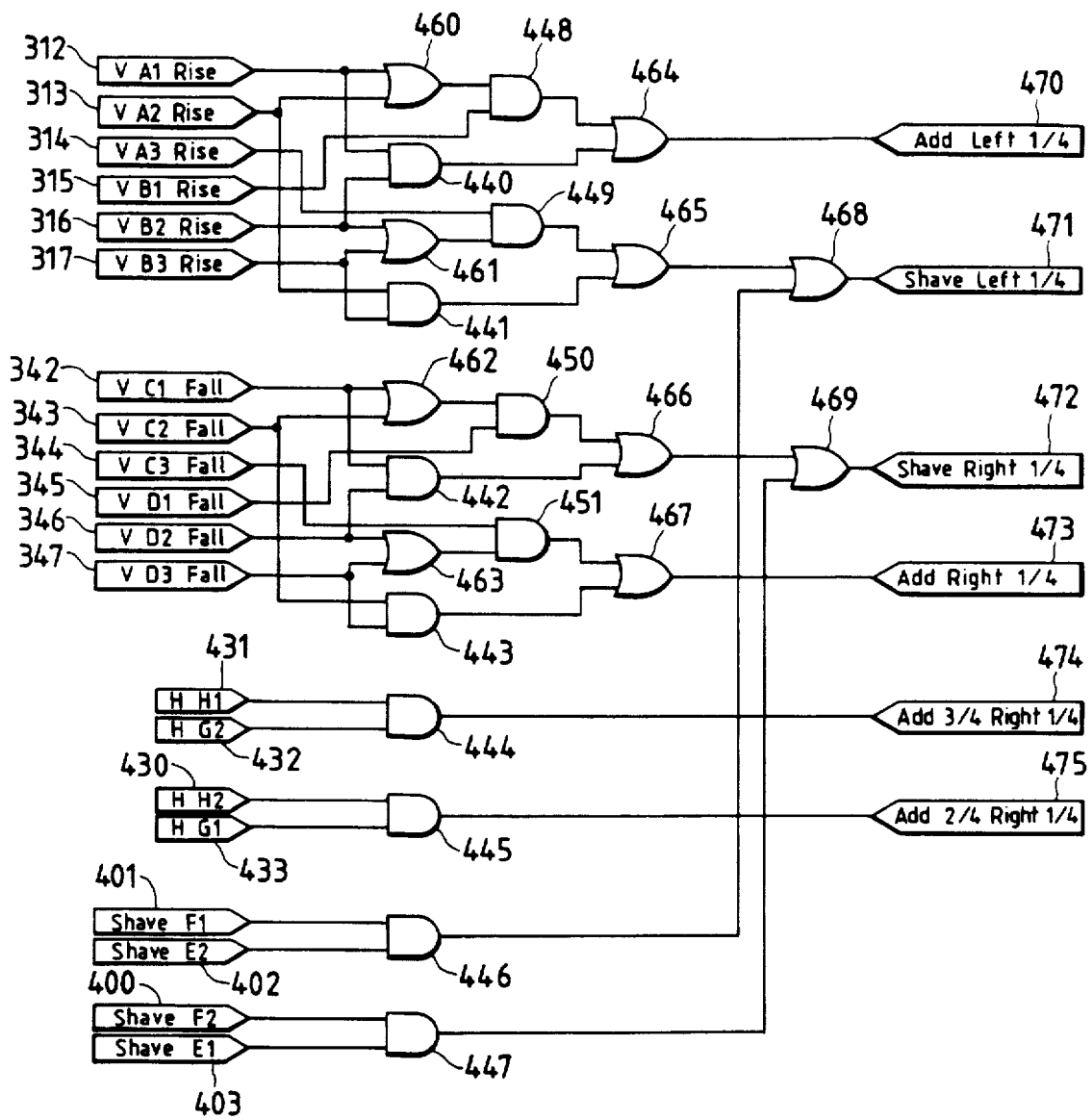
FIG. 42 is a circuit diagram illustrating an example of a determining circuit for outputting correction data on the basis of outputs from the classifying circuits shown in FIGS. 38 to 41.

FIG. 42 illustrates an example of the determining circuit 49 described in connection with FIG. 5. This determining circuit 49, upon receiving the carry signals from the classifying circuits shown in FIGS. 38 to 41, determines the size of the dot to be printed and a printing position thereof. The input terminals of the determining circuit 49 are indicated with the same reference numerals as those of the output terminals shown in FIGS. 38 to 41, i.e., 312–317 (FIG. 38) 342–347 (FIG. 39), 400–403 (FIG. 40), and 430–433 (FIG. 41). This circuit includes AND gates 440–451 and OR gates 460–469.

When the carry signals (A1, B1), (A1, B2), or (A2, B1) are outputted from the classifying circuit shown in FIG. 38, this circuit outputs through its output terminal 470 a signal for adding a ¼-size dot to the left-hand side of the normal dot, i.e., the unit dot to the left-hand side of the focused point. Moreover, when the carry signals (A2, B3), (A3, B2), or (A3, B3) are outputted from that classifying circuit, the determining circuit outputs through its output terminal 471 a signal for shaving the left-hand side of the dot at the focused point by the portion of the unit dot.

When the carry signals (C1, D1), (C1, D2), or (C2, D1) are outputted from the classifying circuit shown in FIG. 39, the determining circuit outputs through its output terminal 472 a signal for shaving the right-hand side of the normal dot by ¼ dot. Moreover, when the carry signals (C2, C3), (C3, D2), or (C3, D3) are outputted, the determining circuit outputs through its output terminal 473 a signal for adding ¼ dot to the right-hand side of the normal dot.

When the carry signals (E2, F1) are outputted from the classifying circuit shown in FIG. 40, the determining circuit outputs through the output terminal a signal for shaving the left-hand side of the normal dot at the focused point by ¼ dot. Moreover, when the carry signals (E1, F2) are outputted from that classifying circuit, the determining circuit outputs through the output terminal 472 a signal for shaving the right-hand side of the normal dot at the focused point by ¼ dot.

When the carry signals (G2, Hi) are outputted from the classifying circuit shown in FIG. 41, the determining circuit outputs through its output terminal 474 a signal for adding ¼ dot at a position a ¾ dot space apart to the right from the focused point. Moreover, when the carry signals (G1, H2) are outputted, the determining circuit outputs through its output terminal 475 a signal for adding ¼ dot at a position a ½ dot space apart to the right from the focused point.

Figure 43:
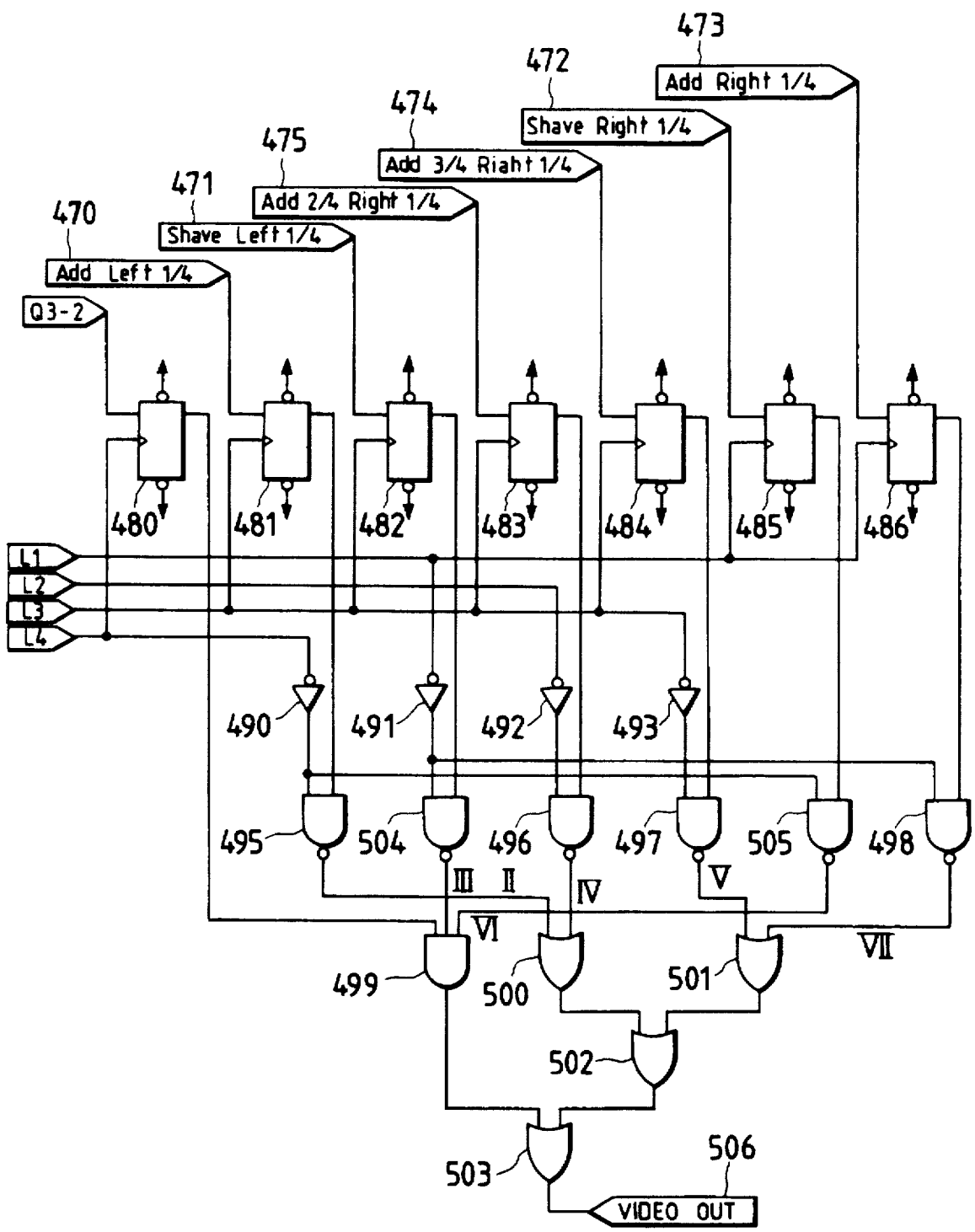
FIG. 43 is a circuit diagram illustrating an example of a pulse-width modulator for outputting print data on the basis of data from the determining circuit shown in FIG. 42.

FIG. 43 illustrates an example of the pulse-width modulating circuit shown in FIG. 5. This pulse-width modulating circuit includes a flip-flop 480 for receiving a signal from the flip-flop 111 for storing data on the focused point of the shift register shown in FIG. 33, and for receiving a fourth clock signal L4 of the clock signals L1, L2, L3, L4 (see FIG. 30) obtained by shifting a single video clock by four different intervals; a flip-flop 481 for receiving the signal from the output terminal 470 of the determining circuit and the third clock signal L3; a flip-flop 482 for receiving the signal from the output terminal 471 of the determining circuit and the third clock signal L3; a flip-flop 483 for receiving the signal from the output terminal 475 of the determining circuit and the third clock signal L3; a flip-flop 484 for receiving the signal from the output terminal 474 and the third clock signal L3; a flip-flop 485 for receiving the signal from the output terminal 472 of the determining circuit and the first clock signal L1; and a flip-flop 486 for receiving the signal from the output terminal 473 of the determining circuit and the first clock signal L1. The output signals from the flip-flops 480–486 are synthesized by the clock signals L1–L4, inverters 490–493, AND gates 495–499, OR gates 500–503, and NAND gates 504-5-5, so as to output to an output terminal 506 a signal having a pulse width corresponding to the signal from the determining circuit.

If it is assumed that data S4' is outputted from the buffer 23, data S4 which is on the same column as that of that data but on a preceding line is read from the image memory during the first half of the video clock and is stored in the shift register, and the data S4' being presently outputted is stored in the image memory during the latter half of the video clock. Moreover, data S2 preceding by two columns is stored in the flip-flop 111 of the shift register for storing the focused point, and that data is used as an object of calculation.

Since data subject to printing is data S1 for which the calculation has been completed one column before the data S2 for which the calculation is being executed, even if data indicating a vacant portion is stored in the focused point of the flip-flop and no signal is present concerning the addition of a dot to the vacant portion, the dot can be printed in the vacant portion by making use of a delay with respect to the point subject to printing, at a time when the data representing an ensuing rising or falling edge is stored.

Figure 30:
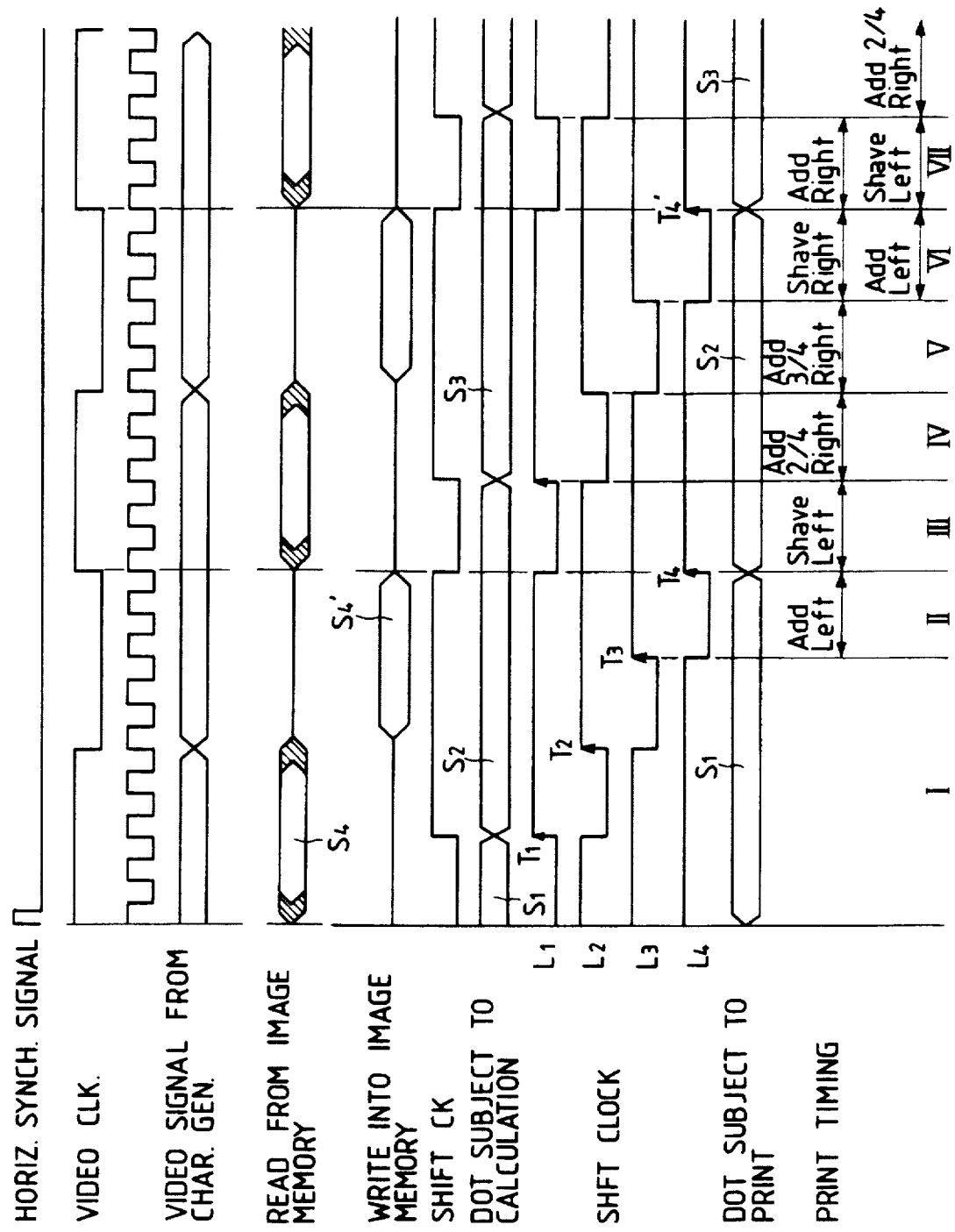
FIG. 30 is a timing diagram illustrating the operation in accordance with the present invention.

Although, as shown in FIG. 30, at a time VIa mode (shave right) for shaving the right-hand side of the normal dot by a ¼ dot and a mode (add left) for adding ¼ dot the left-hand side of the normal dot overlap, and at a time VII a mode (add right) for adding ¼ dot to the right-hand side of the normal dot and a mode (shave left) for shaving the left-hand side of the normal dot by ¼ dot overlap, but only one mode is selected for the same focused point so that there no conflict occurs.

The pulse signal thus outputted is outputted to the laser beam modulator 17, thereby causing the laser beam to be activated only for a time period corresponding to the pulse width. For this reason, individual dot data constituting the bit map data outputted from the buffer is printed with a size suitable for forming smooth curves or slanted lines.

Figure 44:
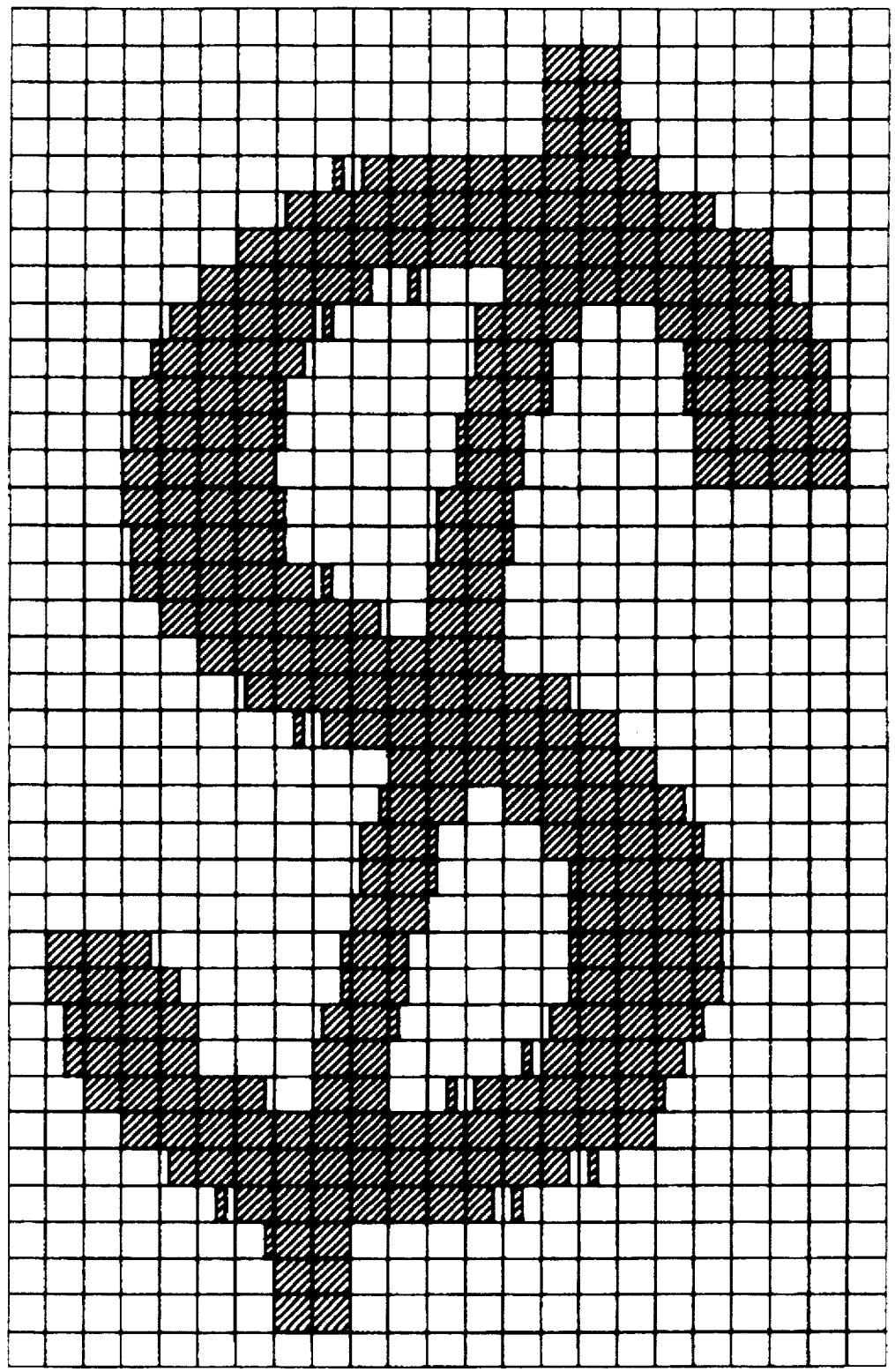
FIG. 44 is a diagram illustrating bit map data in a case where ever character "$" shown in FIG. 4 is corrected by enlarging the sampling window.

Although in the above-described embodiment data on a portion of 3 columns×3 columns with the focused point as a center is set as the object of determination, if a sampling window of a greater size, e.g., one for a portion of 5 columns×5 columns, is used, it is possible to take into consideration the inclination from a position spaced apart from the focused point and the degree of the step, so that it is possible to convert the image data to a smoother pattern, as shown in FIG. 44.

It should be noted that the above-described specific circuits constituting the respective units shown in FIG. 5 are only examples, and can be optimized in actual implementation by using logical-calculation circuits such as a gate array. Moreover, it is evident that those specific circuits can be partially replaced by software or a dictionary structure using memory.

Figure 45:
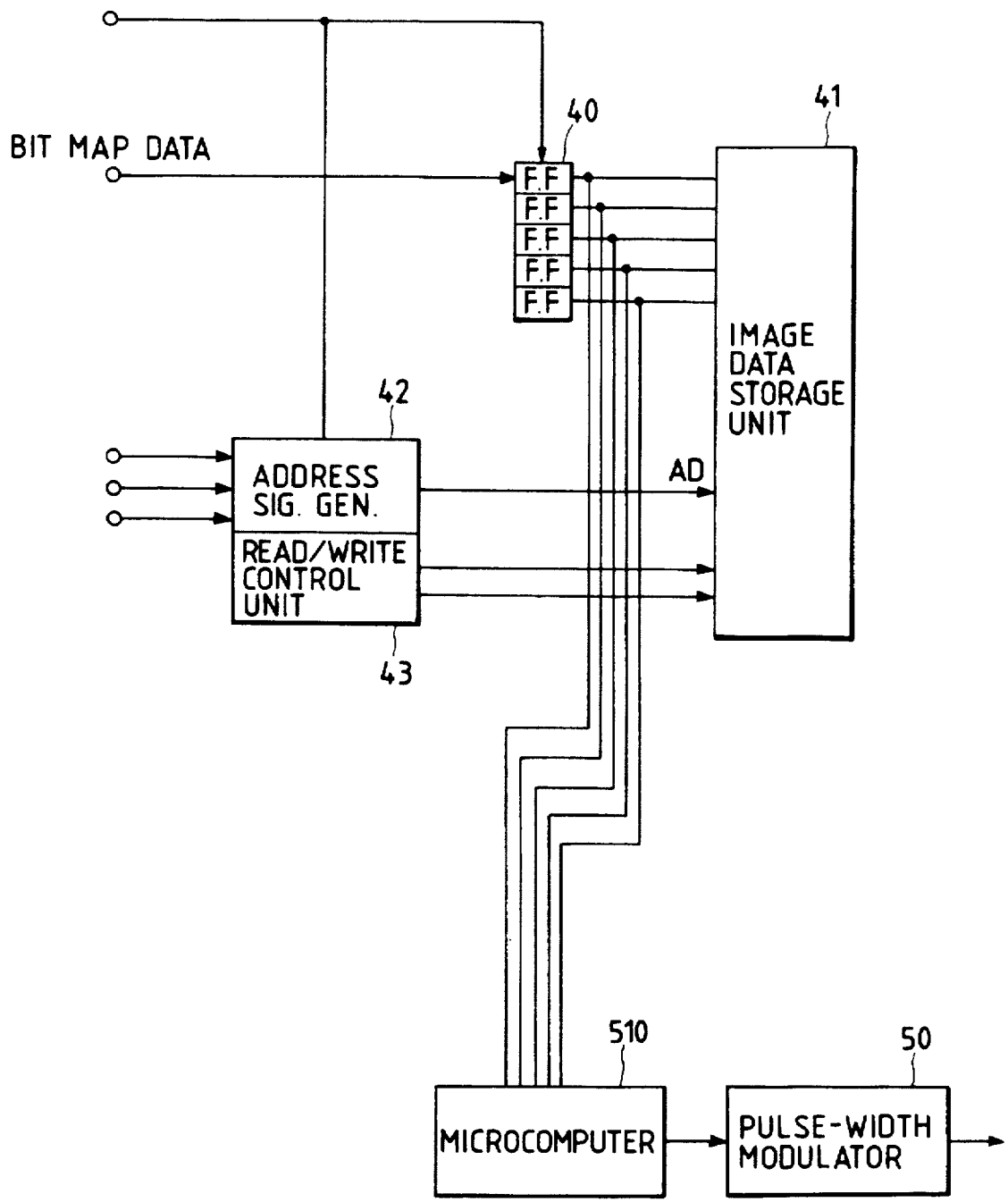
FIG. 45 is a block diagram illustrating an embodiment in a case where the present invention is implemented by means of software.

Although in the above-described embodiment a description has been given with reference to an example in which the calculating circuitry following the shift register 44 shown in FIG. 5, i.e., the edge detector 45, 46, the classifying circuit 47, 48, and the determining circuit 49, are constituted by circuit elements, in a case where a microcomputer whose calculating speed exceeds the actual printing speed is used, these units can be replaced by a microcomputer 510, as shown in FIG. 45, so as to allow the microcomputer 510 to effect the data processing.

Figure 46:
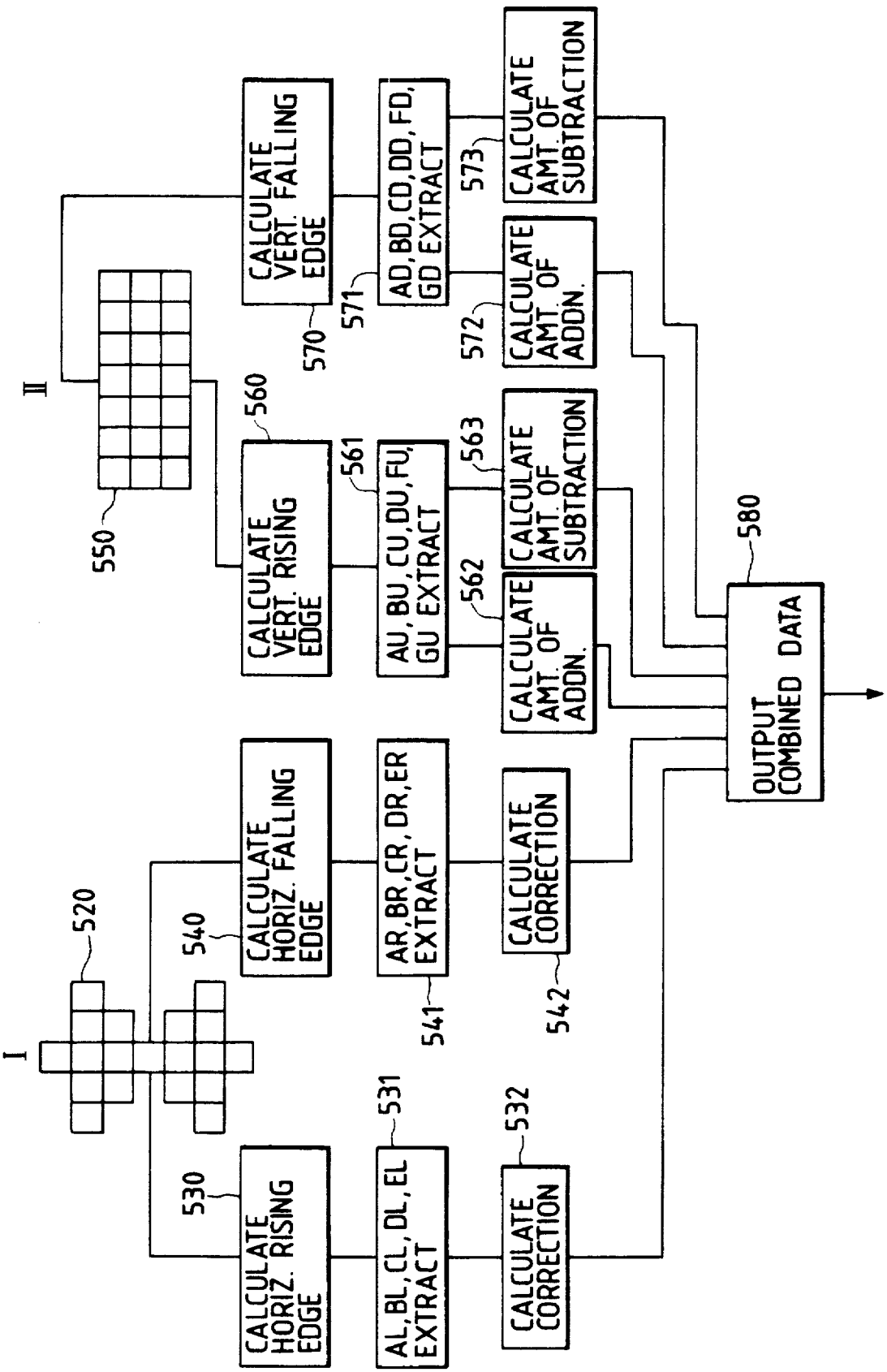
FIG. 46 is a diagram illustrating an outline of a program to be executed by the apparatus shown in FIG. 45.

FIG. 46 is a block diagram illustrating an outline of a program configuration showing data processing to be effected by the aforementioned microcomputer. A description will be given hereinafter with reference to an example in which the flip-flops are arranged in a 7×7 configuration as shown below.

| R00 | R10 | R20 | R30 | R40 | R50 | R60 |
|---|---|---|---|---|---|---|
| R01 | R11 | R21 | R31 | R41 | R51 | R61 |
| R02 | R12 | R22 | R32 | R42 | R52 | R62 |
| R03 | R13 | R23 | R33 | R43 | R53 | R63 |
| R04 | R14 | R24 | R34 | R44 | R54 | R64 |
| R05 | R15 | R25 | R35 | R45 | R55 | R65 |
| R06 | R16 | R26 | R36 | R46 | R56 | R66 |

Data Rmn stored in these flip-flops is specified by means of the attached suffixes, respectively indicating the column and line. Data R33 at the central portion is set as the focused point, i.e., the dot data to be printed next.

The program configuration shown in FIG. 46 is classified into a block I for obtaining data for correcting vertical lines and a block II for obtaining data for correcting horizontal lines.

The block I for obtaining data for correcting vertical lines includes Step 530 for calculating a horizontal rising edge from upper and lower regions 520 obtained by classifying the 7×7 shift register 44 with the focused point R33 as a center by 45° lines; Step 531 for extracting AL, BL, CL, DL, EL; Step 532 for calculating an amount of correction; Step 540 for calculating a horizontal falling edge; Step 541 for extracting AR, BR, CR, DR, ER; and Step 542 for calculating an amount of correction.

The block II for obtaining data for correcting horizontal lines includes Step 560 for executing a calculation of a vertical rising edge of a region 550 with 3 lines×7 columns extracted from the 7×4 shift register with the focused point R33 as the center; Step 561 for extracting AU, BU, CU, DU, EU, FU, GU; Step 562 for calculating an amount of addition of a dot which, in a case where data at a position subject to printing is vacant, is replenished; Step 563 for calculating an amount of shaving which, in a case where the data at the position subject to printing is a dot, reduces that dot; Step 570 for calculating a vertical falling edge; Step 571 for extracting AD, BD, CD, DD, ED, FD, GD; Step 572 for calculating an amount of addition of a dot which, in a case where the data at the position subject to printing is vacant, is replenished; and Step 573 for calculating an amount of shaving which, in a case where the data at the position subject to printing is a dot, reduces that dot.

The data calculated through the Steps 532, 542, 563, 572, 573 are combined in Step 580 for calculation for output determination and are outputted as print data.

A detailed description will now be given of the Steps mentioned above.
Calculation of a horizontal rising edge in Step 530:
DXL=R33 AND (NOT R23)
D0L=R22 AND (NOT R12)
D1L=R32 AND (NOT R22)
D2L=R42 AND (NOT R32)
D3L=R11 AND (NOT R01)
D4L=R21 AND (NOT R11)
D5L=R31 AND (NOT R21)
D6L=R41 AND (NOT R31)
D7L=R51 AND (NOT R41)
D8L=R24 AND (NOT R14)
D9L=R34 AND (NOT R24)
D10L=R44 AND (NOT R34)
D11L=R15 AND (NOT R05)
D12L=R25 AND (NOT R15)
D13L=R35 AND (NOT R25)
D14L=R45 AND (NOT R35)
D15L=R55 AND (NOT R45)
D16L=R30 AND (NOT R20)
D17L=R36 AND (NOT R26)
Calculation of a horizontal falling edge in Step 540:
DXR=R33 AND (NOT R43)
D0R=R22 AND (NOT R32)
D1R=R32 AND (NOT R42)
D2R=R42 AND (NOT R52)
D3R=R11 AND (NOT R21)
D4R=R21 AND (NOT R31)
D5R=R31 AND (NOT R41)
D6R=R41 AND (NOT R51)
D7R=R51 AND (NOT R61)
D8R=R24 AND (NOT R34)
D9R=R34 AND (NOT R44)
D10R=R44 AND (NOT R54)
D11R=R15 AND (NOT R25)
D12R=R25 AND (NOT R35)
D13R=R35 AND (NOT R45)
D14R=R45 AND (NOT R55)
D15R=R55 AND (NOT R65)
D16R=R30 AND (NOT R40)
D17R=R36 AND (NOT R46)
Extraction calculation in Step 531:

Among the differential data obtained in the above-described manner, only predetermined differential data are extracted by forming the following window using a differential value DXL at the focused point R33 as a center.

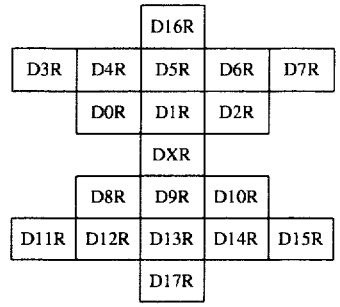

On the basis of the differential data thus extracted, the following logical calculation is executed to generate a horizontal-dot-shaving effective signal:

```
SVL = (NOT DXL)
      OR ((NOT D01) (NOT D1L) AND (NOT D2L))
      OR ((NOT D8L) AND (D91) AND (NOT D10L))
```

In addition, a vertical-line-correction presence-or-absence signal is generated by executing the following logical calculation:

```
SFTL2 = (NOT X) OR (NOT DXL)
        OR ((NOT D0L) AND ((NOT D1L) AND (NOT D2L))
        OR ((NOT D8L) AND (NOT D9L) AND (NOT D10L))
        OR (D0L AND D2L)
        OR (D4L AND D6L)
        OR (D8L AND D10L)
        OR (D12L AND D14L)
```

Moreover, the following logical calculation is executed on the basis of the aforementioned differential data so as to determine AL, BL, CL, DL, EL:
AL0=D0L AND (NOT D2L)

AL1=D1L
AL2=D2L AND (NOT D0L)
CL0=DSL AND (NOT D10L)
CL1=D9L
CL2=D10L AND (NOT D8L)
BL0=(NOT DSL) AND (NOT D4L) AND (NOT DSL) AND (NOT D6L) AND (NOT D7L)
BL1=D3L AND (NOT D5L) AND (NOT D6L)
BL2=D4L
BL3=D5L
BL4=D6L AND (NOT D4L)
BL5=D7L AND (NOT D3L) AND (NOT D4L) AND (NOT D5L)
DL0=(NOT D11L) AND (NOT D12L) AND (NOT D13L) AND (NOT D14L) AND (NOT D15L)
DL1=D11L AND (NOT D13L) AND(NOT D14L)
DL2=D12L
DL3=D13L
DL4=D14L AND (NOT D12L)
DL52=D15L AND (NOT D11L) AND (NOT D12L) AND (NOT D13L)
ELI=D16L OR D17L
EL0=NOT EL1

Calculation of amount of correction in Step 532:
An amount of correction in the leftward direction is calculated by executing the following calculation:

```
SFTL0 =
    {((BL0 OR BL4 OR BL5 OR (EL0 AND (BL2 OR BL3)))
        AND (AL0 AND (CL0 OR CL1)))
    OR ((DL0 OR DL4 OR DL5 OR (EL0 AND (DL2 OR DL3)))
        AND (CL0 AND (AL0 OR AL1)))
    OR (DL1 AND CL0 AND AL1)
    OR (BL1 AND AL0 AND CL1)
    OR (BL1 AND AL2 AND DL2 AND CL0)
    OR (BL2 AND AL0 AND DL1 AND CL2)
    OR (BL2 AND AL0 AND DL2 AND CL2)
    OR (BL2 AND AL2 AND DL2 AND CL0)
    OR (BL2 AND AL1 AND DL3 AND CL1)
    OR (BL3 AND AL1 AND DL2 AND CL1)
    OR (EL1 AND AL0 AND CL0)
    OR (EL1 AND (NOT BL2) AND AL1 AND CL0 AND DL2)
    OR (EL1 AND (NOT BL3) AND AL1 AND CL0 AND DL3)
    OR (EL1 AND (NOT DL2) AND AL0 AND CL1 AND BL2)
    OR (EL1 AND (NOT DL3) AND AL0 AND CL1 AND BL3)
    OR (EL1 AND BL1 AND DL3 AND AL0 AND CL2)
    OR (EL1 AND BL3 AND DL1 AND AL2 AND CL0)}
    AND (NOT SFTL2)
```

In addition, an amount of correction in the rightward direction is calculated by executing the following calculation:

```
SFTL1 =
    {((BL0 OR BL1 OR BL2 OR BL4 OR (EL0 AND BL3))
        AND (AL2 AND(CL1 OR CL2)))
    OR ((DL0 OR DL1 OR DL2 OR DL4 OR (EL0 AND DL3))
        AND (CL2 AND(AL0 OR AL2)))
    OR (DL5 AND CL2 AND AL1)
    OR (BL5 AND AL2 AND CL1)
    OR (BL4 AND AL2 AND DL5 AND CL0)
    OR (BL5 AND AL0 AND DL4 AND CL2)
    OR (BL4 AND AL1 AND DL3 AND CL1)
    OR (BL3 AND AL1 AND DL4 AND CL1)
    OR (EL1 AND AL2 AND CL2)
    OR (EL1 AND (NOT DL3) AND AL2 AND CL1)
    OR (EL1 AND (NOT BL3) AND AL1 AND CL2)
    OR (EL1 AND BL5 AND DL0 AND AL2 AND CL0)
    OR (EL1 AND BL0 AND DL5 AND AL0 AND CL2)}
    AND (NOT SFTL2)
```

Extraction calculation in Step 541:
Among the differential data obtained in the above-described manner, differential data are extracted by forming the following window using a differential value DXR at the focused point R33 as the center.

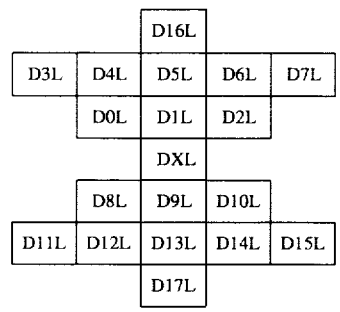

On the basis of the differential data thus extracted, extracted, the following logical calculation is executed to generate a horizontal-dot-shaving effective signal:

```
SVR = (NOT DXR)
    OR ((NOT D0R) AND (NOT D1R) AND (NOT D2R))
    OR ((NOT D8R) AND (NOT D9R) AND (NOT D10R))
```

Then, a vertical-line-correction present-or-absent signal is generated by executing the following logical calculation:

```
SFTR2 = (NOT X) OR (NOT DXR)
    OR (NOT D0R) AND (NOT D1R) AND (NOT D2R)
    OR (NOT D8R) AND (NOT D9R) AND (NOT D10R)
    OR (D0R AND D2R)
    OR (D4R AND D6R)
    OR (D8R AND D10R)
    OR (D12R AND D14R)
```

Further, the following logical calculation is executed on the basis of the aforementioned differential data so as to determine AR, BR, CR, DR, ER:
AR0=D0R AND (NOT D2R)
AR1=D1R
AR2=D2R AND (NOT D0R)
CR0=D8R AND (NOT D10R)
CR1=D9R
CR2=D10R AND (NOT D8R)
BR0=(NOT D3R) AND (NOT D4R) AND (NOT D5R) AND (NOT D6R) AND (NOT DVR)
BR1=D3R AND (NOT D5R) AND (NOT D6R)
BR2=D4R
BR3=D5R
BR4=D6R AND (NOT D4R)
BR5=D7R (NOT D3R) AND (NOT D4R) AND (NOT D5R)
DR0=(NOT D11R) AND (NOT D12R) AND (NOT D13R) AND (NOT D14R) AND (NOT D15R)
DR1=D11R AND (NOT D13R) AND (NOT D14R)
DR2=D12R
DR3=D13R
DR4=D14R AND NOT (DR12R)
DR5=D15R (NOT D11R) AND (NOT D12R) AND (NOT D13R)
ER1=D16R OR D17R
ER0=NOT ER1

Calculation of amount of correction in Step 542:
An amount of correction in the leftward direction is calculated by executing the following calculation:

SFTR0 =
  {((BR0 OR BR4 OR BR5 OR (ER0 AND (BR2 OR BR3)))
    AND (AR0 AND (CR0 OR CR1)))
  OR ((DR0 OR DR4 OR DR5 OR (ER0 AND (DR2 OR DR3))) AND (CR0
    AND (AR0 OR AR1)))
  OR (DR1 AND CR0 AND AR1)
  OR (BR1 AND AR0 AND CR1)
  OR (BR1 AND AR2 AND DR2 AND CR0)
  OR (BR2 AND AR0 AND DR1 AND CR2)
  OR (BR2 AND AR0 AND DR2 AND CR2)
  OR (BR2 AND AR2 AND DR2 AND CR0)
  OR (BR2 AND AR1 AND DR3 AND CR1)
  OR (BR3 AND AR1 AND DR2 AND CR1)
  OR (ER1 AND AR0 AND CR0)
  OR (FR1 AND (NOT BR2) AND AR1 AND CR0 AND DR2)
  OR (ER1 AND (NOT BR3) AND AR1 AND CR0 AND DR3)
  OR (ER1 AND (NOT DR2) AND AR0 AND CR1 AND BR2)
  OR (ER1 AND (NOT DR3) AND AR0 AND CR1 AND BR3)
  OR (ER1 AND BR1 AND DR3 AND AR0 AND CR2)
  OR (ER1 AND BR3 AND DR1 AND AR2 AND CR0)} AND (NOT SFTR2)

In addition, an amount of correction in the rightward direction is calculated by executing the following calculation:

SFTR1 =
  {((BR0 OR BR1 OR BR2 OR BR4 OR (ER0 AND BR3)) AND
    (AR2 AND (CR1 OR CR2)))
  OR ((DR0 OR DR1 OR DR2 OR DR4 OR (ER0 AND DR3))
    AND (CR2 AND (AR1 OR AR2)))
  OR (DR5 AND CR2 AND AR1)
  OR (BR5 AND AR2 AND CR1)
  OR (BR4 AND AR2 AND DR5 AND CR0)
  OR (BR5 AND AR0 AND DR4 AND CR2)
  OR (BR4 AND AR1 AND DR3 AND CR1)
  OR (BR3 AND AR1 AND DR4 AND CR1)
  OR (ER1 AND AR2 AND CR2)
  OR (ER1 AND (NOT DR3) AND AR2 AND CR1)
  OR (ER1 AND (NOT BR3) AND AR1 AND CR0)
  OR (ER1 AND BR5 AND DR0 AND AR2 AND CR0)
  OR (ER1 AND BR0 AND DR5 AND AR0 AND CR2)} AND (NOT SFTR2)

A description will now be given of the correction of horizontal lines in block II.
Calculation of a vertical edge in Step 560:
YU=R33 AND (NOT R32)
DXU=R34 AND (NOT R33)
D0U=R14 AND (NOT R13)
D1U=R13 AND (NOT R12)
D2U=R12 AND (NOT R11)
D3U=R24 AND (NOT R23)
D4U=R23 AND (NOT R22)
D5U=R22 AND (NOT R21)
D6U=R44 AND (NOT R43)
D7U=R43 AND (NOT R42)
D8U=R42 AND (NOT R41)
D9U=R54 AND (NOT R53)
D10U=R53 AND (NOT RS2)
D11U=R52 AND (NOT RS1)
D12U=R04 AND (NOT R03)
D13U=R03 AND (NOT R02)
D14U=R02 AND (NOT R01)
D15U=R64 AND (NOT R63)
D16U=R63 AND (NOT R62)
D17U=R62 AND (NOT R61)
Extraction calculation in Step 561:
To calculate a vertical rising edge, the following window with differential data YU at the focused point R33 set as a center is allotted to the differential data obtained in Step 560:

| D14U | D2U | D5U |     | D8U | D11U | D17U |
|------|-----|-----|-----|-----|------|------|
| D13U | D1U | D4U | YU  | D7U | D10U | D16U |
| D12U | D0U | D3U | DXU | D6U | D9U  | D15U |

Then, the following calculations are executed to obtain AU, BU, CU, DU, FU, GU:
AU0=(NOT D0U) AND (NOT D1U) and (NOT D2U)
AU1=D0U AND (NOT D2U)
AU2=D1U
AU3=D2U AND (NOT D0U)
BU0=(NOT DBU) AND (NOT D4U) AND (NOT DSU)
BU1=D3U AND (NOT D5U)
BU2=D4U
BU3=D5U AND (NOT D3U)
CU0=(NOT D6U) AND (NOT D7U) AND (NOT D8U)
CU1=D6U AND (NOT D8U)
CU2=D7U
CU3=D8U AND (NOT D6U)
DU0=(NOT D9U) AND (NOT D10U) AND (NOT D11U)
DU1=D9U AND (NOT D11U)
DU2=D10U
DU3=D11U AND (NOT D9U)
FU0=(NOT D12U) AND (NOT D13U) AND (NOT D14U)
FU1=D12U AND (NOT D14U)

FU2=D13U
FU3=D14U AND (NOT D12U)
GU0=(NOT D15U) AND (NOT D16U) AND (NOT D17U)
GU1=D15U AND (NOT D17U)
GU2=D16U
GU3=D17U AND (NOT D15U)
Calculation of amount of addition in Step 562:
The following logical calculations are executed:

```
ADD2U = {(AU2 AND BU1 AND CU1 AND DU1 AND FU2)
         OR ((AU0 OR AU3) AND BU1 AND CU2)
         OR ((AU1 OR AU2) AND BU2 AND CU1 AND DU1)
         OR ((DU0 OR DU3) AND AU1 AND BU1 AND CU2)}
         AND (DXU AND (NOT DXD))
ADD3U = {(AU1 AND BU1 AND CU1 AND DU2 AND GU2)
         OR (BU2 AND CU1 AND (DU0 OR DU3))
         OR ((DU1 OR DU2) AND CU2 AND BU1 AND AU1)
         OR (AU0 OR AU3) AND BU2 AND CU11 AND DU1)
         OR (AU2 AND BU1 AND CU1 AND DU2)}
         AND (DXU AND (NOT DXD))
```

Calculation of amount of shaving in Step 563:
To calculate an amount of a rising edge to be shaved, the following logical calculations are executed:

```
H = YU AND YD
SVU3 = (NOT H) AND FU0 AND AU1 AND BU1 AND CU2 AND DU2
       AND YU
SVU4 = (NOT H) AND GU0 AND DU1 AND CU1 AND BU2 AND AU2
       AND YU
SVU1 = {(BU1 AND CU2) OR (AU1 AND BU2 AND CU2 AM DU2)
       OR (BU0 AM CU2 AND DU3 AM (NOT H))}
       AND (NOT (SVU3 OR SVU4)) AND YU
SVU2 = {(BU2 AND CU1) OR (AU2 AND BU2 AND CU2 AND DU1)
       OR (AU3 AND BU2 AND CU0 AND (NOT H)) AND (NOT (SVU3
       OR SVU4)) AND YU
```

Calculation of a vertical rising edge in Step 570:
YD=R33 AND (NOT R34)
DXD=R32 AND (NOT R33)
D0D=R14 AND (NOT R15)
D1D=R13 AND (NOT R14)
D2D=R12 AND (NOT R13)
D3D=R24 AND (NOT R25)
D4D=R23 AND (NOT R24)
D5D=R22 AND (NOT R23)
D6D=R44 AND (NOT R45)
D7D=R43 AND (NOT R44)
D8D=R42 AND (NOT R43)
D9D=R54 AND (NOT R55)
D10D=R53 AND (NOT R54)
D11D=R52 AND (NOT R53)
D12D=R04 AND (NOT R05)
D13D=R03 AND (NOT R04)
D14D=R02 AND (NOT R03)
D15D=R64 AND (NOT R65)
D16D=R63 AND (NOT R64)
D17D=R62 AND (NOT R63)
Extraction calculation in Step 571:
Among the differential data obtained in Step 570, the following window is formed using a differential value YD at the focused point R33 as a center so as to extract data on a vertical falling edge:

| D14D | D2D | D5D | DXD | D8D | D11D | D17D |
|------|-----|-----|-----|-----|------|------|
| D13D | D1D | D4D | YD  | D7D | D10D | D16D |
| D12D | D0D | D3D |     | D6D | D9D  | D15D |

On the basis of the differential data thus extracted, the following logical calculations are executed:
AD0=(NOT D0D) AND (NOT D1) AND (NOT D2D)
AD3=D0D AND (NOT D2D)
AD2=D1
AD1=D2D AND (NOT D0D)
BD0=(NOT D3D) AND (NOT D4D) AND (NOT D5D)
BD3=D3D AND (NOT D5D)
BD2=D4D
BD1=D5D AND (NOT D3D)
CD0=(NOT D6D) AND (NOT DVD) AND (NOT DSD)
CD3=D6D AND (NOT D8D)
CD2=D7D
CD1=DSD AND (NOT D6D)
DD0=(NOT D9D) AND (NOT D10D) AND (NOT D11D)
DD3=D9D AND (NOT D11D)
DD2=D10D
DD1=D11D AND (NOT D9D)
FD0=(NOT D12D) AND (NOT D13D) AND (NOT D14D)
FD3=D12D AND (NOT D14D)
FD2=D13D
FD1=D14D AND (NOT D12D)
GD0=(NOT D1SD) AND (NOT D16D) AND (NOT D17D)
GD3=D15D AND (NOT D17D)
GD2=D16D
GD1=D17D AND (NOT D15D)
Calculation of amount of addition in Step 572:

```
ADD2D =
  {(AD2 AND BD1 AND CD1 AND DD1 AND FD2)
   OR ((AD0 OR AD3) AND BD1 AND CD2)
   OR ((AD1 OR AD2) AND BD2 AND CD1 AND DD1)
```

```
OR ((DD0 OR DD3) AND AD1 AND BD1 AND CD2)}
   AND (DXD AND (NOT DXU))
ADD3D =
   {(AD1 AND BD1 AND CD1 AND DD2 AND GD2)
   OR ((BD2 AND CD1 AND (DD0 OR DD3))
   OR ((DD1 OR DD2) AND CD2 AND BD1 AND AD1)
   OR ((AD0 OR AD3) AND BD2 AND CD1 AND DD1)
   OR (AD2 AND BD1 AND CD1 AND DD2)}
   AND (DXD AND (NOT DXU))
```

Calculation of amount of shaving in Step 573:

```
H = YU AND YD
SVD3 = (NOT H) AND FD0 AND AD1 AND BD1 AND CD2 AND DD2
   AND YD
SVD4 = (NOT H) AND GD0 AND DD1 AND CD1 AND BD2 AND AD2
   AND YD
SVD1 = {(BD1 AND CD2) OR (AD1 AND BD2 AND CD2 AND DD2)
   OR (BD0 AND CD2 AND DD3 AND (NOT H))}
   AND (NOT (SVD3 OR SVD4)) AND YD
SVD2 = {(BD2 AND CD1) OR (AD2 AND BD2 AND CD2 AND DD1)
   OR (AD3 AND BD2 AND CD0 AND (NOT H)) AND
   (NOT (SVD3 OR SVD4)) AND YD
```

Calculation of output determination in Step 580:

When the calculation of all the amounts of correction has been completed in Steps 532, 542, 562, 563, 572, and 573, the following calculations are executed, the respective data are combined, and the result is outputted to the pulse-width modulator 50.

SVLR=SVL AND SVR AND X a signal for adding a ¼ dot to the left of the black dot:
   ADDL=SFTL0 a signal for adding a ¼ dot to the right of the black dot:
   ADDR=SFTR1 a signal for shaving the left end of the black dot by ¼ dot:
   SHL=SFTL1
   OR {SVLR AND (NOT H) AND (SVU1 OR SVU2 OR SVD1 OR SVD2))
   OR {SVLR AND H AND (SVU1 OR SVD1 OR SVU2 OR SVD2)}
   OR {SVLR AND (SVU4 OR SVD4)} a signal for shaving the right end of the black dot by ¼ dot:

```
SHR = SFTR0
   OR {SVLR AND (NOT H) AND (SVUL OR
   SVU2 OR SVD1 OR SVD2)} OR {SVLR AND
   (SVU3 OR SVD3)}
``` a signal (00001111) for shaving the left end of the black dot by ½ dot:

SHL1=SVLR AND (SVU3 OR SVD3)

a signal (11110000) for shaving the right end of the black dot by ½ dot:

SLR1=SVLR AND (SVU4 OR SVD4)

a signal (11111110) for shaving the right end of the black dot by ⅛ dot:

SHR2=SVLR AND H AND (SVU1 OR SVD1 OR SVU2 OR SVD2)

a signal (00001100) for adding ¼ dot toward the right as viewed from the center:

ADD2=(NOT X) AND (ADD2U OR ADD2D)

a signal (00001100) for adding ¼ dot toward the left as viewed from the center:

ADD3=(NOT X) AND (ADD3U OR ADD3D)

Since correction can be carried out by taking into consideration the form of a linkage with a dot located at a position further spaced apart from the focused point by expanding the frame of the sampling, it is possible to generate a smoother dot pattern as compared with the embodiment described before, as shown in FIG. 47, thereby making it possible to improve the print quality.

Figure 47:
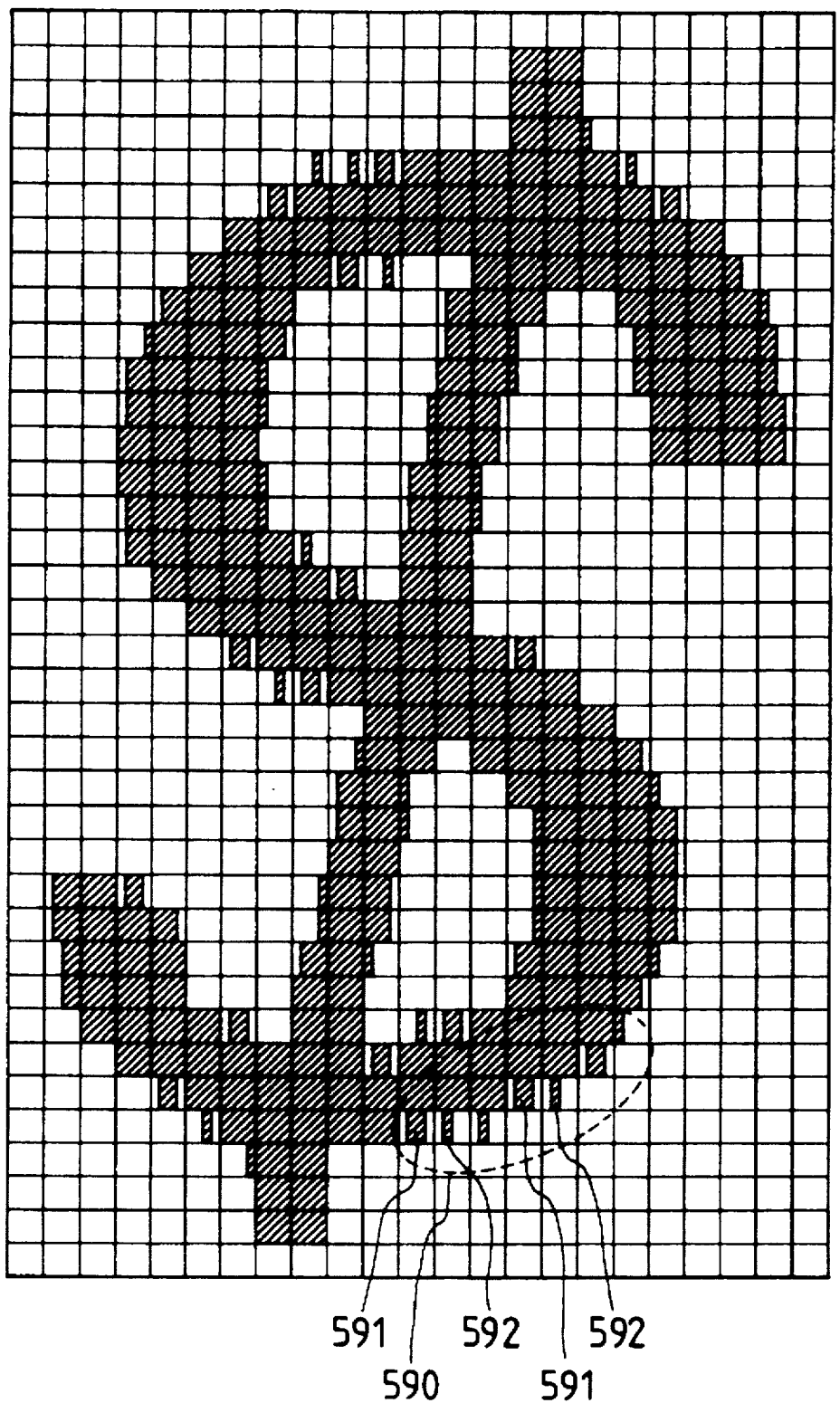
FIG. 47 is a diagram illustrating bit map data showing a result of enlarging the window and performing calculation with respect to the character "$" shown in FIG. 4 by means of software.

That is, if a comparison is made between FIGS. 44 and FIG. 47, for instance, data 591 of a ½-dot portion or data 592 of a ¼-dot portion with an interval smaller than one dot is newly added in a vacant portion abutting a curved line of a region 590 in FIG. 47. As a result, slanted lines and curved portions can be expressed as very small patterns as compared with the original bit map data.

Although the dot patterns become smoother as the size of the sampling window is enlarged, a size of 7×7 bits or thereabouts becomes a limit in practical use owing to such as the expansion of the laser beam and the attraction characteristics of the photoconductor drum and toner. If a sampling window of this size or thereabouts is used, processing by means of software is possible, and it has been confirmed that print quality which is visually indistinguishable from movable type can be obtained.

In the above-described embodiments, while being read every one column by N lines, the bit map data stored in the memory (image data storage unit 41) is digitally differentiated in both horizontal and vertical directions to obtain the horizontal and vertical contour data. According to this method, the read access and the write access to the memory occur in a one-to-one ratio for each dot to be printed.

Figure 48:
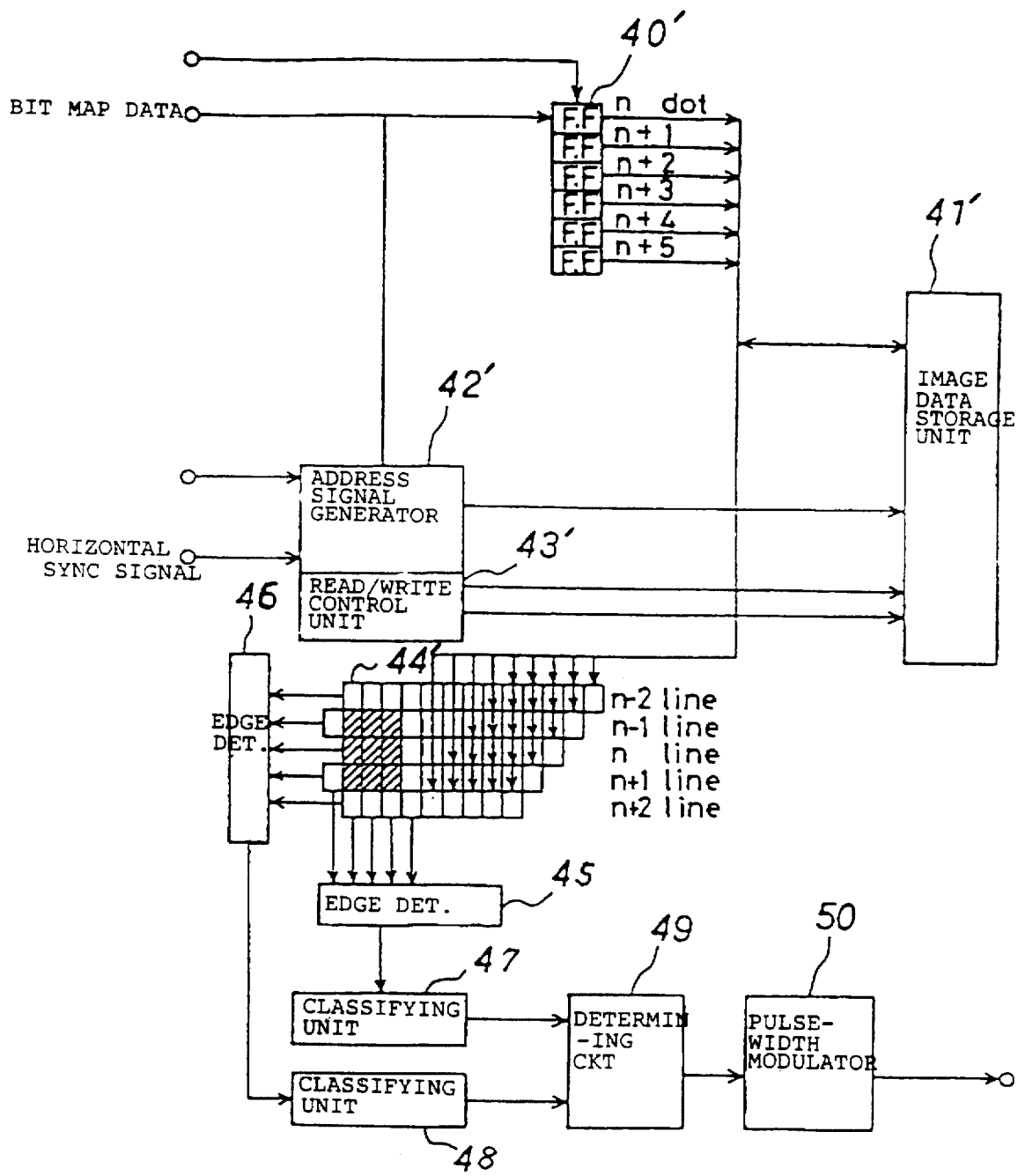
FIG. 48 is a block diagram showing a bit-map-data generating circuit according to another embodiment of the invention.
Figure 52:
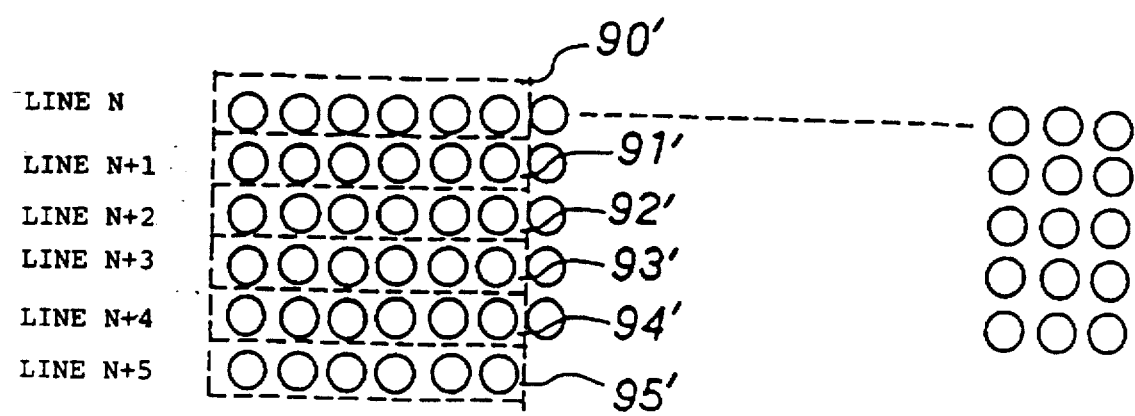
FIG. 52 is a schematic chart illustrating, in the form of a printing procedure, data storage and read operations on the image data storage unit of FIG. 51.

On the other hand, by constituting the bit-map-data generating circuit 29 in the manner as shown in FIG. 48, it becomes sufficient to perform, for each data of M columns by one line, N read accesses and one write access (see FIG. 52). This is to be contrasted to the case of FIG. 32 in which M read accesses and M write accesses are needed for each data of one column by M lines. That is, the number of accesses can be reduced. This method is described below in more detail.

In FIG. 48, the bit pattern data in a serial signal format outputted from the character generator 28 is shifted bit by bit in the line direction by a shift register 40' constituted of flip-flops FF. When data of M columns by one line has been stored in the flip-flops FF, it is transferred to an image data storage unit 41' which is, for instance, a static random access memory. Such storage of data is effected by an address signal generator 42', which operates with reference to a horizontal sync signal from a detector for detecting a scan starting point of the laser beam, and a read/write control unit 43'.

When data of a plurality of lines (five lines in this embodiment) have been stored in the image data storage unit 41', the address signal generator 42' and the read/write control unit 43' read data of M columns by one line from the image data storage unit 41' in synchronism with the timing of printing each dot, and sequentially provide the data thus read to a shift register 44' of M columns by N lines. When data of M columns and one line for the next dot (one bit) has been stored in the flip-flops FF, it is transferred to the image data storage unit 41' To extract the contour data, the data stored in the shift register 44' is digitally differentiated in the horizontal and vertical directions by a first edge detector 45 and a second edge detector 46, respectively, at the read/write timing of the address signal generator 42' and the read/write control unit 43'.

Figure 49:
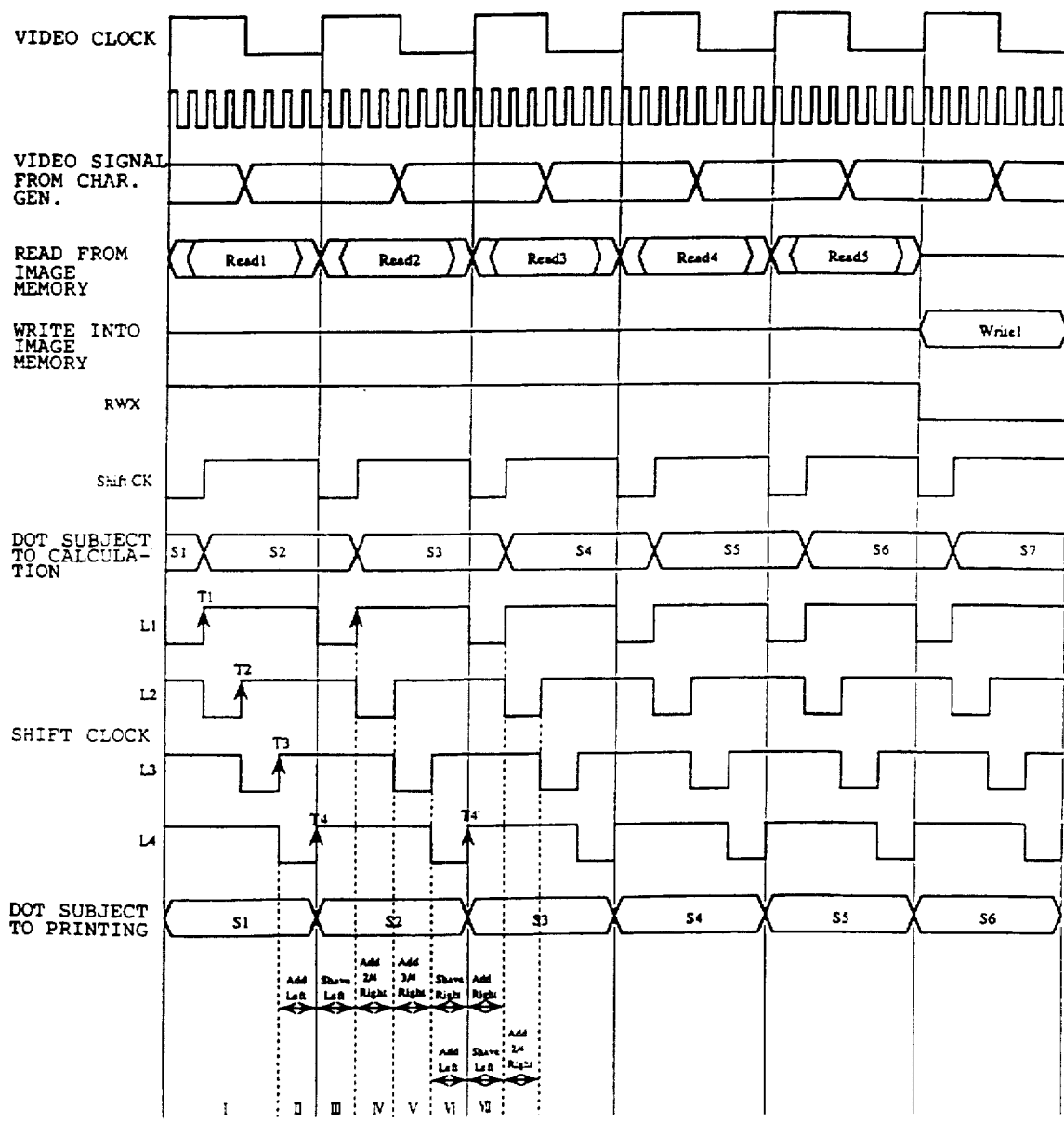
FIGS. 49 and 50 are timing charts showing the operation of the embodiment of FIG. 48.
Figure 50:
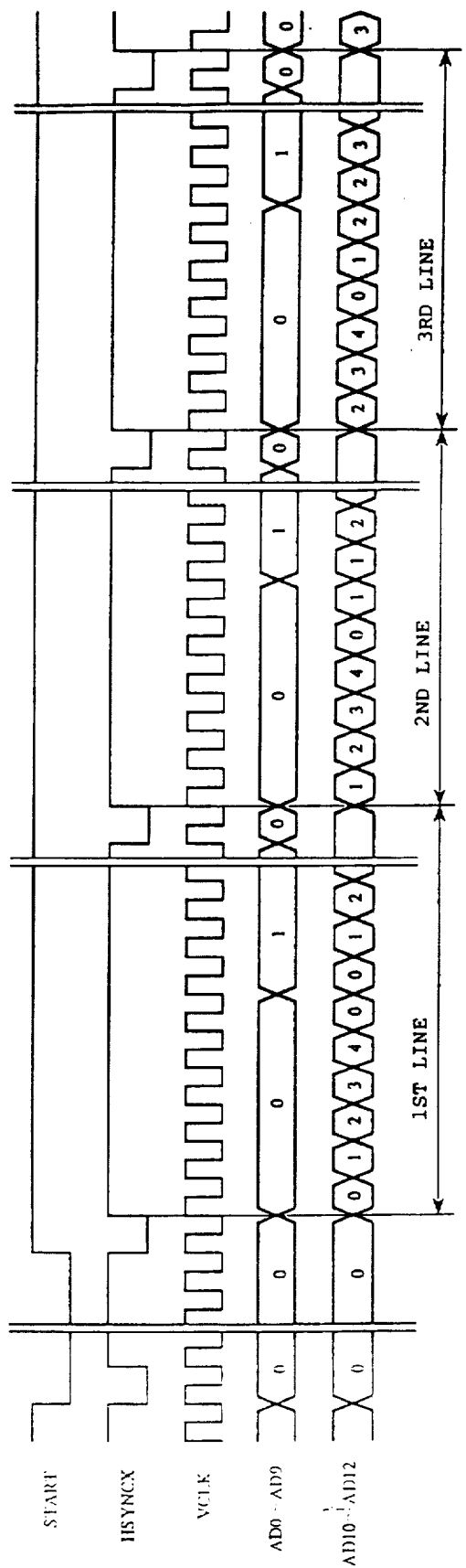

Specific examples of the respective units performing the above-described operations are described below with reference to the timing charts of FIGS. 49 and 50.

Figure 51:
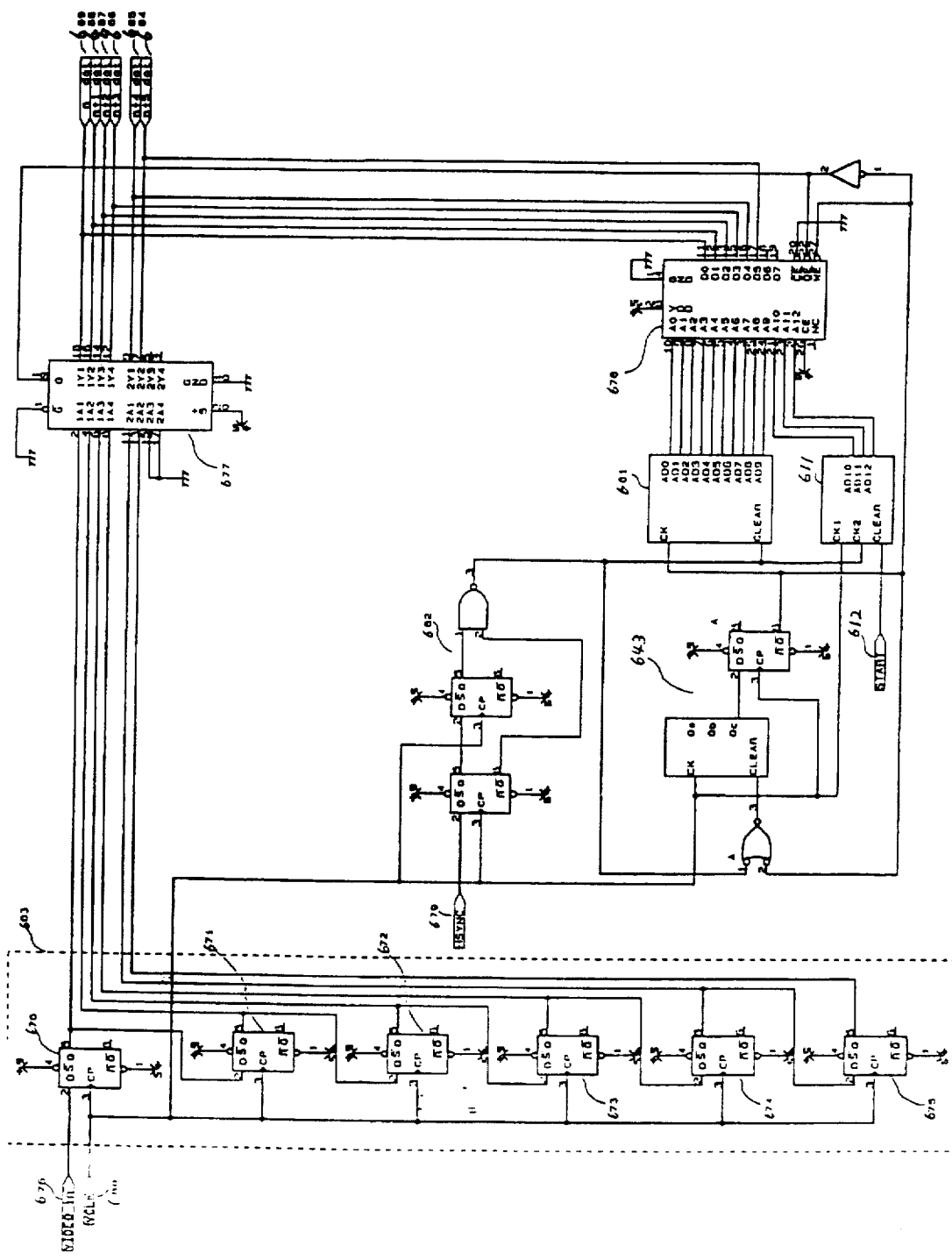
FIG. 51 is a circuit diagram of an image data storage unit used in the embodiment of FIG. 48.

FIG. 51 shows an example of the image data storage unit 41' for storing the serial data outputted from the buffer 23.

Flip-flops 670–675 constitute a horizontal shift register 683 for sequentially shifting the serial video signal (VIDEO), which is provided from the buffer 23 to an input terminal 676, in the line direction (main scanning direction) in accordance with a video clock (VCLK) provided to an input terminal 680. The output of the shift register 683 is sent, via a tri-state circuit 677, to an image memory 678 constituted, for instance, of a static random access memory and stored therein. A write enable terminal (WE) and an output enable terminal (OE) of the memory 678 are controlled by a read/write control circuit 643 constituted by a counter, a flip-flop and an AND gate. An output signal of the read/write control circuit 643 has a waveform RWX as shown in FIG. 49. The address control of the memory 678 is performed by an address generating circuits 681 and 611.

The address generating circuit 681 is a counter for indicating the dot position in the horizontal direction, which is cleared every horizontal period by a signal outputted from a control circuit 682 for synchronizing a horizontal sync signal (HSYNC) 679 with the video clock VCLK (680), and which increases its count upon reception of a signal provided from the read/write control circuit 643. The outputs of the address generating circuit 681 have respective values AD0–AD9 shown in FIG. 50.

The address generating circuit 611 is a counter for counting the line position in the vertical direction, which is controlled by a signal provided from the control circuit 682, the video clock VCLK (680) and a signal START (612) indicating a start position of the printing. The outputs of the address generating circuit 611 have respective values AD10–AD12 shown in FIG. 50. More specifically, the address generating circuit 611, which is cleared by the signal START (612), repeats counting in the sequence of 0→1→2→3→4→0 for the first line of printing in accordance with the video clock VCLK (680). For the second line, counting in the sequence of 1→2→3→4→0→1 is repeated. For the third line, counting in the sequence of 2→3→4→0→1→2 is repeated. For the fourth line, counting in the sequence of 3→4→0→1→2→3 is repeated. For the fifth line, counting in the sequence of 4→0→1→2→3→4 is repeated. For the sixth line, counting in the sequence of 0→1→2→3→4→0 is again repeated. Thus, the above operation is repeatedly performed.

With the above control operation, during five periods of the video clock VCLK, the stored data of six columns by five lines is outputted from output terminals 684–689, and during one period of the video clock VCLK the data of six columns by one line sent from the shift register 683 is stored.

A further description will be given below with reference to FIG. 52 showing a printing procedure.

Data of lines N to N+4 are stored in the memory 678. In this state, six-column data 90' of line N is read out, in a parallel signal format, in one period of the video clock VCLK in synchronism therewith (at the timing of WRITE1 in FIG. 49). Six-column data 91' of line N+1 is read out in the next period of the video clock VCLK (at the timing of WRITE2). Data 92', 93' and 94' are read out in the similar manner. During the course of the above operation, six-column data 95' of line N+5 is transferred from the shift register 683 to the memory 678 in one period of the video clock VCLK (at the timing of WRITE1 in FIG. 49). As a result, the six-column data 90' of line N disappears from the memory 678. Subsequently, the operation of reading out six-column data of lines N to N+4 and storing six-column data of line N+5 is repeated.

Figure 53:
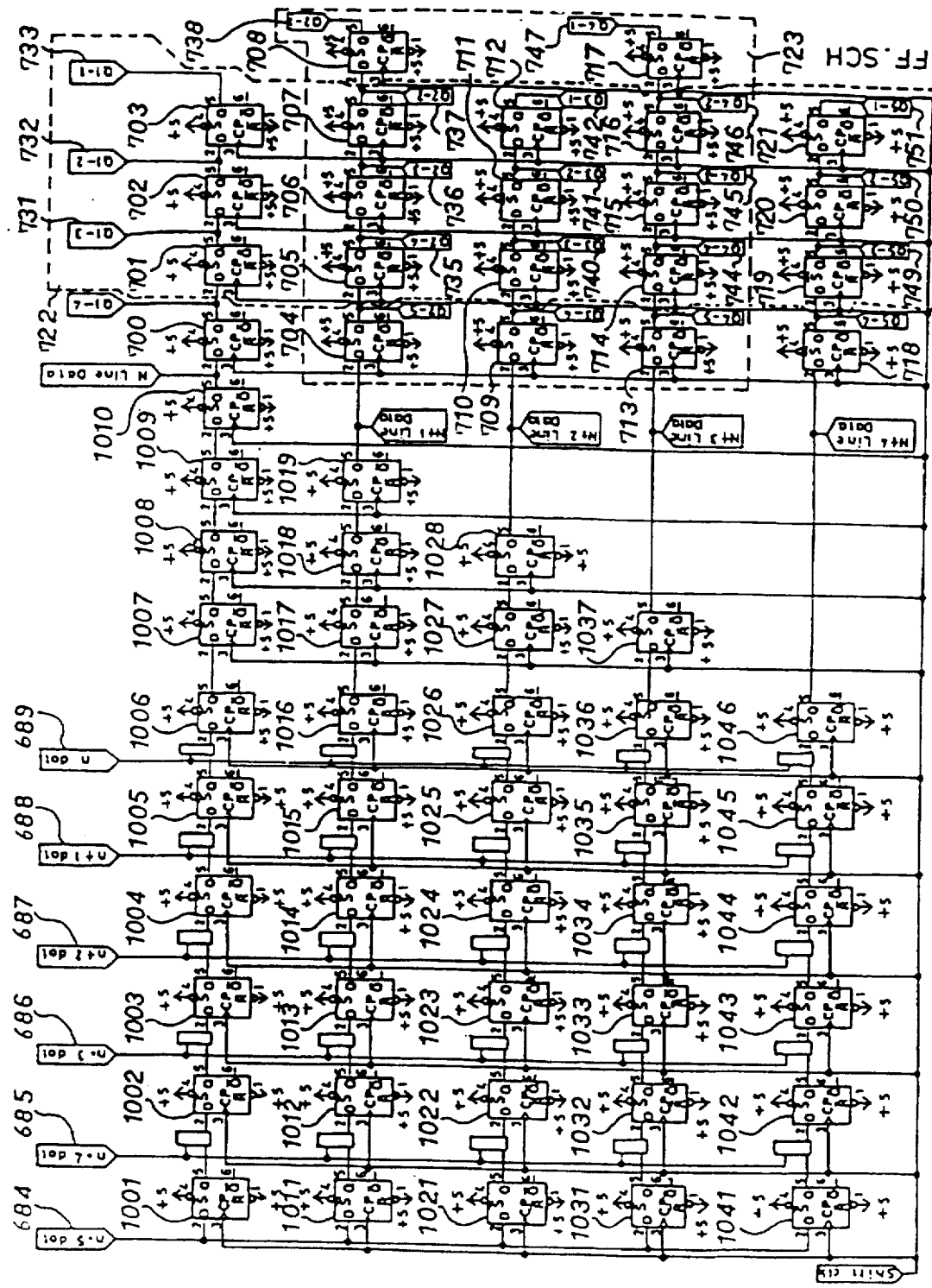
FIG. 53 is a circuit diagram showing a shift register constituting a sampling window that is used in the embodiment of FIG. 48

FIG. 53 shows a specific example of the shift register 44' that constitutes the sampling window. D-type flip-flops 1001, 1011, 1021, 1031 and 1041 are connected in parallel to the output terminal 684 of the image memory 678 (see FIG. 51). D-type flip-flops 1002, 1012, 1022, 1032 and 1042 having a selector at their data input terminal are connected in parallel to the output terminal 685 of the memory 678. D-type flip-flops 1003, 1013, 1023, 1033 and 1043 having a selector at their data input terminal are connected in parallel to the output terminal 686 of the memory 678. D-type flip-flops 1004, 1014, 1024, 1034 and 1044 having a selector at their data input terminal are connected in parallel to the output terminal 687 of the memory 678. D-type flip-flops 1005, 1015, 1025, 1035 and 1045 having a selector at their data input terminal are connected in parallel to the output terminal 688 of the memory 678. D-type flip-flops 1006, 1016, 1026, 1036 and 1046 having a selector at their data input terminal are connected in parallel to the output terminal 689 of the memory 678. A shift clock (SHIFT CLK) is provided to the respective D-type flip-flops. The shift clock is selectively connected to the D-type flip-flops 1001, 1011, 1021, 1031 and 1041, as explained below.

The six-column data of line N outputted from the image memory 678 are simultaneously stored in the flip-flops 1001–1006. The six-column data of line N+1 outputted from the memory 678 at the next cycle of the video clock VCLK are simultaneously stored into the flip-flops 1011–1016. At this time point, the six-column data of line N are shifted to the flip-flops 1002–1007. Then, the six-column data of line N+2 outputted from the memory 678 at the next cycle of the video clock VCLK are simultaneously stored in the flip-flops 1021–1026. At this time point, the six-column column data of line N are shifted to the flip-flops 1003–1008 and the six-column data of line N+1 are shifted to the flip-flops 1012–1017. Similarly, when the six-line data of lines N+3 and N+4 are stored in the flip-flops, the data of line N have been shifted to the flip-flops 1005–1010, the data of line N+1 to the flip-flops 1014–1019, the data of line N+2 to the flip-flops 1023–1028, the data of line N+3 to the flip-flops 1032–1037, and the data of line N+4 to the flip-flops 1041–1046. Further, at the next cycle of the video clock VCLK, the data of line N are shifted to the flip-flops 1006–1010 and 700, the data of line N+1 are shifted to the flip-flops 1015–1019 and 704, and the data of line N+2 are shifted to the flip-flops 1024–1028 and 709, the data of line N+3 are shifted to the flip-flops 1033–1037 and 713, and the data of line N+4 are shifted to the flip-flops 1042–1046 and 718.

That is, the data of one column by five lines are stored in the flip-flops 700, 704, 709, 713 and 718. Video data stored in the shift register 683 at this timing are transferred to the image memory 678. Further, six-column data of line N are simultaneously stored into the flip-flops 1001–1006 at the next cycle of the video clock VCLK. At this time point, the data of one column by five lines are shifted to the flip-flops 701, 705, 710, 714 and 719.

The repetition of the above operation causes the shift of the data of one column by five lines on the flip-flops.

With the above constitution, the flip-flops 701–703, 705–707, 710–712, 714–716 and 719–721 constitute a window for the edge detection in the vertical direction enclosed by a dashed-line block 721 in FIG. 53. On the other hand, the flip-flops 704–717 constitute a window for the edge detection in the horizontal direction enclosed by a dashed-line block 723. The flip-flop 711 located at the center of the two blocks 722 and 723 stores the data under attention. Although the flip-flops 700 and 718 do not contribute to the edge detection, they are necessary to take timing of the data shifting.

With the above constitution and operation, the data of the flip-flop 711 is updated bit by bit every time one-bit data is outputted from the buffer 23 to store data on the line that is subject to the printing.

Although the above description relates to the case where the serial bit pattern data is outputted from the character generator 28, the data outputted from the character generator 28 may be parallel bit pattern data. In the latter case, the shift register 40' constituted by the flip-flops FF and serving to shift the data in the line direction should be connected in parallel to the parallel data.

What is claimed is:

1. A method for generating bit map image data, comprising the steps of:

converting coded data outputted from an external device into bit map data and storing a portion of a plurality of lines of the bit map data in a memory;

obtaining horizontal contour data and vertical contour data by digitally differentiating the bit map data in said memory in horizontal and vertical directions while reading each portion of one column by N lines or M columns by one line, wherein said differentiating is accomplished by determining whether there exists a change in value between data in a first location and data in a vertically or horizontally adjacent location;

determining positional relationship between dot data subject to printing and dot data not subject to printing on the basis of the contour data; and converting the dot data subject to printing to a dot of a predetermined size and outputting the dot of the predetermined size as print data on the basis of a result of determination.

2. A method for modulating a laser beam for effecting printing with enhanced bit-map image data, comprising the steps of:

storing in an image memory a portion of a plurality of lines of bit map data of a serial signal format outputted from a character generator;

sequentially extracting a portion of one column by N lines or M columns by one line of data from said image memory each time a one-bit signal is outputted from said character generator;

storing in sampling means data extracted from said image memory while shifting the data by each portion of M columns by N lines;

digitally differentiating the data stored in said sampling means in a line direction;

digitally differentiating the data stored in said sampling means in a column direction, wherein said differentiating is accomplished by determining whether there exists a change in value between data in a first location and data in an adjacent location in a line or column, respectively;

classifying the relationship of connection between a point subject to printing and vertical dots including said point on the basis of edge data produced as a result of said step of digitally differentiating the data stored in said sampling means in a line direction;

classifying the relationship of connection between the point subject to printing the horizontal dots including said point on the basis of edge data produced as a result of said step of digitally differentiating the data stored in said sampling means in a column direction;

producing correction dot data whose dot size to be printed and dot position within the size of a normal dot are predetermined on the basis of data from said steps of classifying; and pulse-width modulation a laser beam for effecting printing in response to said correction dot data.

3. An apparatus for modulating a laser beam with enhanced bit-map image data, comprising:

an image memory for storing a portion of a plurality of lines of bit map data of a serial signal format outputted from a character generator;

memory control means for sequentially extracting a portion of one column by N lines or M columns by one line of data from a character generator;

memory control means for sequentially extracting a portion of one column by N lines or M columns by one line of data from said image memory each time a one-bit signal is outputted from said character generator;

sampling means for storing the data read from said image memory while shifting the data by each portion of M columns by N lines;

first edge detecting means for digitally differentiating the data stored in said sampling means in a line direction;

second edge detecting means for digitally differentiating the data stored in said sampling means in a column direction, wherein said differentiating is accomplished by determining whether there exists a change in value between data in a first location and data in an adjacent location in a line or column direction, respectively;

first classifying means for classifying the relationship of connection between a point subject to printing and vertical dots including said point on the basis of edge data from said first edge detecting means;

second classifying means for classifying the relationship of connection between the point subject to printing and horizontal dots including said point on the basis of edge data from said second edge detecting means;

determining means for outputting correction dot data whose size of a dot to be printed and position within the size of a normal dot have been determined on the basis of the data from said first and second classifying means; and pulse-width modulating means for modulating laser beam for effecting printing in response to said correction data.

4. The apparatus for generating laser beam bit-map image data according to claim 3, wherein said sampling means comprises M by N shift registers arranged in a matrix form.

5. The apparatus for generating laser beam bit-map image data according to claim 3, wherein said classifying means has a dictionary structure.

6. The apparatus for generating laser beam bit-map image data according to claim 3, wherein said determining means comprises a gate array circuit.

* * * * *